US012737359B2

(12) United States Patent
Stolze et al.

(10) Patent No.: US 12,737,359 B2
(45) Date of Patent: Sep. 15, 2026

(54) GENERATING AN OPTIMIZED JOIN TREE FOR EXECUTION OF A PLURALITY OF JOIN OPERATIONS VIA A DATABASE SYSTEM

(71) Applicant: Ocient Holdings LLC, Chicago, IL (US)

(72) Inventors: Knut Stolze, Jena (DE); Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 19/014,844

(22) Filed: Jan. 9, 2025

(65) Prior Publication Data

US 2026/0119495 A1 Apr. 30, 2026

Related U.S. Application Data

(60) Provisional application No. 63/714,297, filed on Oct. 31, 2024.

(51) Int. Cl.
*G06F 16/24* (2019.01)
*G06F 16/2453* (2019.01)

(52) U.S. Cl.
CPC .. *G06F 16/24544* (2019.01); *G06F 16/24537* (2019.01)

(58) Field of Classification Search
CPC ................................................ G06F 16/24544
USPC ........................................................ 707/714
See application file for complete search history.

(56) References Cited

U.S. PATENT DOCUMENTS

| | | | | |
|---|---|---|---|---|
| 5,548,770 | A | 8/1996 | Bridges | |
| 6,230,200 | B1 | 5/2001 | Forecast | |
| 6,633,772 | B2 | 10/2003 | Ford | |
| 7,499,907 | B2 | 3/2009 | Brown | |
| 7,908,242 | B1 | 3/2011 | Achanta | |
| 11,074,261 | B1 * | 7/2021 | Pandis | G06F 16/9535 |
| 12,117,986 | B1 | 10/2024 | Veselova | |
| 2001/0051949 | A1 | 12/2001 | Carey | |

(Continued)

OTHER PUBLICATIONS

A new high performance fabric for HPC, Michael Feldman, May 2016, Intersect360 Research.

(Continued)

*Primary Examiner* — Syling Yen
(74) *Attorney, Agent, or Firm* — Garlick & Markison; Timothy W. Markison

(57) ABSTRACT

A database system is operable to generating a query operator execution flow that includes an optimized join tree implementing a plurality of join operations applied to a plurality of input row sets based on: identifying a set of filter predicates indicated by the query expression and generating, based on the plurality of input row sets and the set of filter predicates, cardinality data for each of the plurality of input row sets. The optimized join tree is generated based on generating the optimized join tree based on selecting an ordering for applying the plurality of join operations to the plurality of input row sets based on the cardinality data for the each of the plurality of input row sets. The query operator execution flow is executed in conjunction with executing the query expression based on executing the plurality of join operators of the optimized join tree.

20 Claims, 71 Drawing Sheets

(56) References Cited

U.S. PATENT DOCUMENTS

| | | | | |
|---|---|---|---|---|
| 2002/0032676 | A1 | 3/2002 | Reiner | |
| 2004/0162853 | A1 | 8/2004 | Brodersen | |
| 2008/0133456 | A1 | 6/2008 | Richards | |
| 2009/0063893 | A1 | 3/2009 | Bagepalli | |
| 2009/0183167 | A1 | 7/2009 | Kupferschmidt | |
| 2010/0082577 | A1 | 4/2010 | Mirchandani | |
| 2010/0241646 | A1 | 9/2010 | Friedman | |
| 2010/0274983 | A1 | 10/2010 | Murphy | |
| 2010/0312756 | A1 | 12/2010 | Zhang | |
| 2011/0219169 | A1 | 9/2011 | Zhang | |
| 2012/0109888 | A1 | 5/2012 | Zhang | |
| 2012/0151118 | A1 | 6/2012 | Flynn | |
| 2012/0185866 | A1 | 7/2012 | Couvee | |
| 2012/0254252 | A1 | 10/2012 | Jin | |
| 2012/0311246 | A1 | 12/2012 | Mcwilliams | |
| 2013/0332484 | A1 | 12/2013 | Gajic | |
| 2014/0047095 | A1 | 2/2014 | Breternitz | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0244804 | A1 | 8/2015 | Warfield | |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0034547 | A1 | 2/2016 | Lerios | |
| 2020/0117649 | A1 | 4/2020 | Arnold | |
| 2021/0240713 | A1 | 8/2021 | Kondiles | |
| 2021/0311943 | A1* | 10/2021 | Kondiles | G06F 16/2456 |
| 2022/0043690 | A1 | 2/2022 | Kondiles | |
| 2022/0043755 | A1 | 2/2022 | Kondiles | |
| 2022/0043787 | A1 | 2/2022 | Kondiles | |
| 2022/0382751 | A1 | 12/2022 | Dhuse | |
| 2023/0107652 | A1 | 4/2023 | Veselova | |
| 2023/0385277 | A1 | 11/2023 | Schmidt | |
| 2023/0385278 | A1 | 11/2023 | Bove | |
| 2024/0004882 | A1 | 1/2024 | Bove | |
| 2024/0134858 | A1 | 4/2024 | Schieferstein | |
| 2024/0143595 | A1 | 5/2024 | Bove | |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Allam, Evaluation of a greedy join-order optimization approach using the IMDB dataset, Master Thesis, Aug. 23, 2018, 79 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Moerkotte, et al., Dynamic Programming Strikes Back, SIGMOD,08, Vancouver, BC, Canada, Jun. 9-12, 2008, 14 pages.

Neumann et al., Adaptive Optimization of Very Large Join Queries, Proceedings of 2018 International Conference on Management of Data, Houston, TX (SIGMOD'18), USA, Jun. 10-15, 2018, 16 pages.

Neumann, Query Optimization, https://db.in.tum.de/teaching/ws2324/queryopt/main.pdf?lang=en, retrieved from the internet Oct. 2, 2024, 695 pages.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10

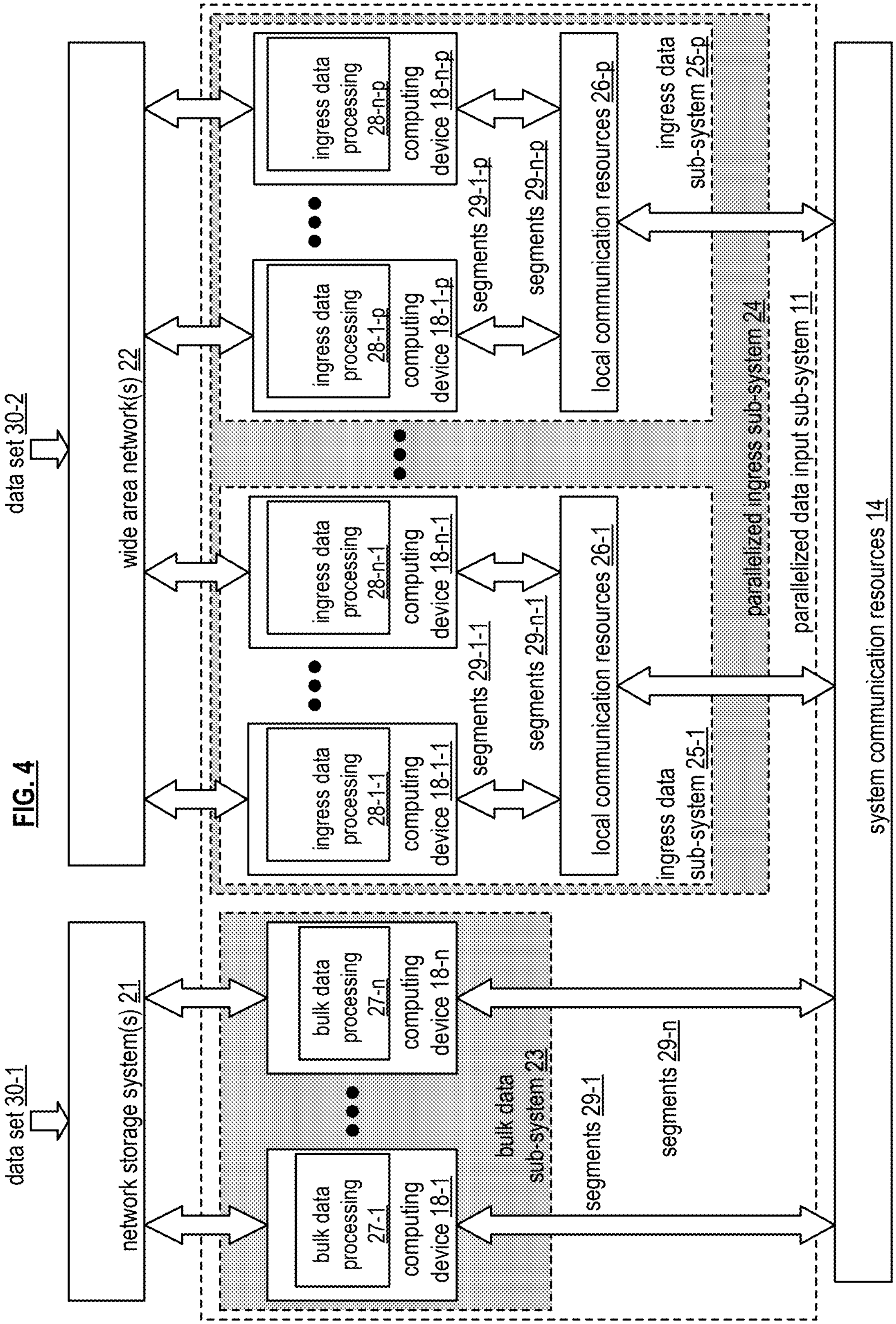

FIG. 4
data set 30-1
data set 30-2
network storage system(s) 21
wide area network(s) 22
bulk data processing 27-1
computing device 18-1
bulk data processing 27-n
computing device 18-n
bulk data sub-system 23
segments 29-1
segments 29-n
ingress data processing 28-1-1
computing device 18-1-1
ingress data processing 28-n-1
computing device 18-n-1
segments 29-1-1
segments 29-n-1
local communication resources 26-1
ingress data sub-system 25-1
ingress data processing 28-1-p
computing device 18-1-p
ingress data processing 28-n-p
computing device 18-n-p
segments 29-1-p
segments 29-n-p
local communication resources 26-p
ingress data sub-system 25-p
parallelized ingress sub-system 24
parallelized data input sub-system 11
system communication resources 14 computing device 18 computing device 18 computing device 18 node 37 node 37 node 37 data set query execution plan 2405
level 2410.1: root level 2412
level 2410.2: inner level 2414
level 2410.3 – level 2410.H-2: inner levels 2414
level 2410.H-1: inner level 2414
level 2410.H: IO level 2416
final resultant
node 37
resultant
row reads query processing system 2502 query execution module
2504 database system 10 database system 10 query execution module 2504 database system 10 database system 10 query processing system 2510 query processing system 2510 database system 10 query execution module 2504 database system 10 query execution module 2504 query execution module 2504 database system 10

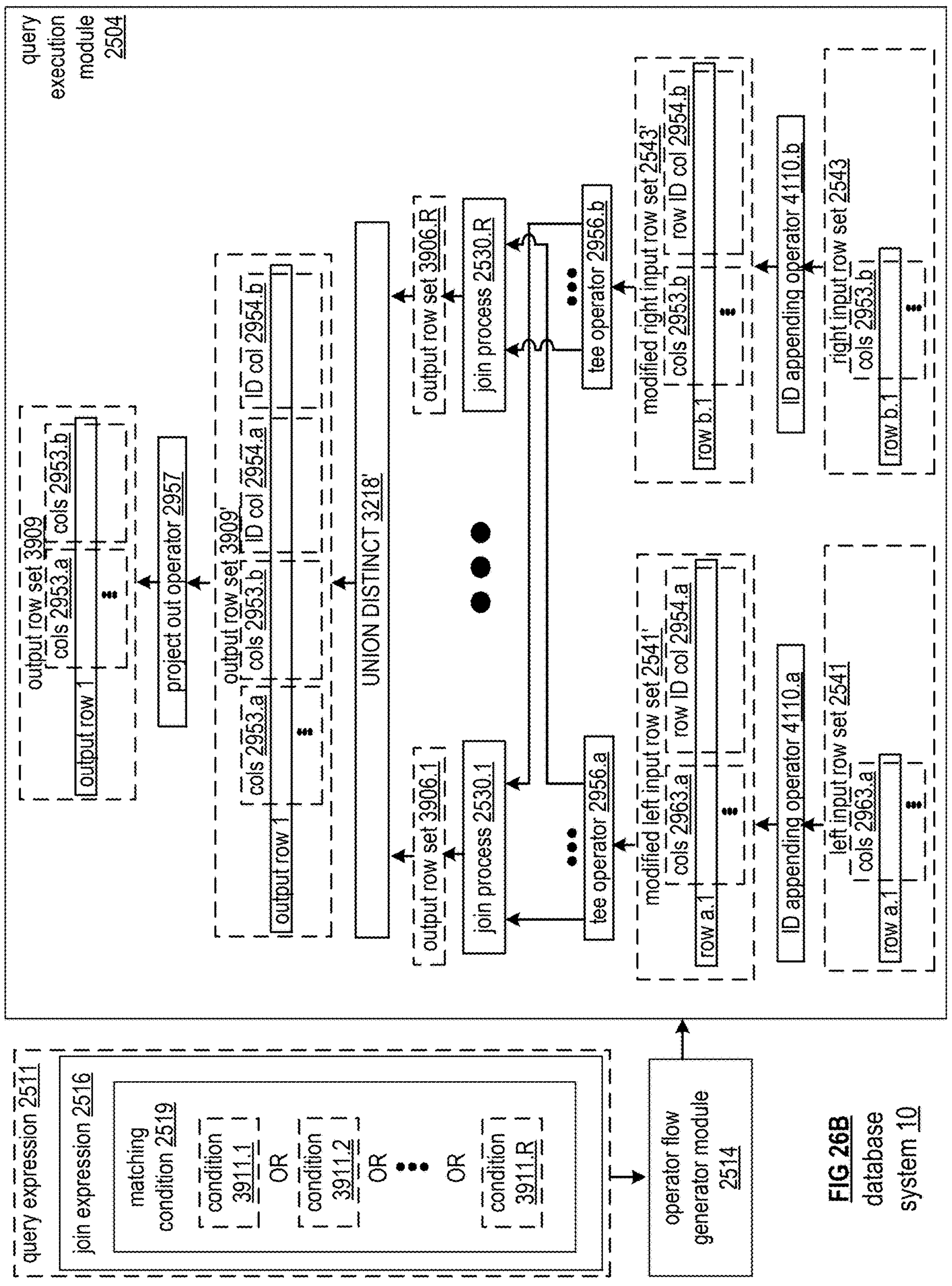
FIG 26B database system 10 database system 10 database system 10 table "r": 1'000'000 rows ← cardinality data 3031.r
table "s": 1'000 rows ← cardinality data 3031.s
table "t": 10 rows ← cardinality data 3031.t

| | (r ⋈ s) ⋈ t | r ⋈ (s ⋈ t) | s ⋈ (r ⋈ t) |
|---|---|---|---|
| Join tree | 3010.A<br>⋈<br>/ \\<br>⋈ t<br>/ \\<br>r s | 3010.B<br>⋈<br>/ \\<br>r ⋈<br>/ \\<br>s t | 3010.C<br>⋈<br>/ \\<br>s ⋈<br>/ \\<br>r t |
| Output cardinality of lower join | 1'000'000'000 | 10'000 | 10'000'000 |

FIG 27D join tree generator module 3020 join tree generator module 3020 join tree generator module 3020 join tree generator module 3020 database system 10

GENERATING AN OPTIMIZED JOIN TREE FOR EXECUTION OF A PLURALITY OF JOIN OPERATIONS VIA A DATABASE SYSTEM

CROSS-REFERENCE TO RELATED APPLICATIONS

The present U.S. Utility Patent Application claims priority pursuant to 35 U.S.C. § 119(e) to U.S. Provisional Application No. 63/714,297, entitled "GENERATING AN OPTIMIZED JOIN TREE FOR EXECUTION OF A PLURALITY OF JOIN OPERATIONS VIA A DATABASE SYSTEM", filed Oct. 31, 2024, which is hereby incorporated herein by reference in its entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 4 is a schematic block diagram of an embodiment of a parallelized data input sub-system in accordance with various embodiments;

FIGS. 26A-26C illustrate embodiments of a query operator execution flow executed via a query execution module that implements execution of plurality of join processes prior to execution of a union distinct operator in accordance with various embodiments;

FIG. 27D illustrates differences in output cardinality for different join trees for executing a plurality of join operations in accordance with various embodiments;

DETAILED DESCRIPTION OF THE INVENTION

Figure 1:
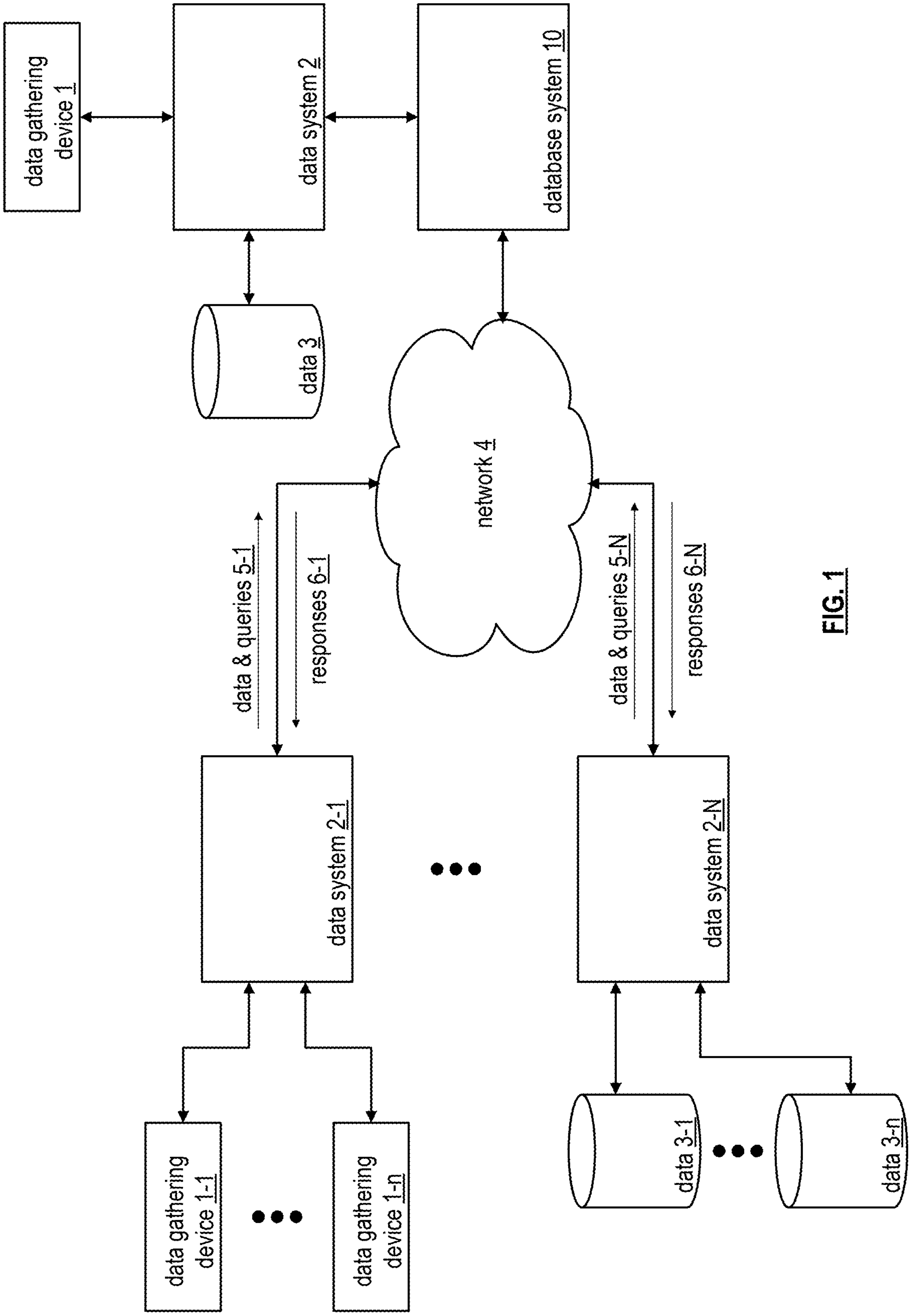
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
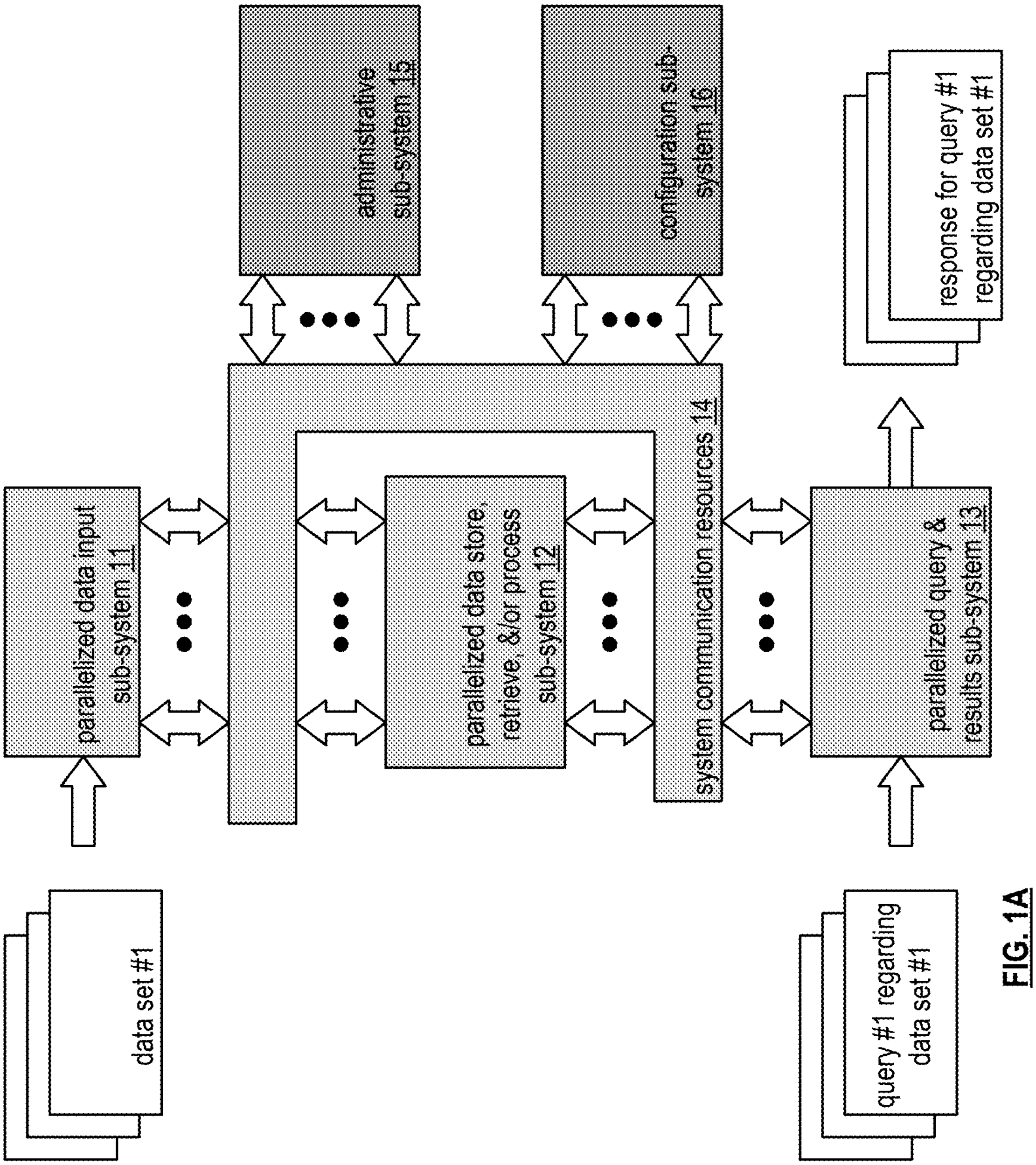
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of: wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
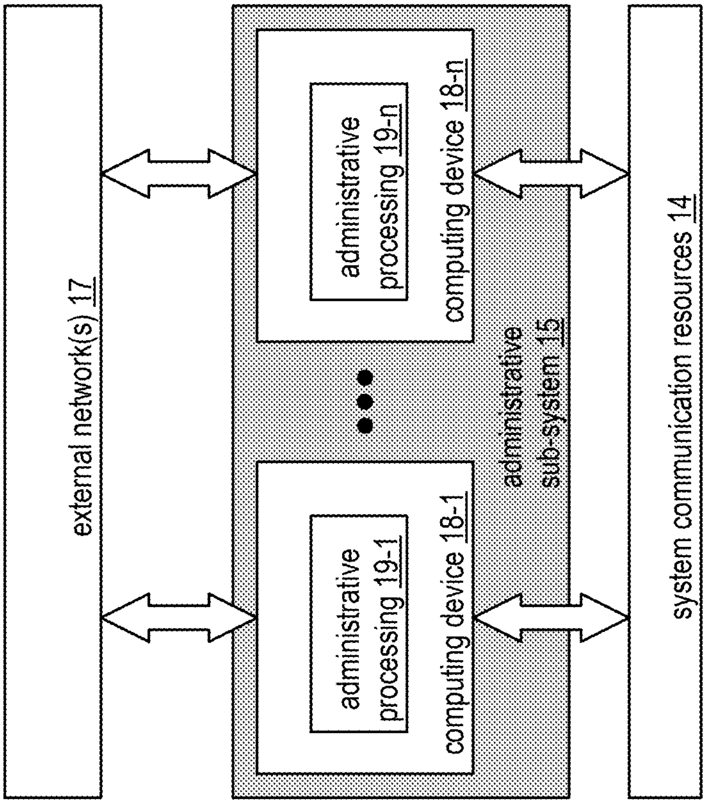
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through **18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1**A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
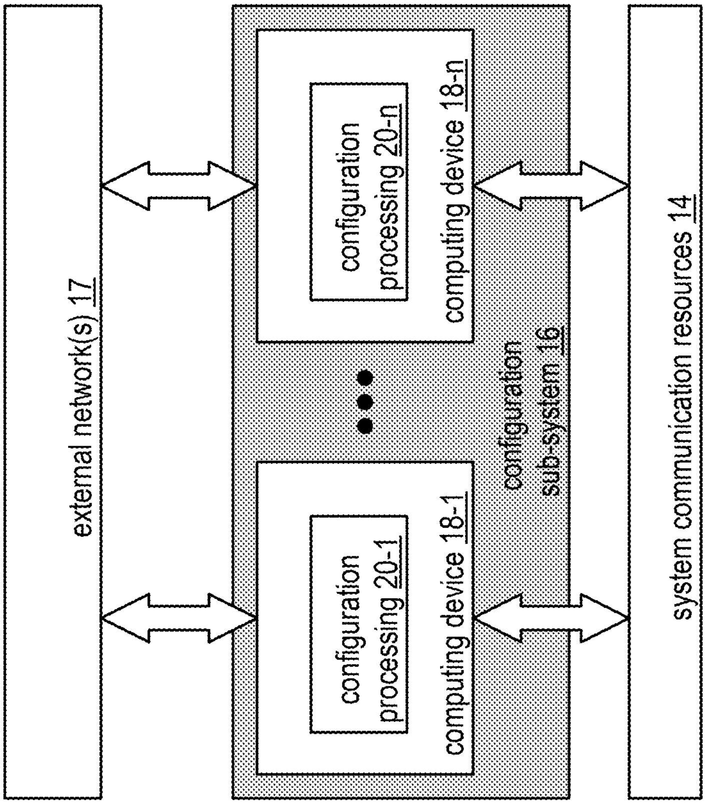
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through **18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1**A.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through **18-*n*. A computing device includes a bulk data processing function (e.g., 27-1) for receiving a table from a network storage system 21 (e.g., a server, a cloud storage service, etc.) and processing it for storage as generally discussed with reference to FIG. 1**A.

The parallelized ingress sub-system 24 includes a plurality of ingress data sub-systems 25-1 through **25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10** at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
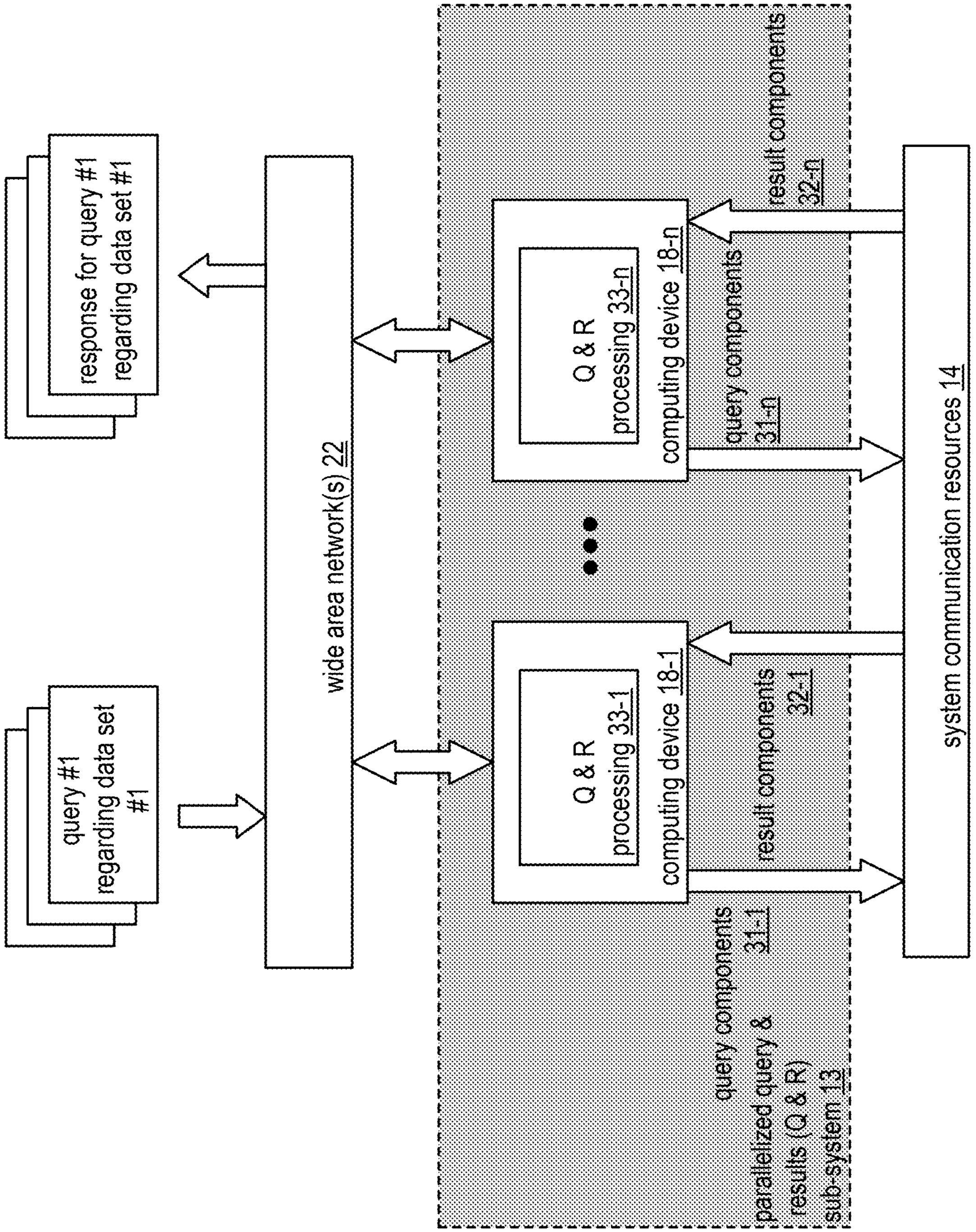
FIG. 5 is a schematic block diagram of an embodiment of a parallelized query and response (Q & R) sub-system in accordance with various embodiments.

FIG. 5 is a schematic block diagram of an embodiment of a parallelized query and results sub-system 13 that includes a plurality of computing devices 18-1 through **18-*n*. Each of the computing devices executes a query (Q)& response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12**.

Processing resources of the parallelized data store, retrieve, &/or process sub-system 12 processes the components of the optimized plan to produce results components 32-1 through 32-*n*. The computing device of the Q & R sub-system 13 processes the result components to produce a query response.

The Q & R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
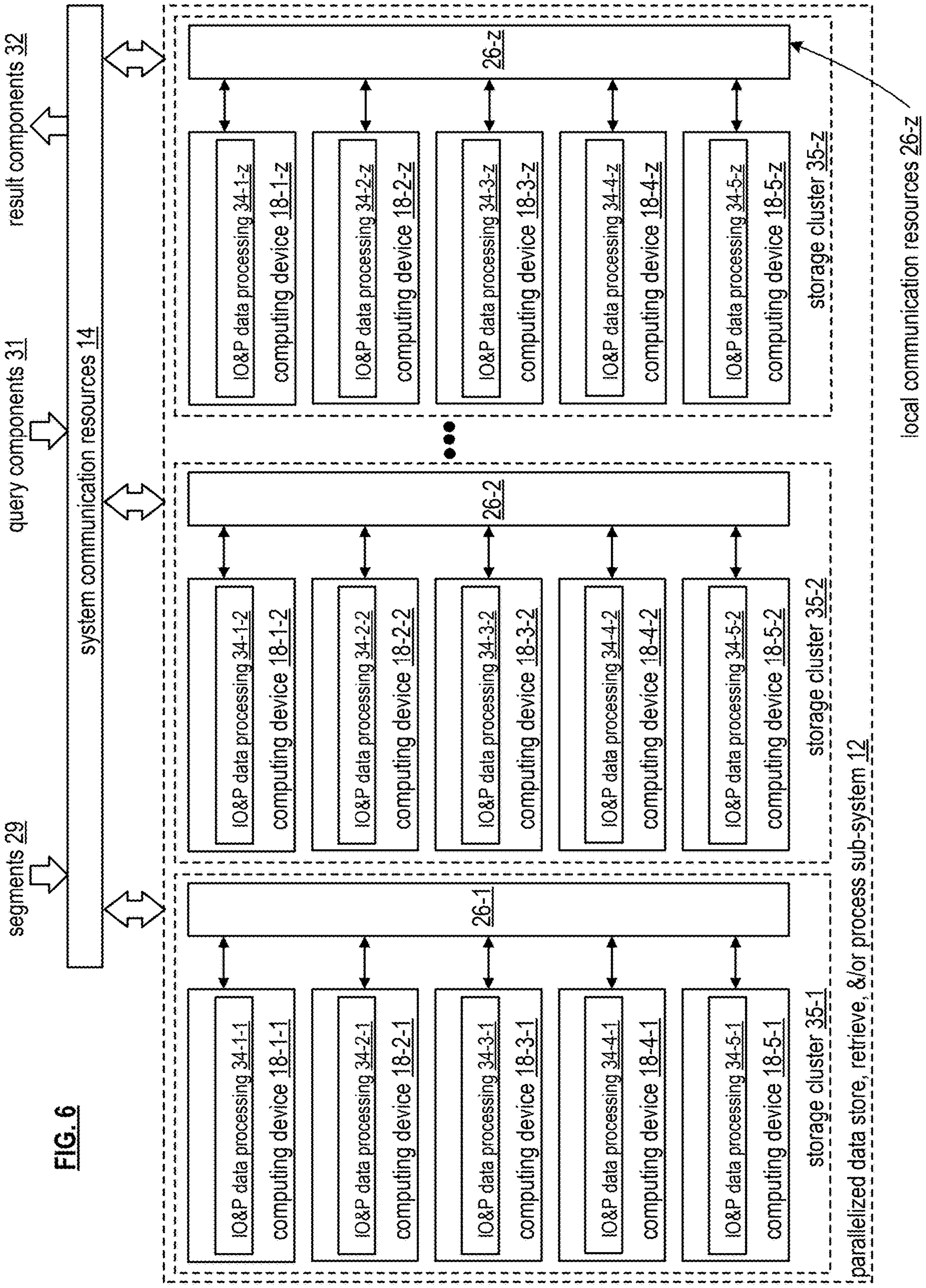
FIG. 6 is a schematic block diagram of an embodiment of a parallelized data store, retrieve, and/or process (IO & P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO & P) processing function 34-1 through 34-5 to store and process data.

The number of computing devices in a storage cluster corresponds to the number of segments (e.g., a segment group) in which a data partition is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q & R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
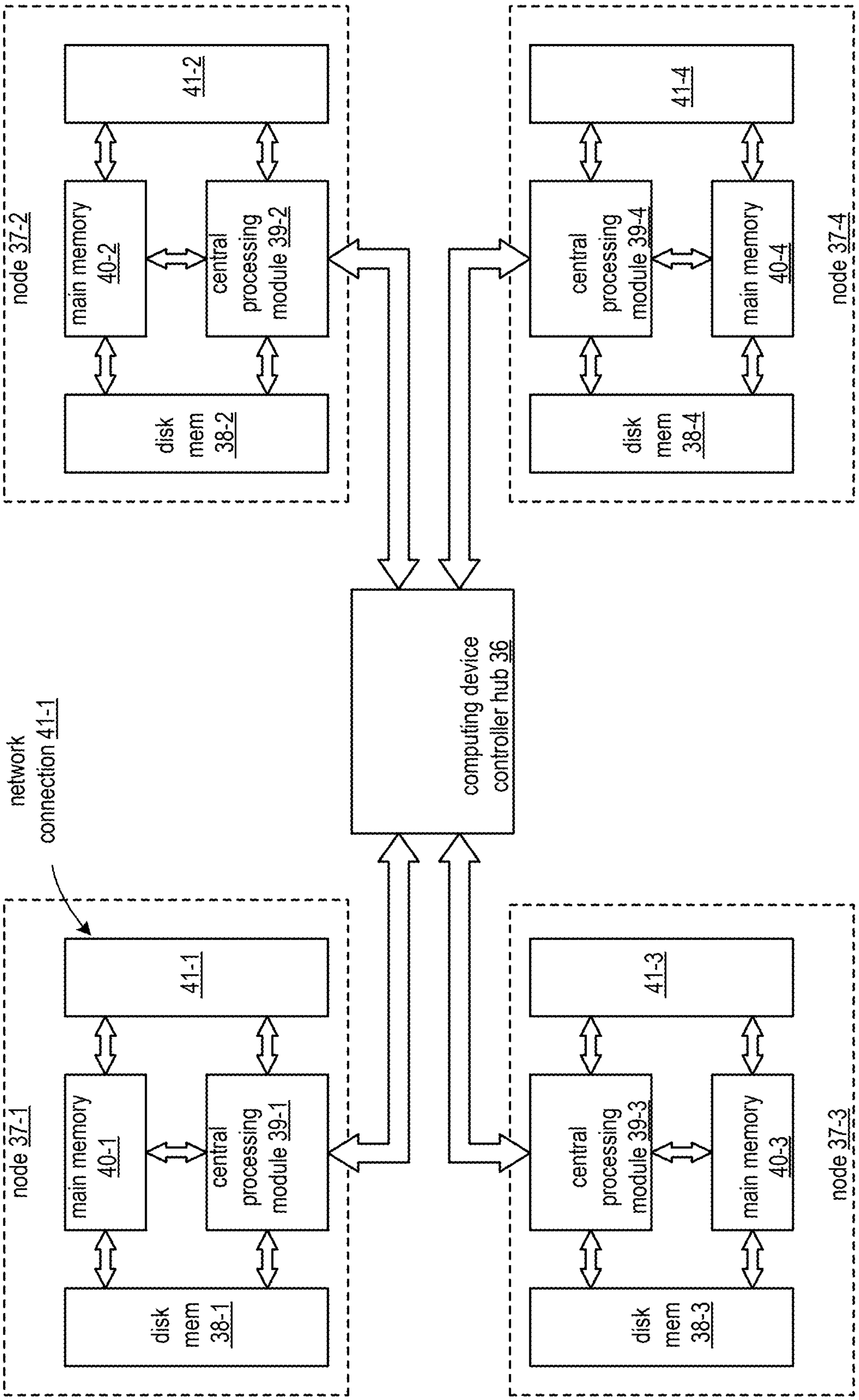
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
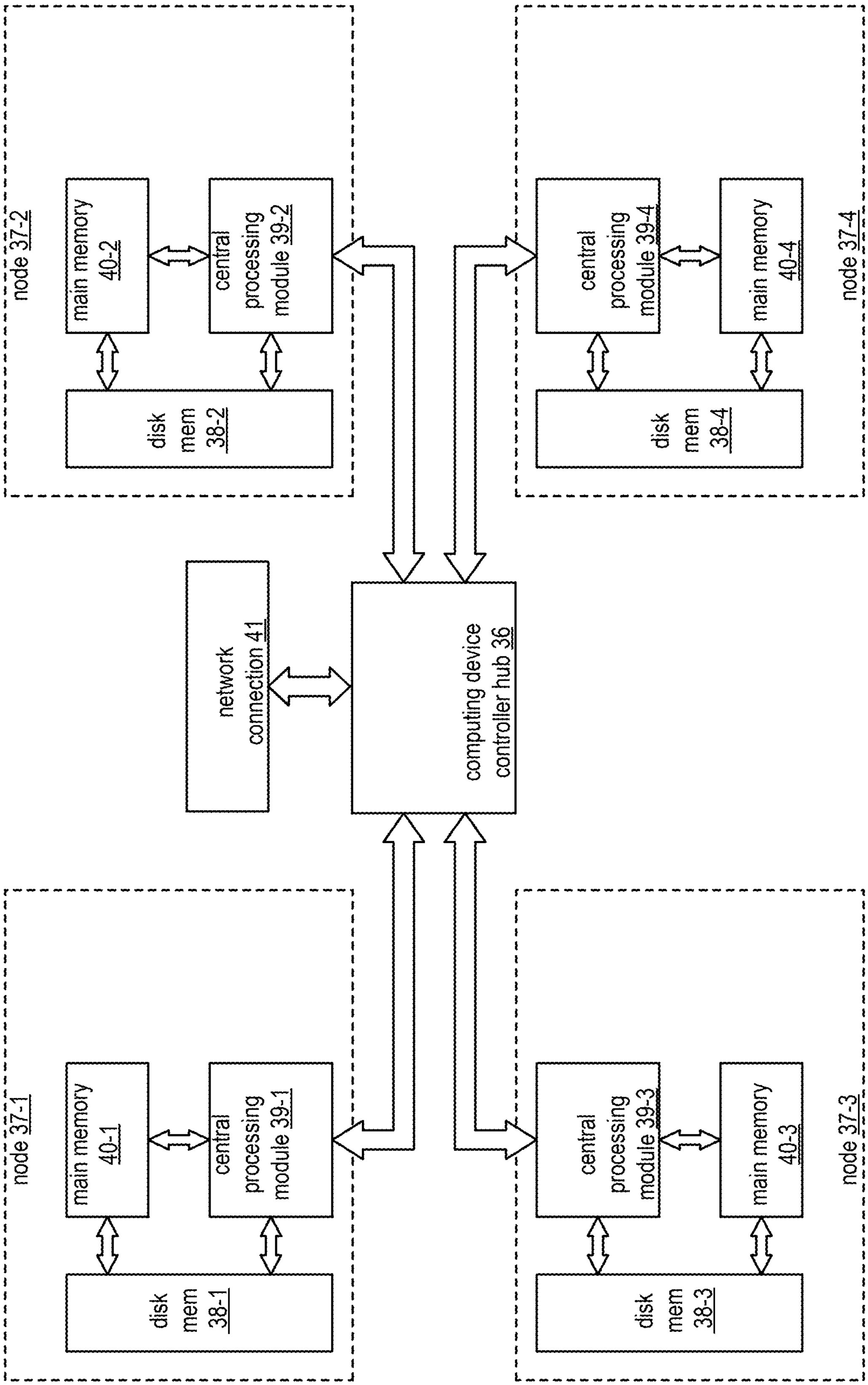
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
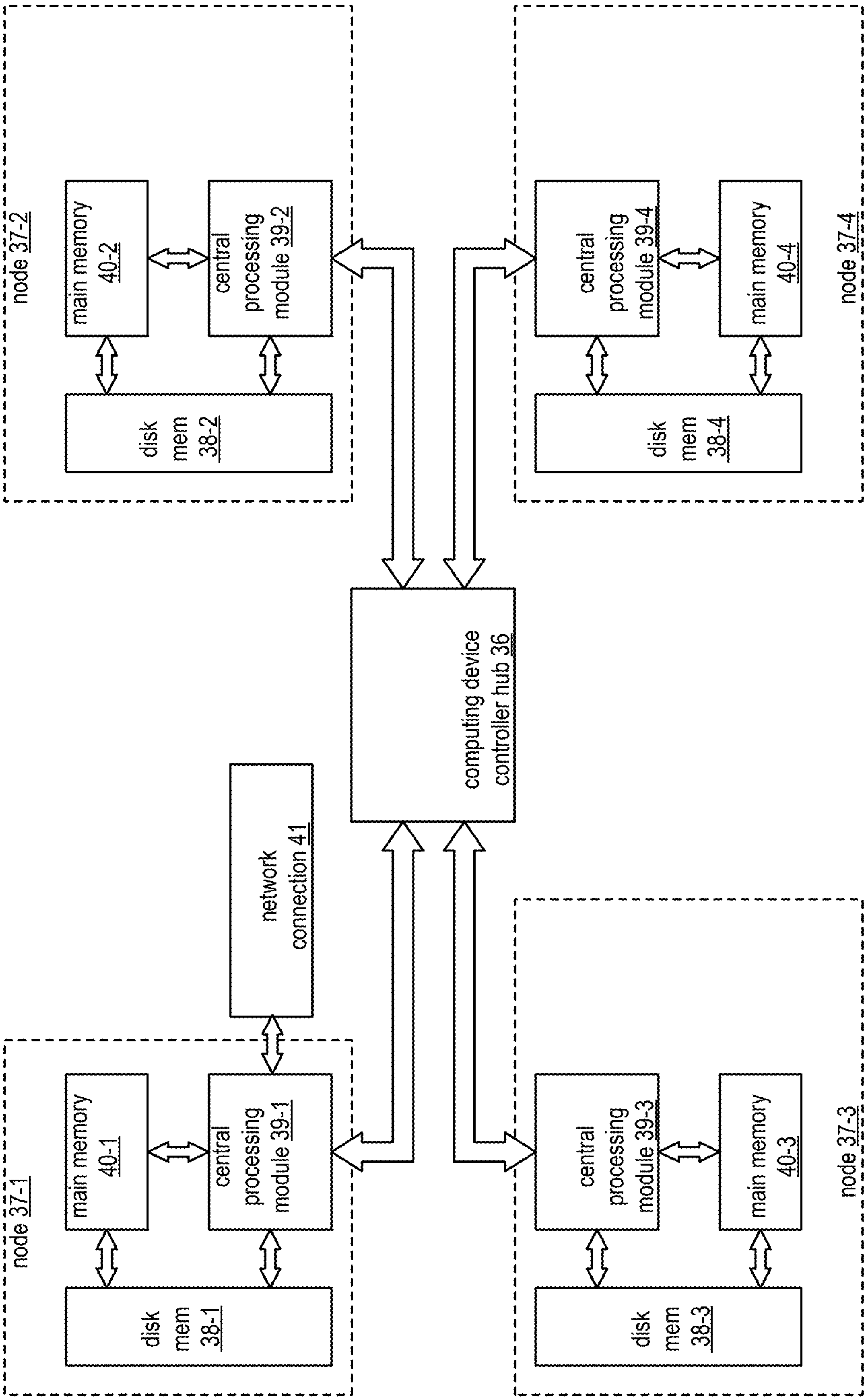
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
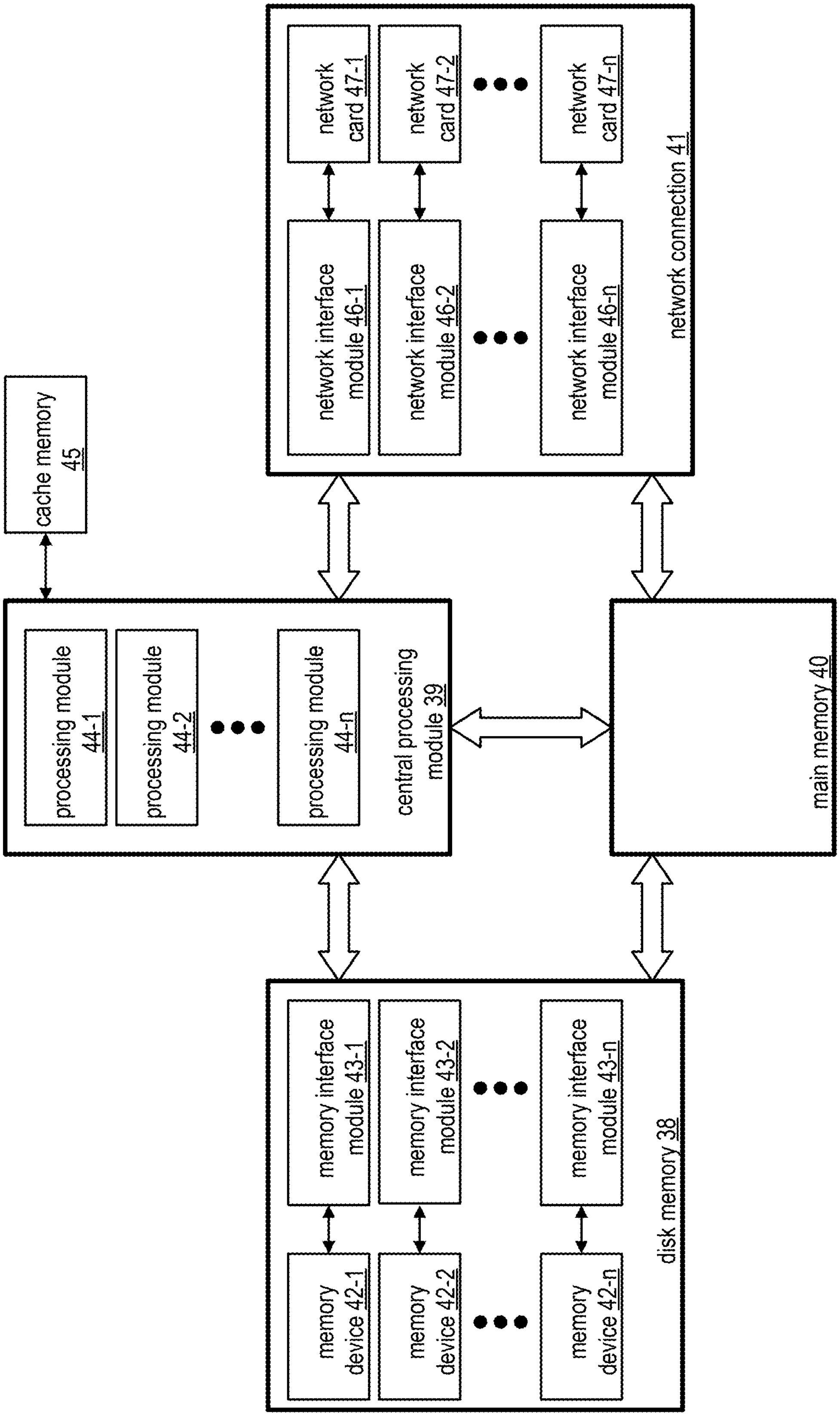
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
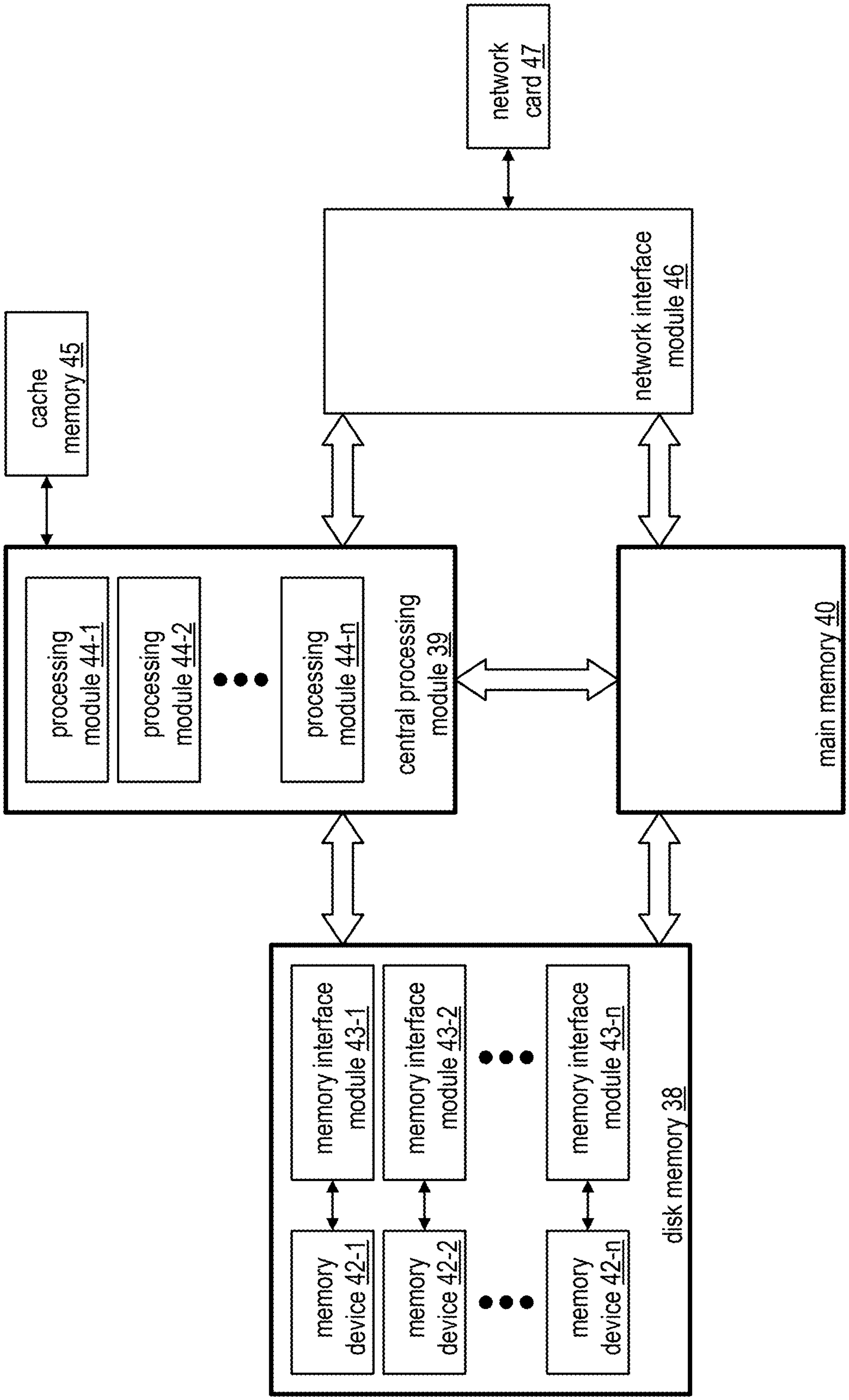
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
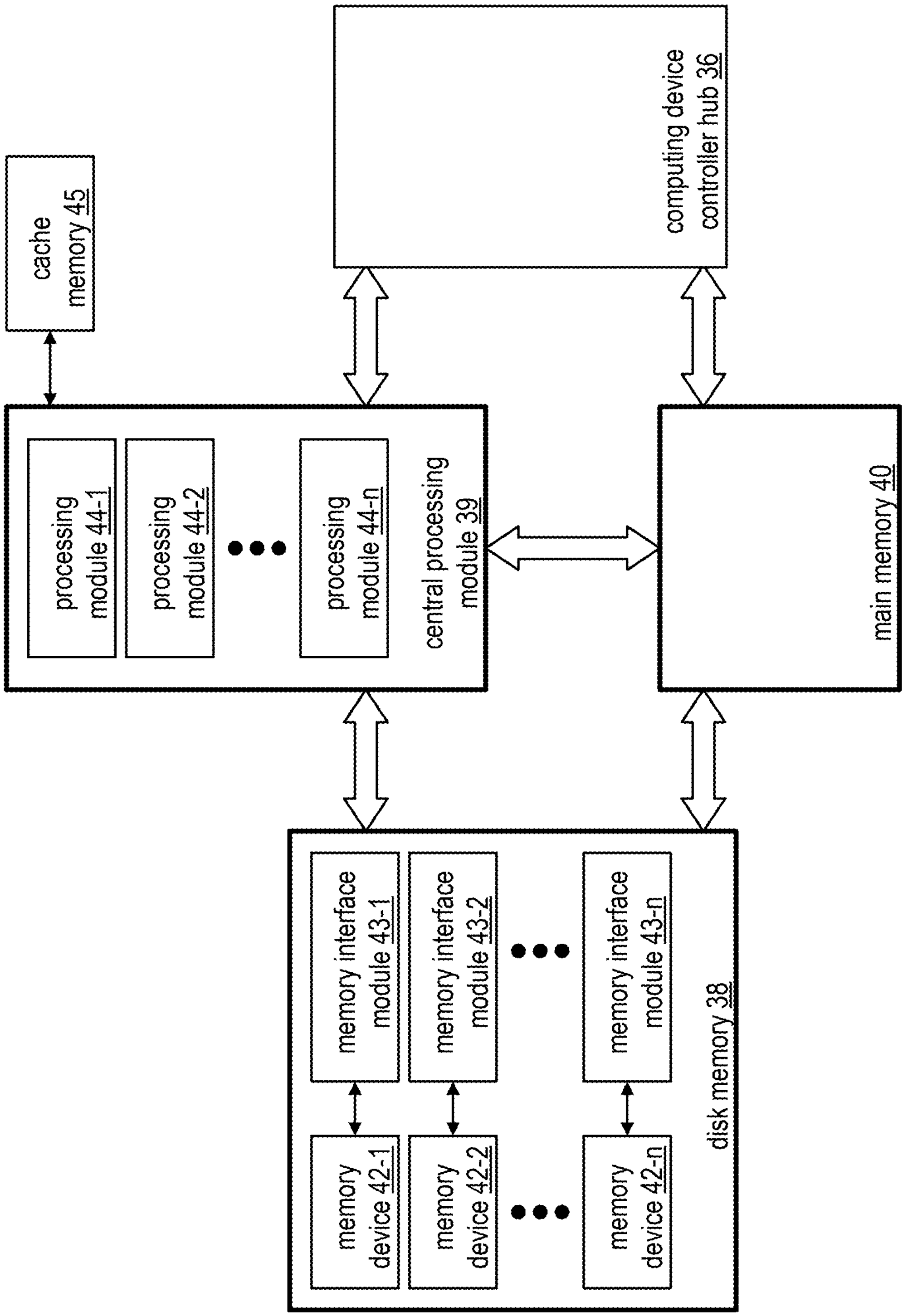
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
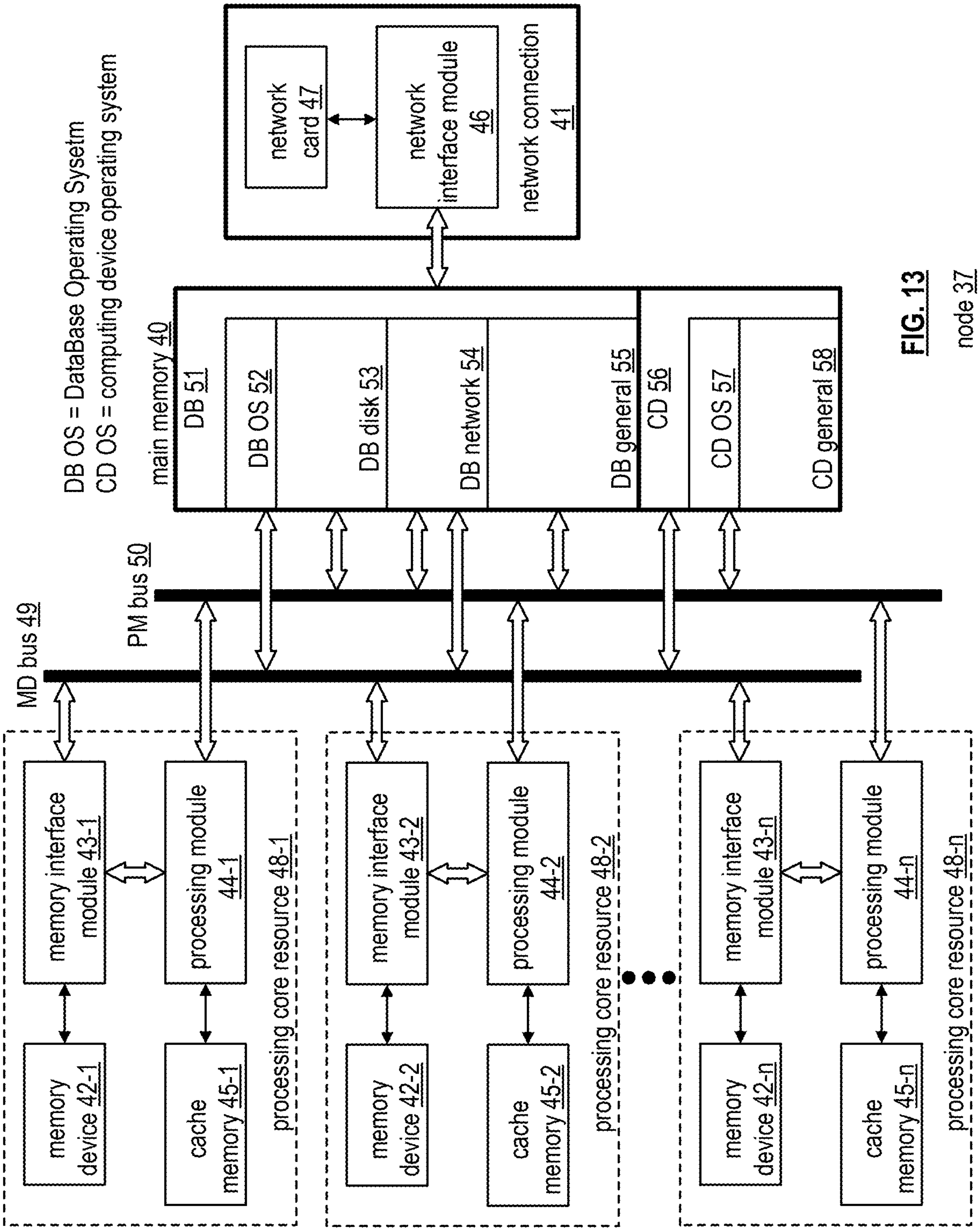
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
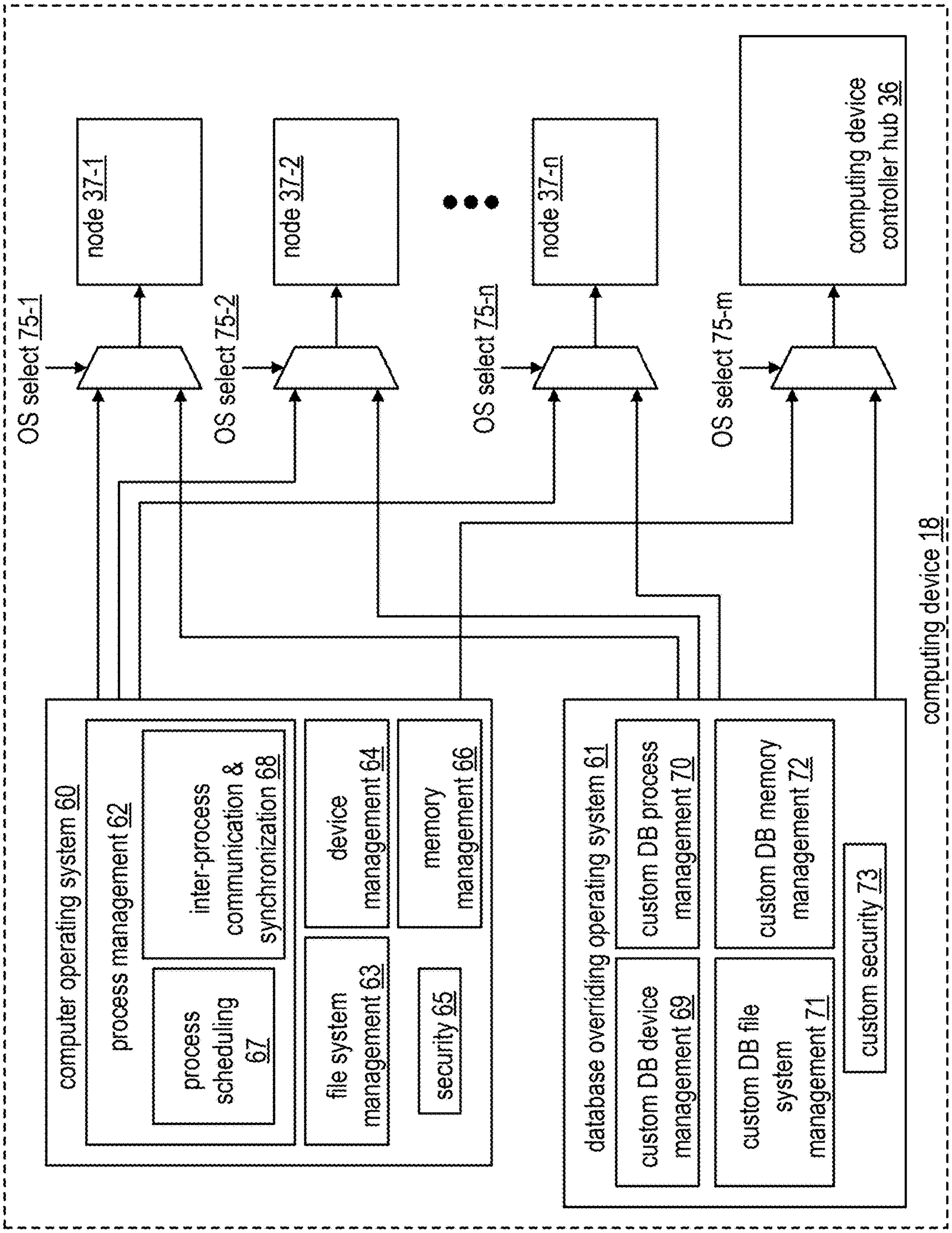
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n* when communicating with nodes 37-1 through 37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
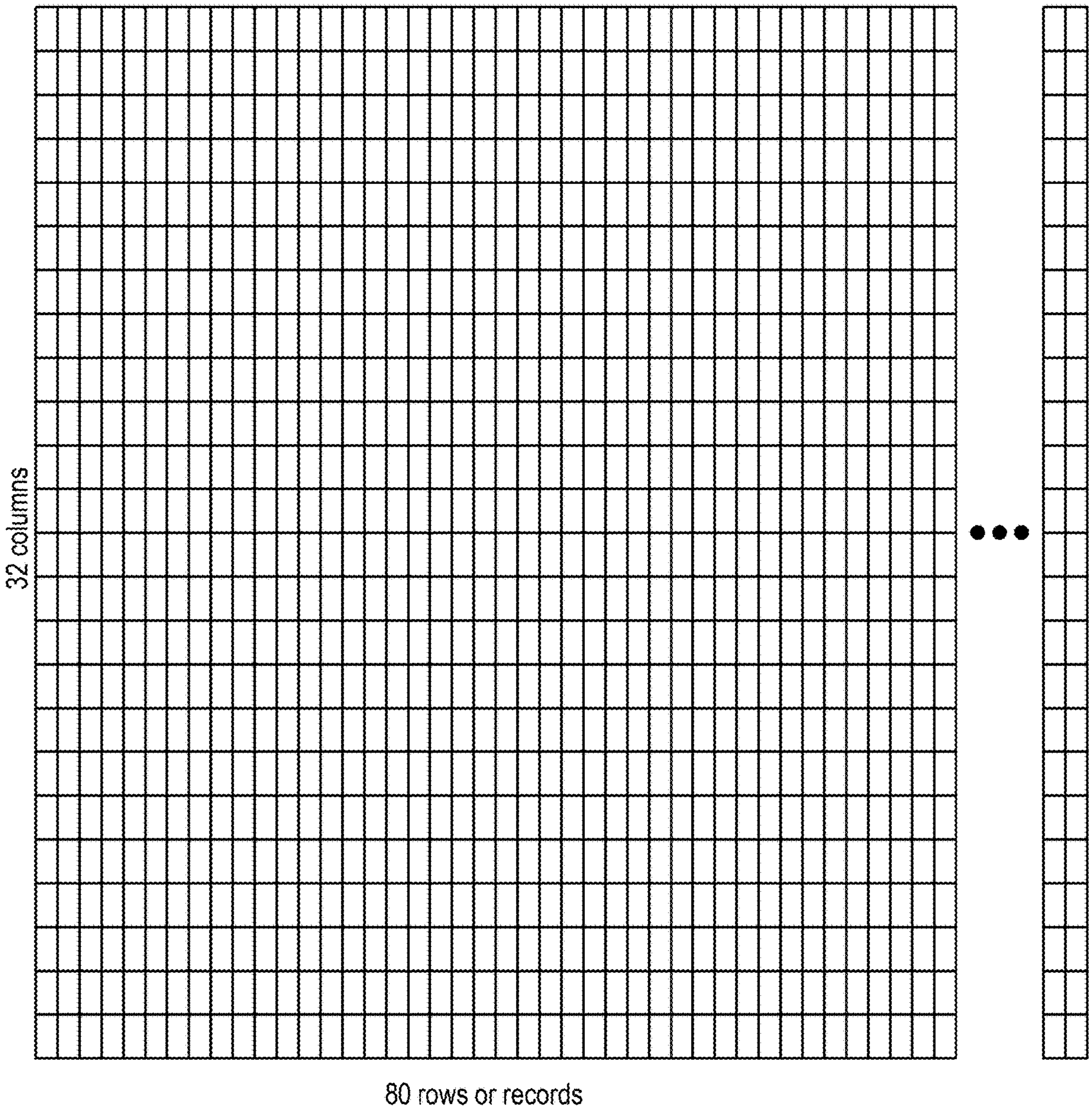
FIGS. 15-23 are schematic block diagrams of an example of processing a table or data set for storage in the database system in accordance with various embodiments.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
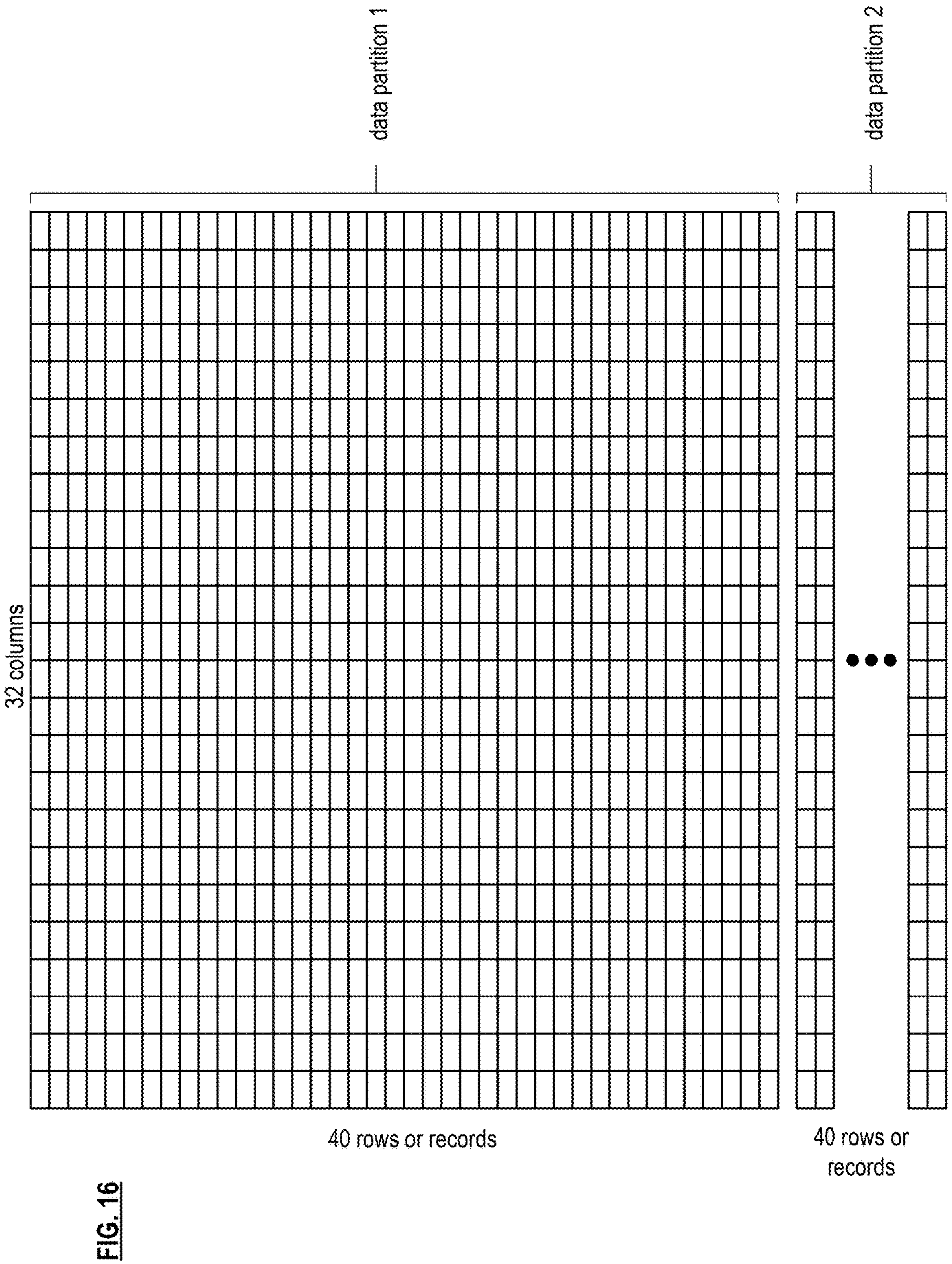

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
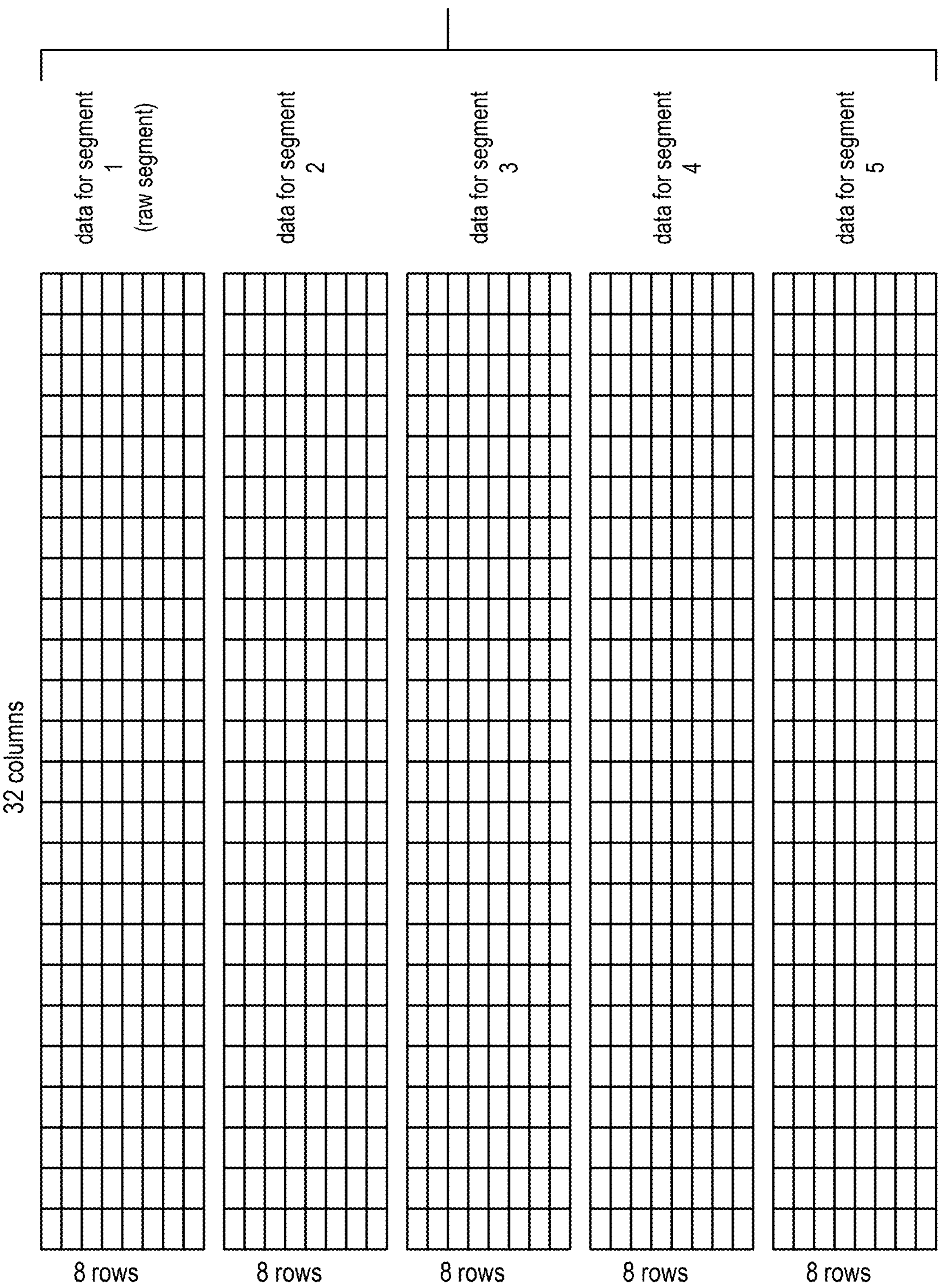

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
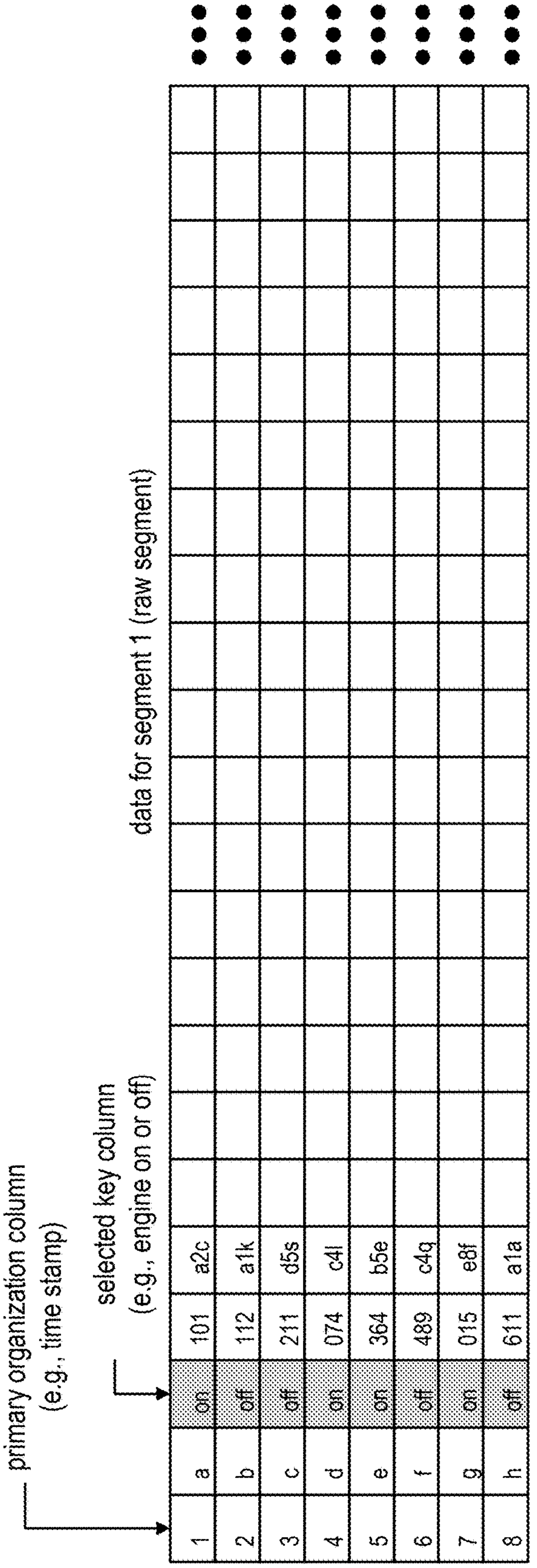

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
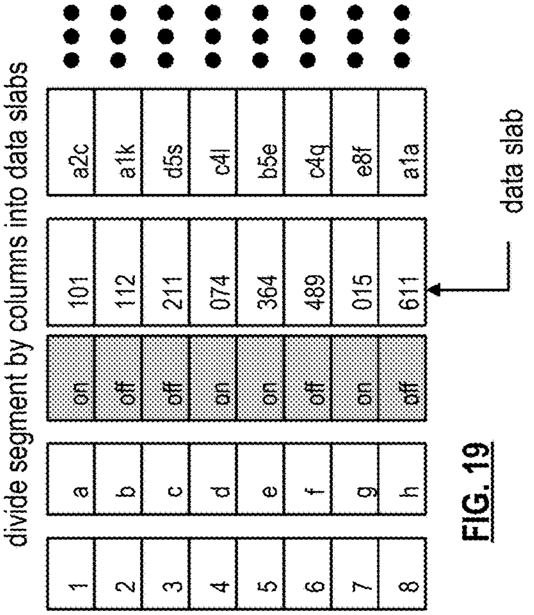

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
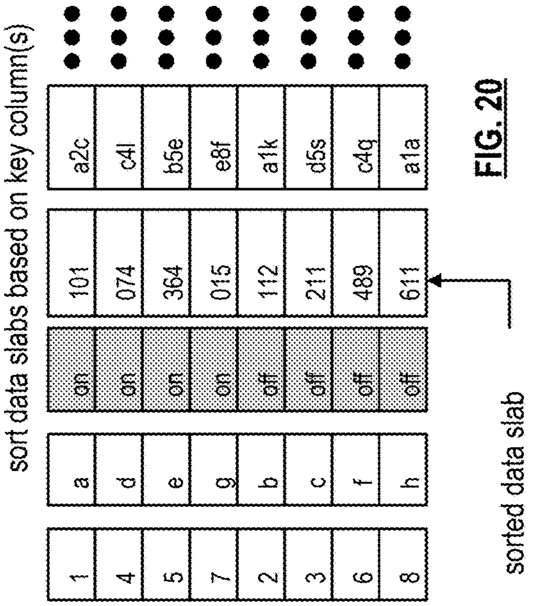

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
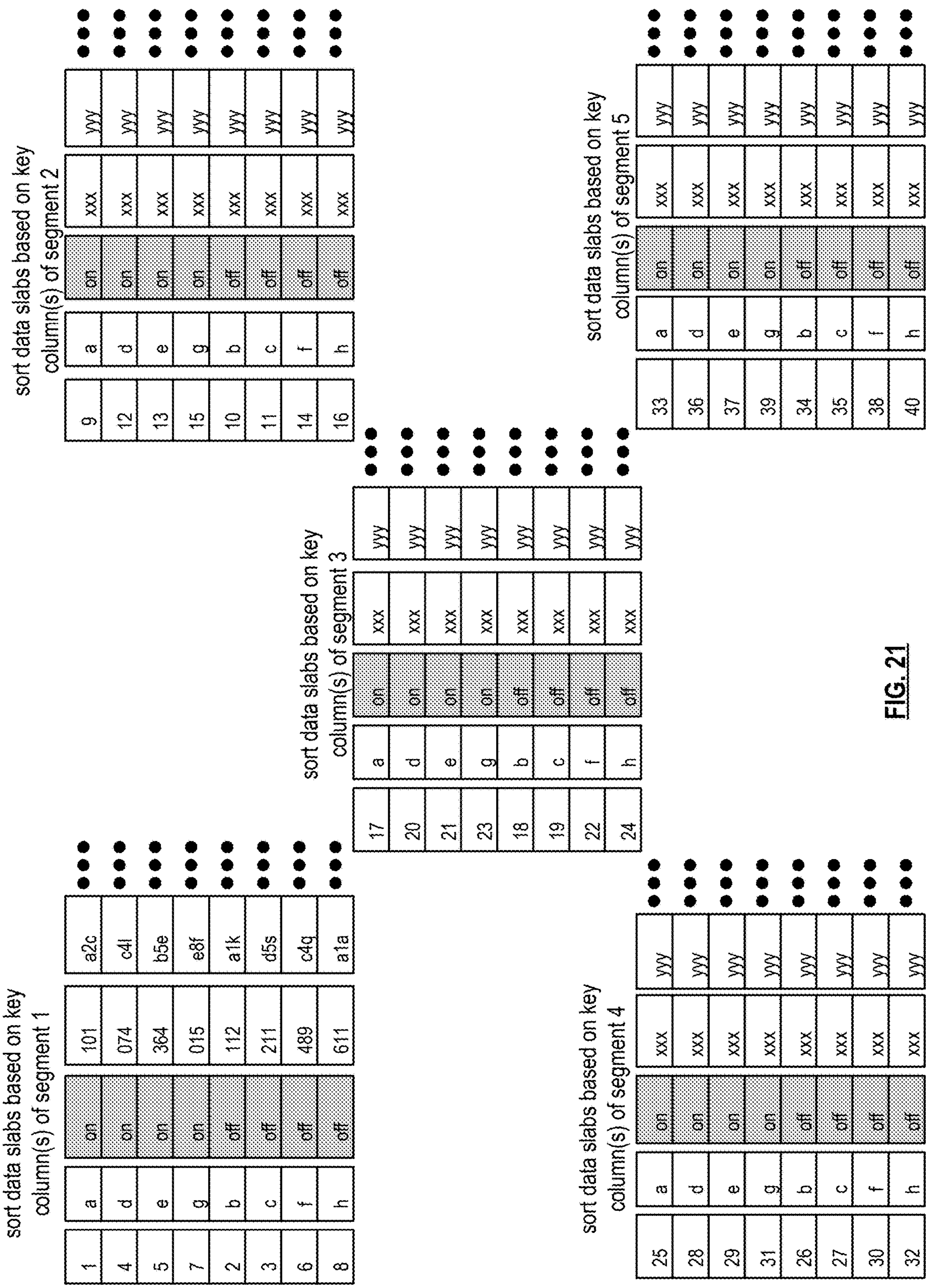

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
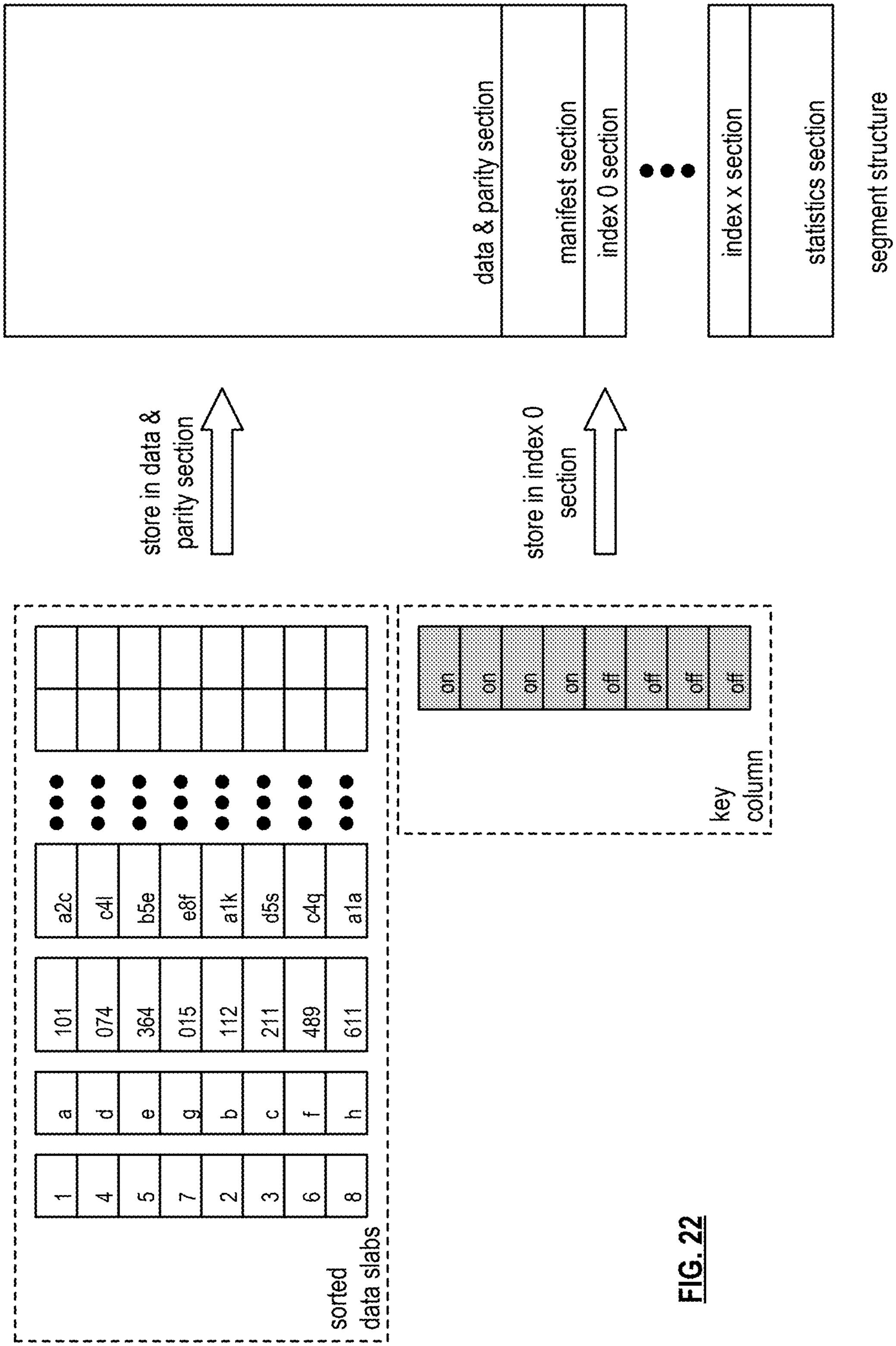

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
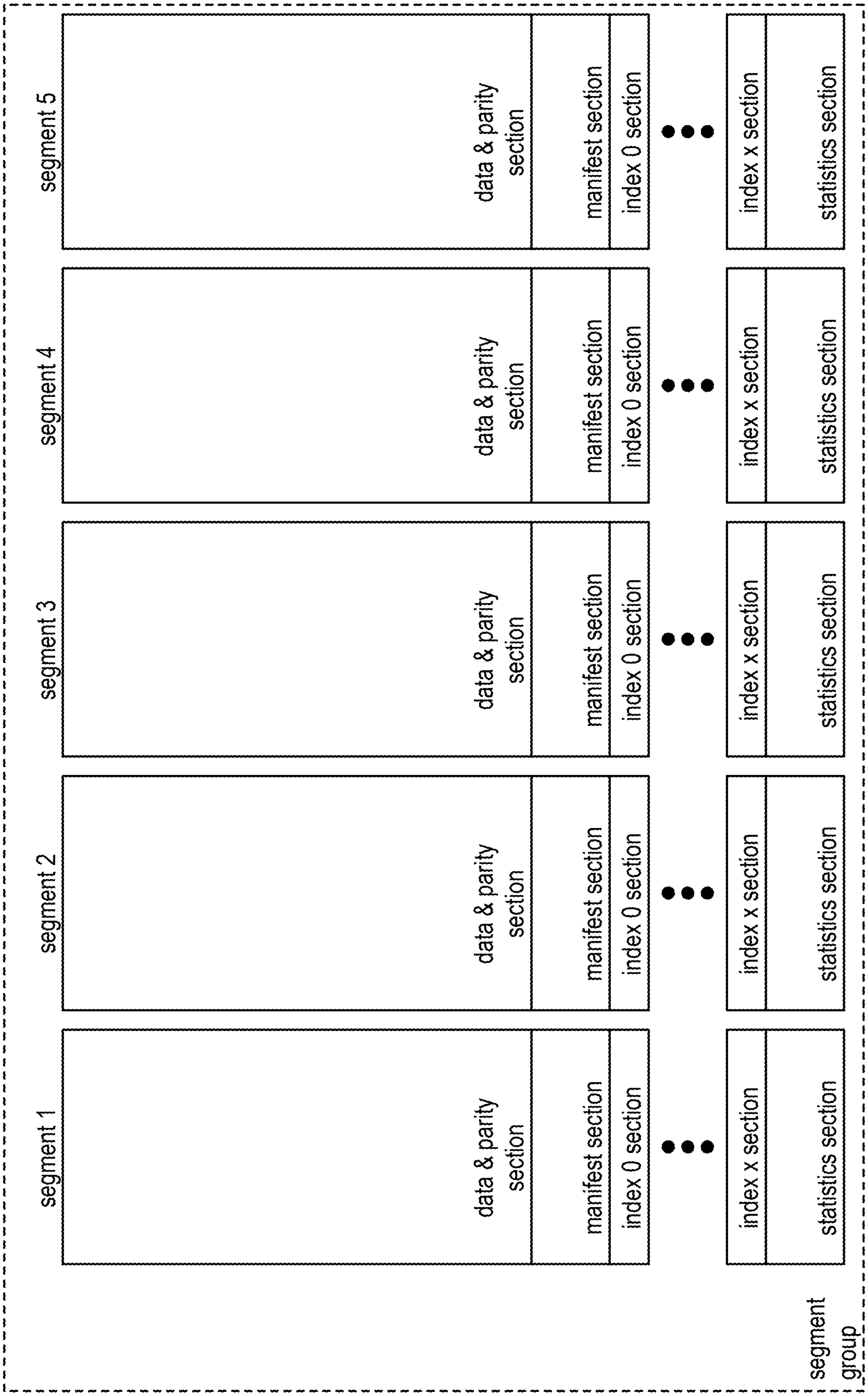

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
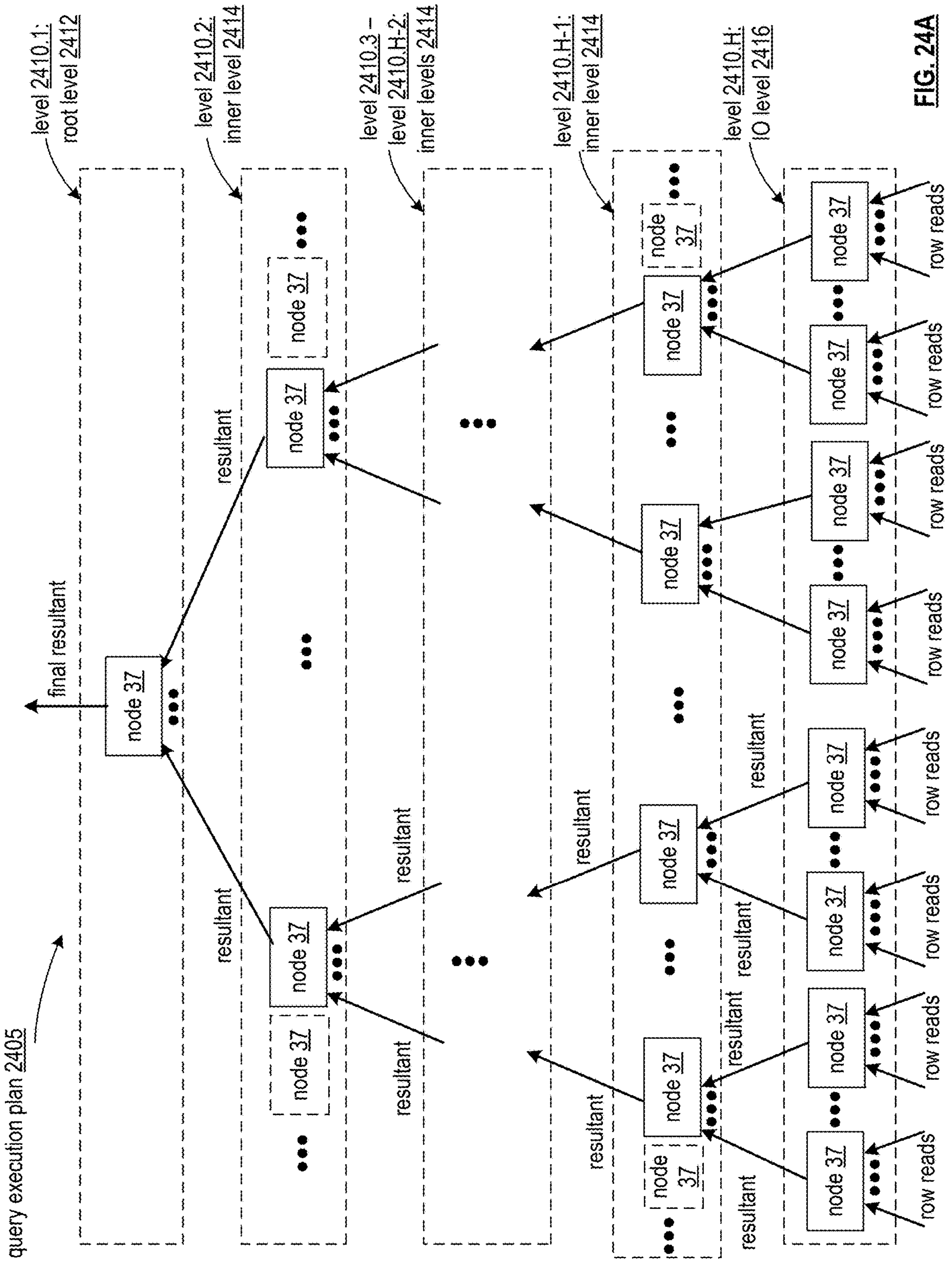
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices **18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414**.

In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined (e.g. as an acyclic directed graph of operators), and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
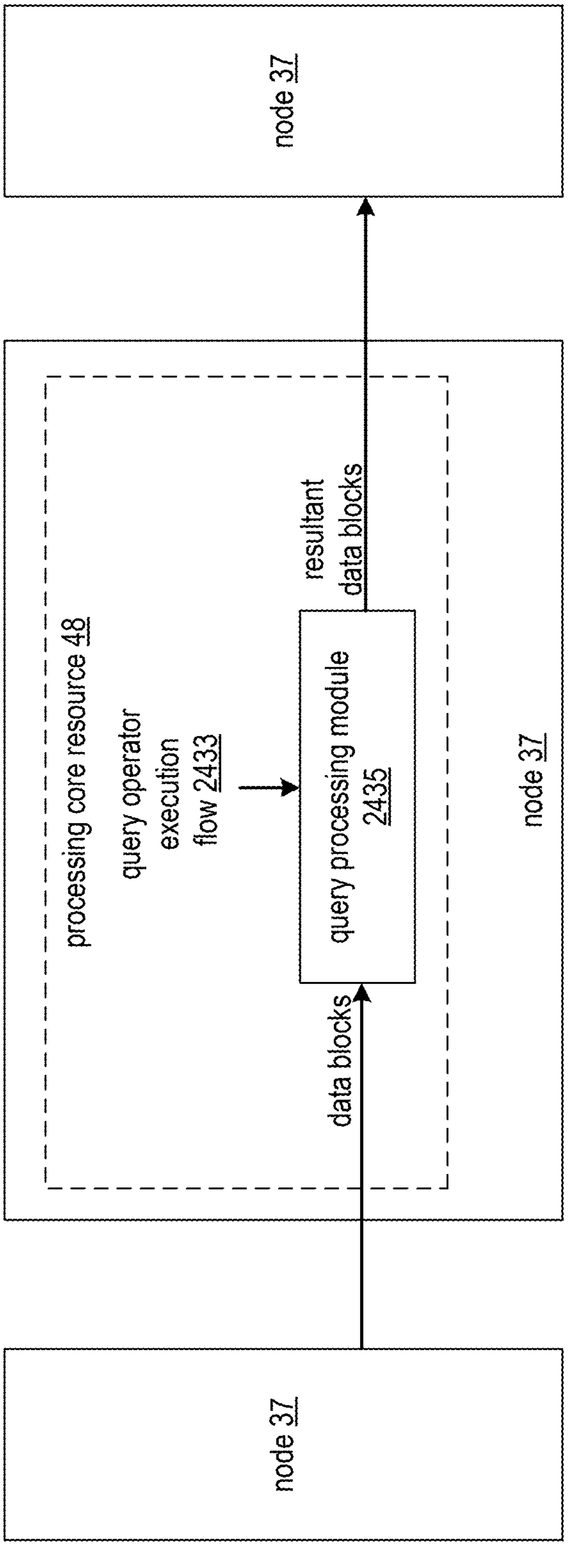
FIGS. 24B-24D are schematic block diagrams of embodiments of a node that implements a query processing module in accordance with various embodiments.

FIG. 24B illustrates an embodiment of a node 37 executing a query in accordance with the quay execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433 (e.g. as an acyclic directed graph of operators). In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
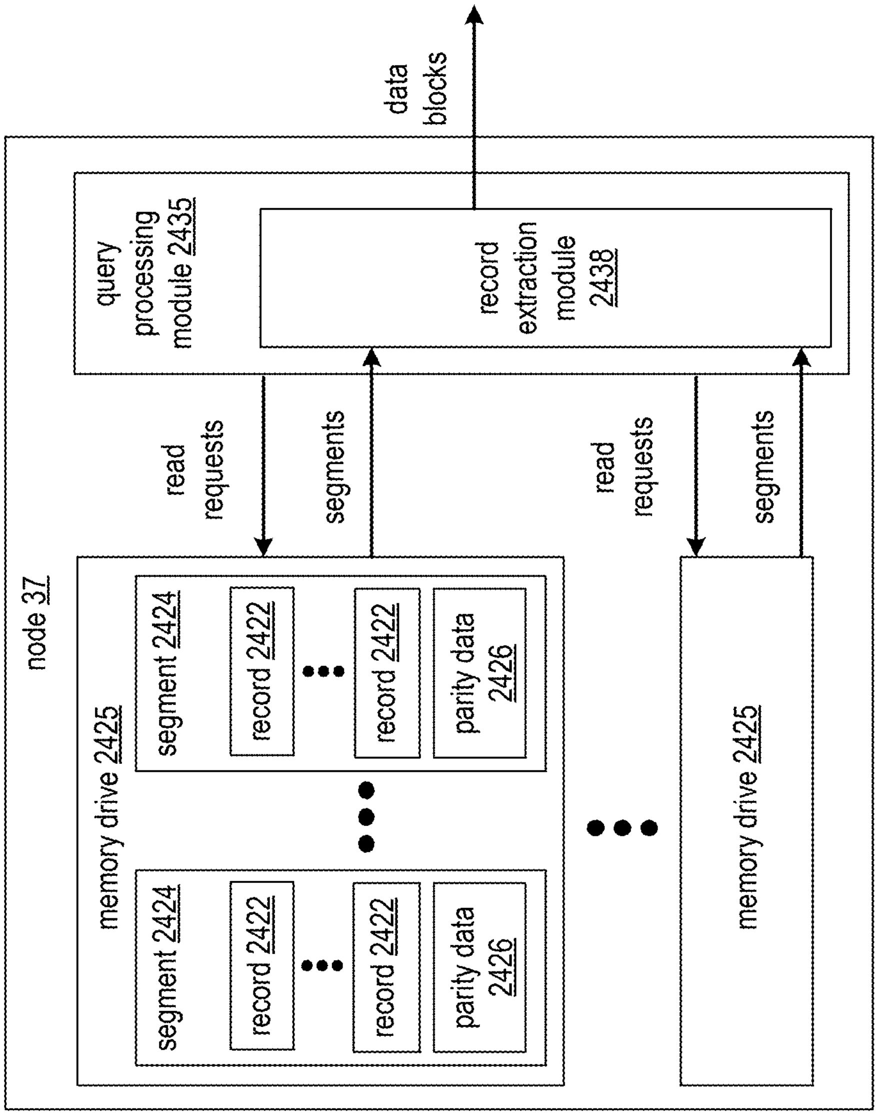

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37*s* disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
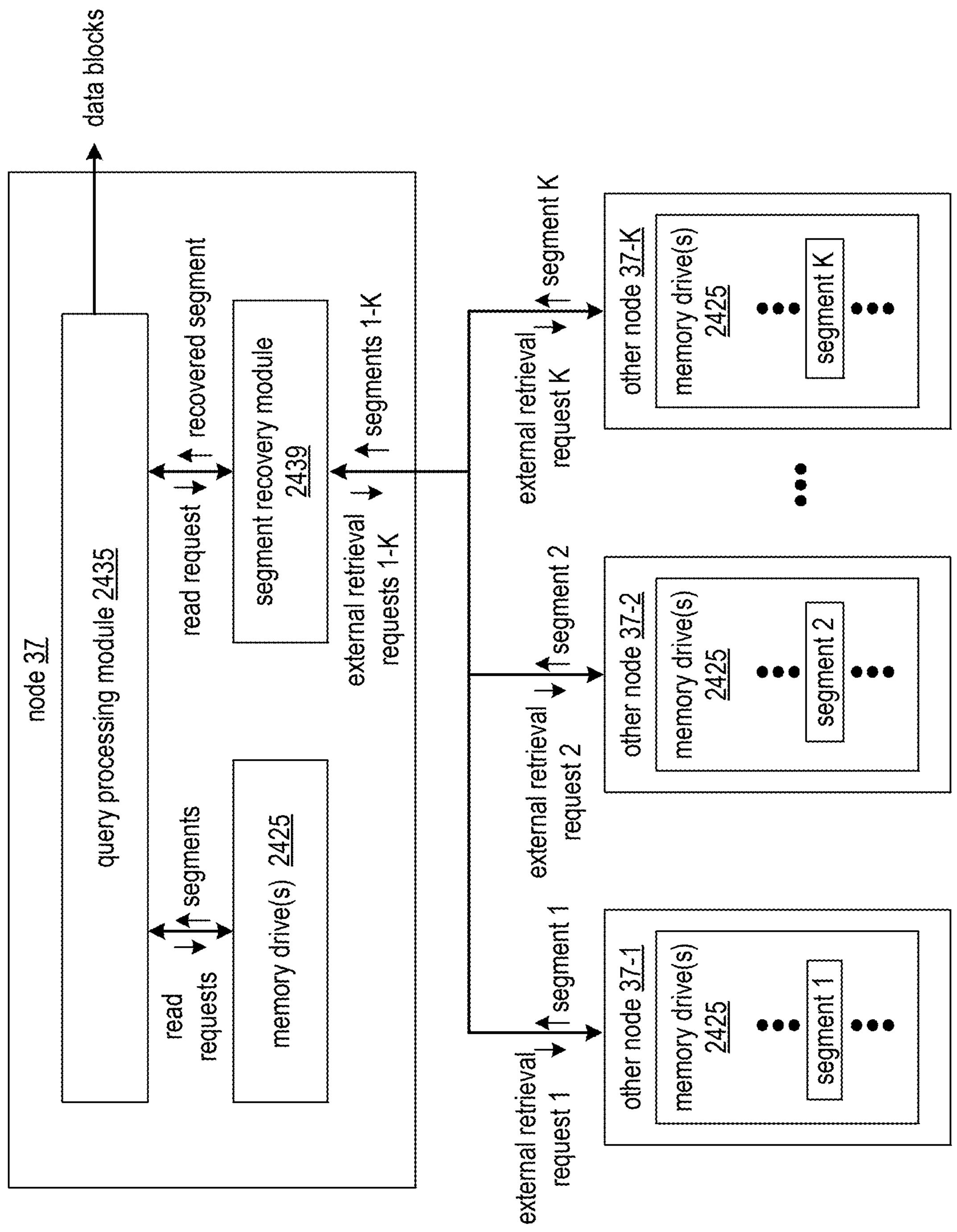

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
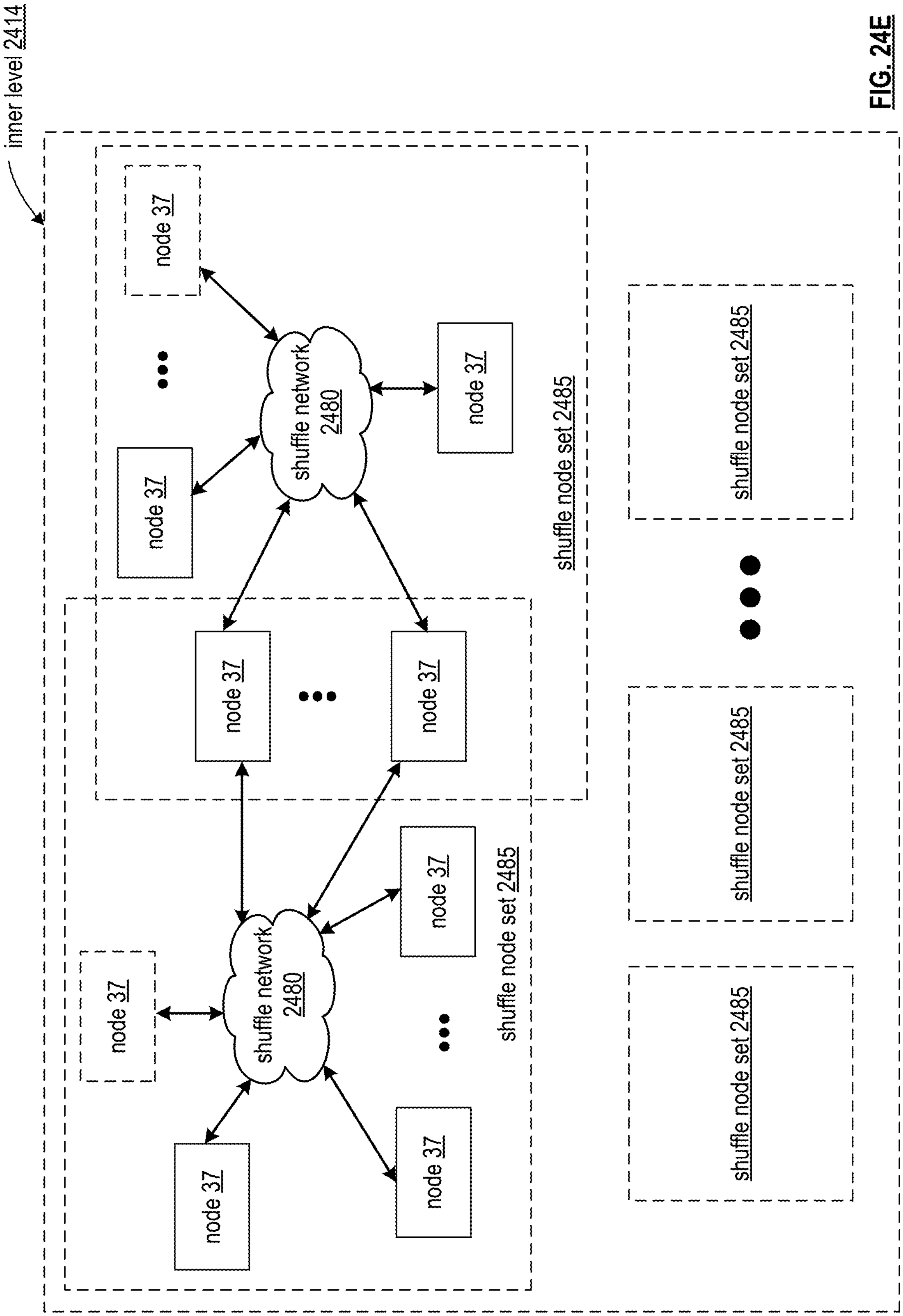
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were accessed in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
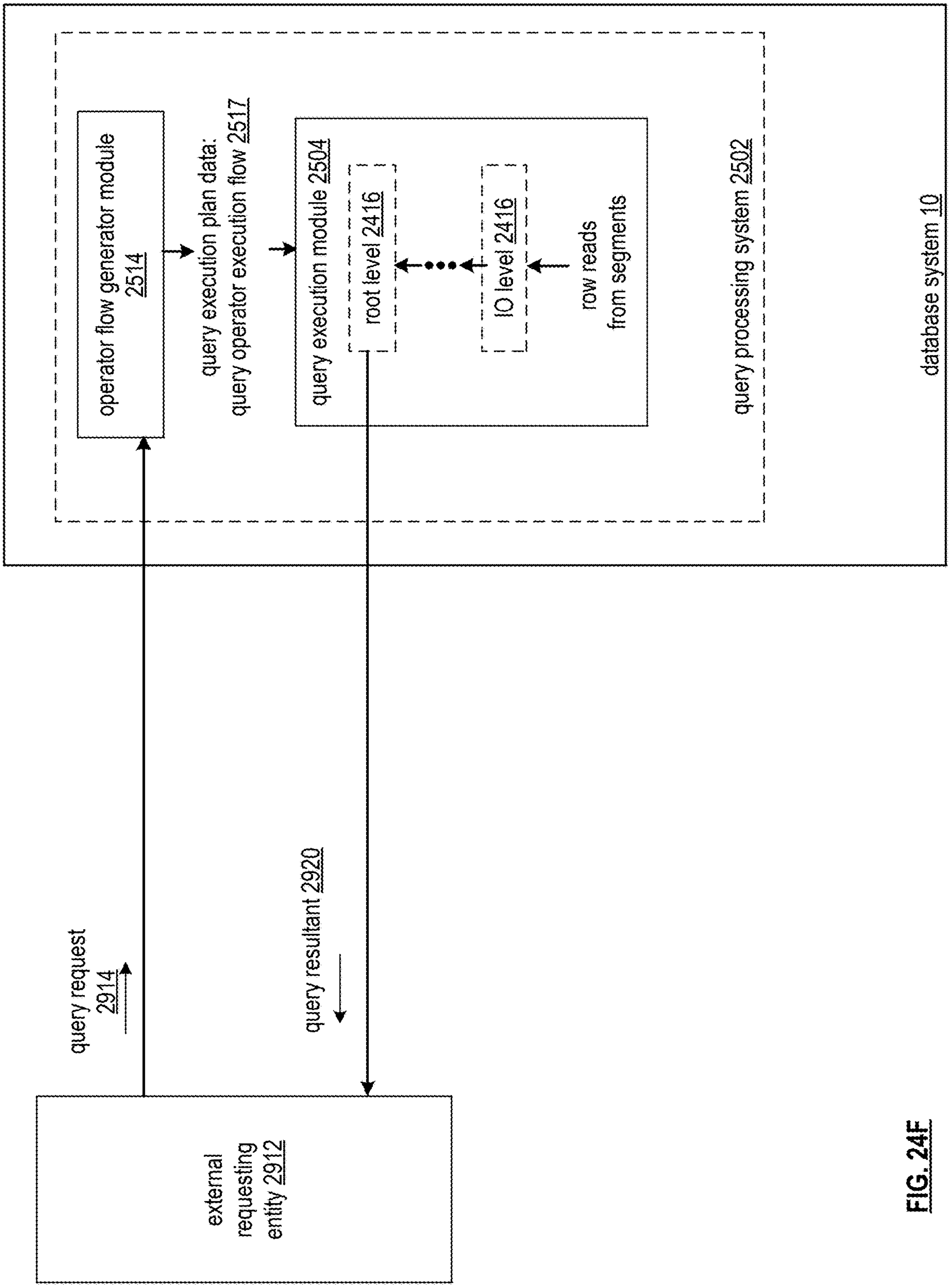
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2914. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2914 for execution via the database system 10, where the corresponding query resultant 2920 is transmitted back to the computing device, for example, for storage by the computing device and/or for display to the corresponding user via a display device.

As another example, a query is automatically generated for execution via processing resources via a computing device and/or via communication with an external requesting entity implemented via at least one computing device. For example, the query is automatically generated and/or modified from a request generated via user input and/or received from a requesting entity in conjunction with implementing a query generator system, a query optimizer, generative artificial intelligence (AI), and/or other artificial intelligence and/or machine learning techniques. The computing device generates and transmits a corresponding query request 2914 for execution via the database system 10, where the corresponding query resultant 2920 is transmitted back to the computing device, for example, for storage by the computing device, transmission to another system, and/or for display to at least one corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
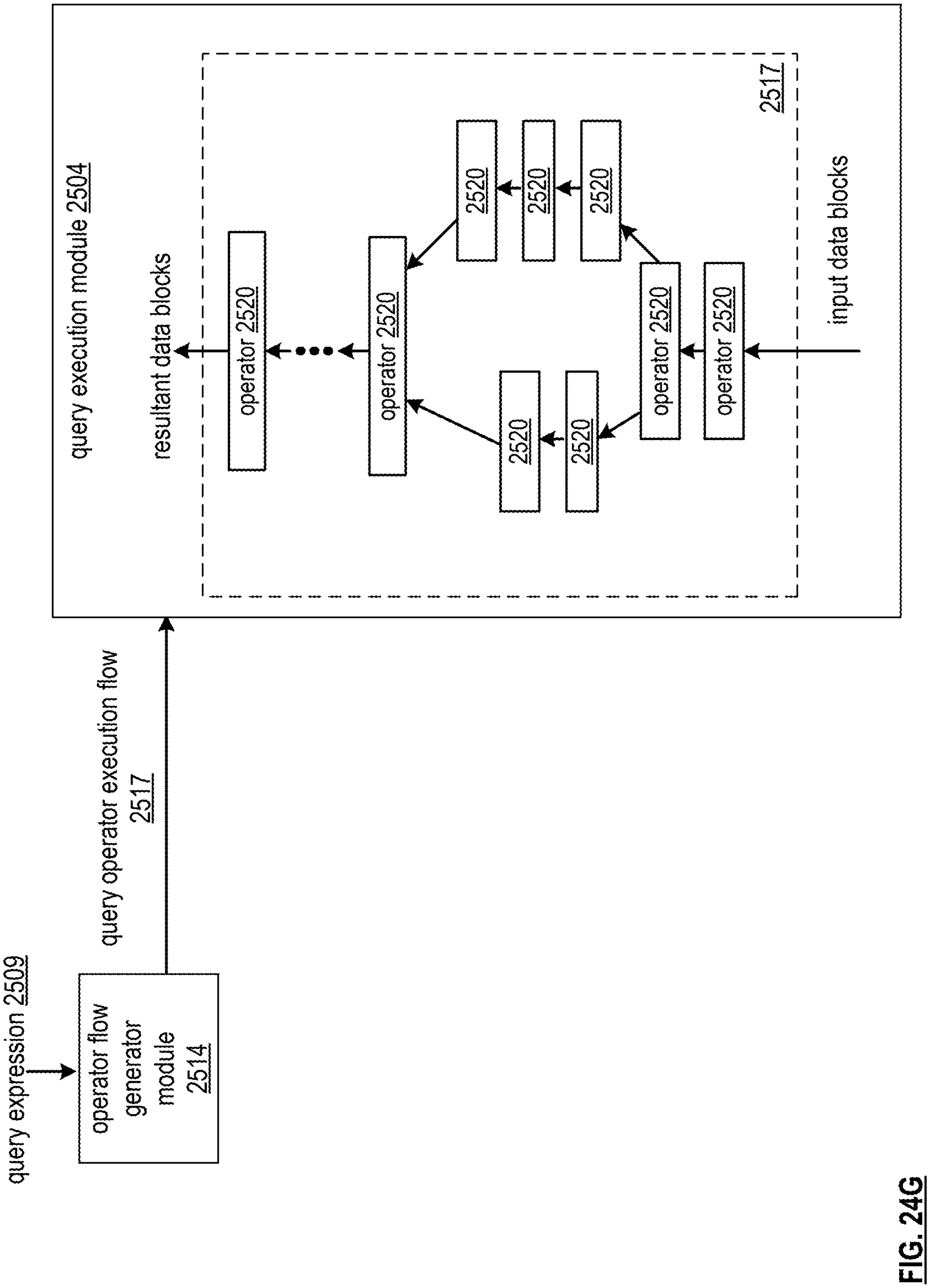
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression (e.g. as an acyclic directed graph of operators), and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
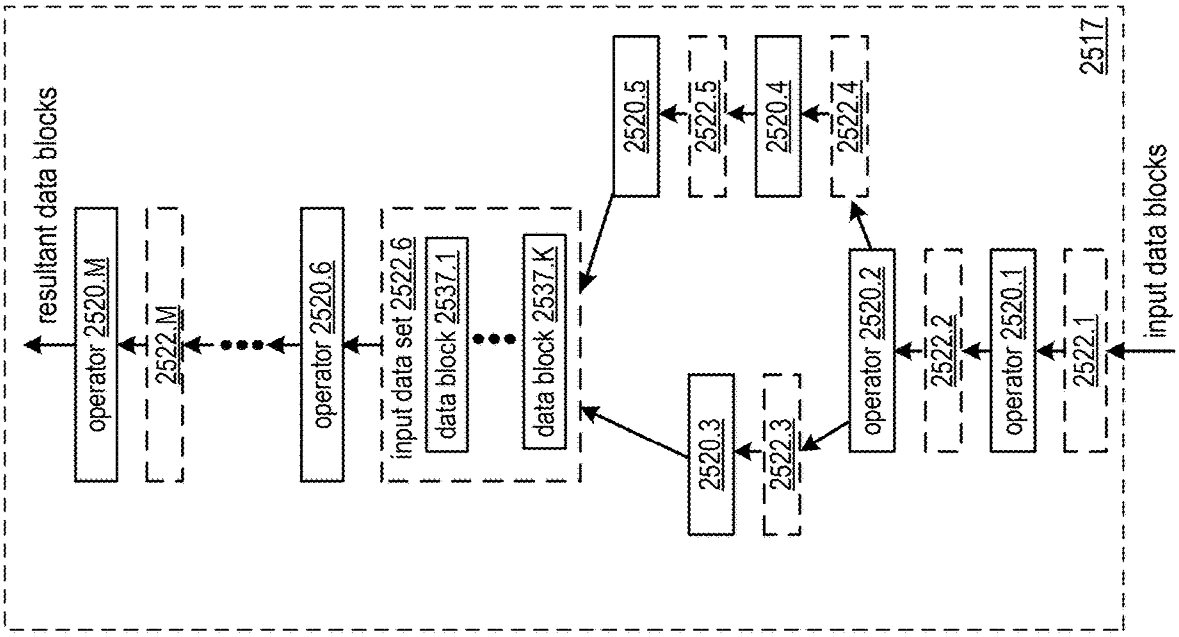
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG.

24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
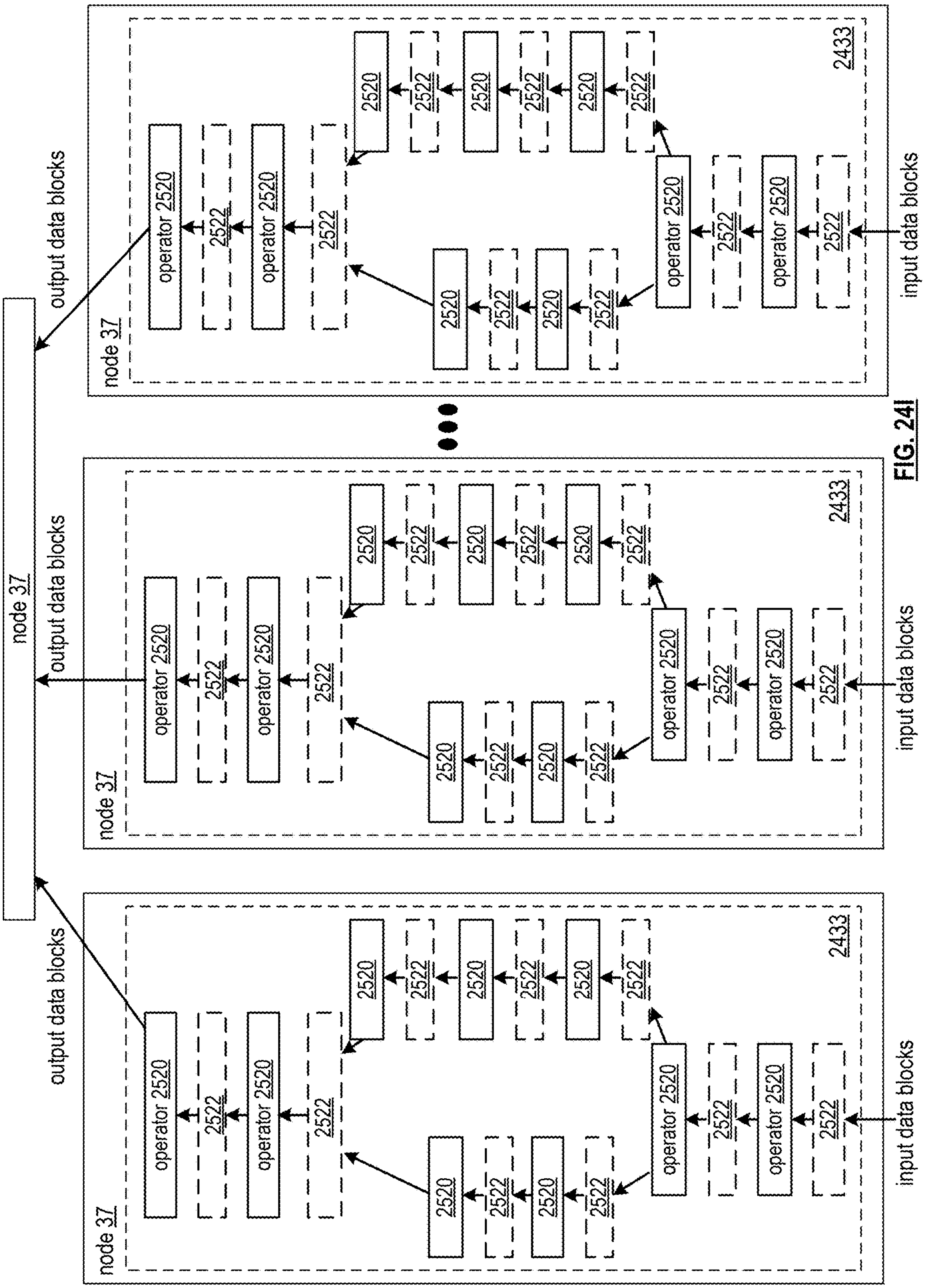
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
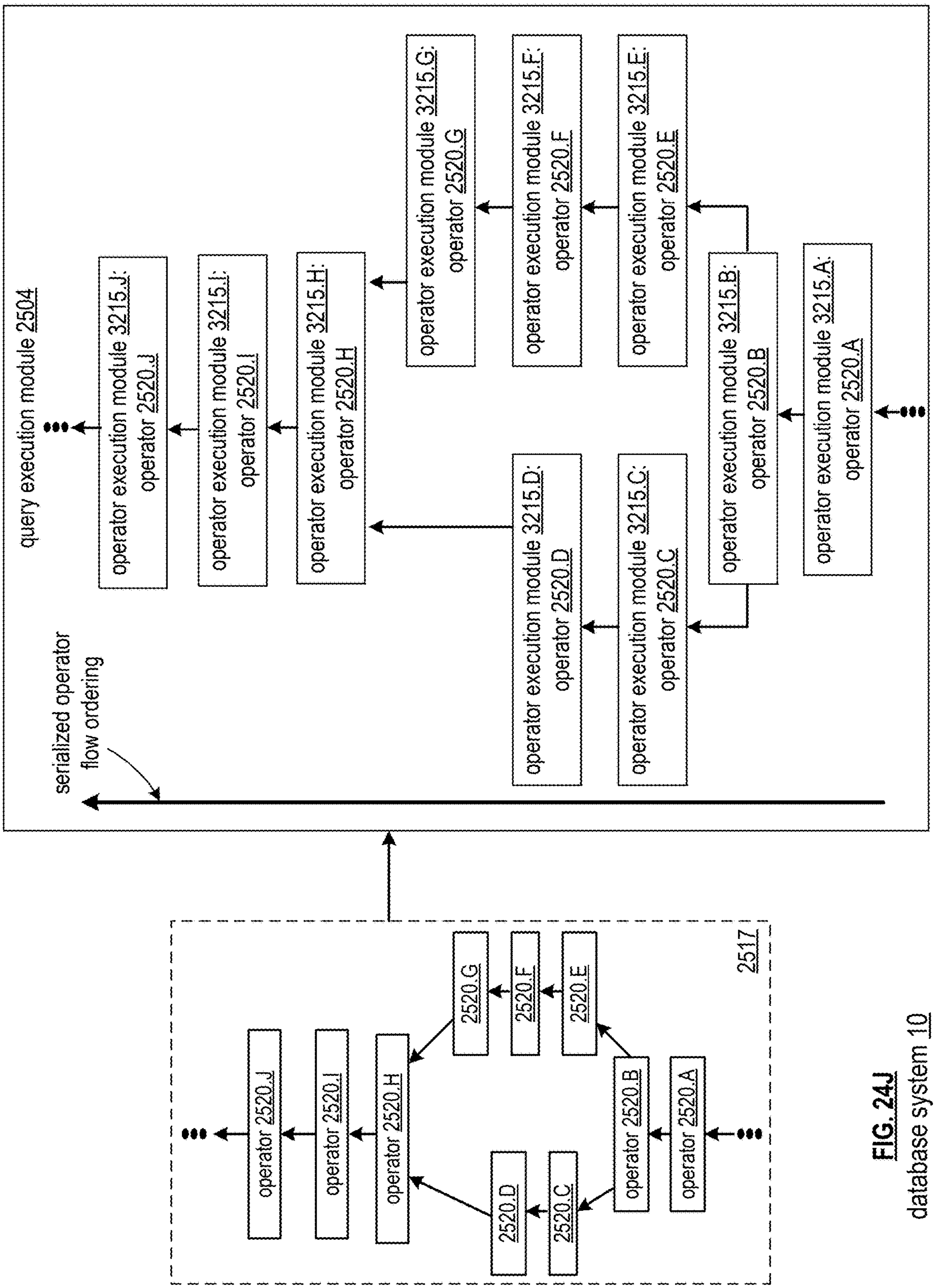
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
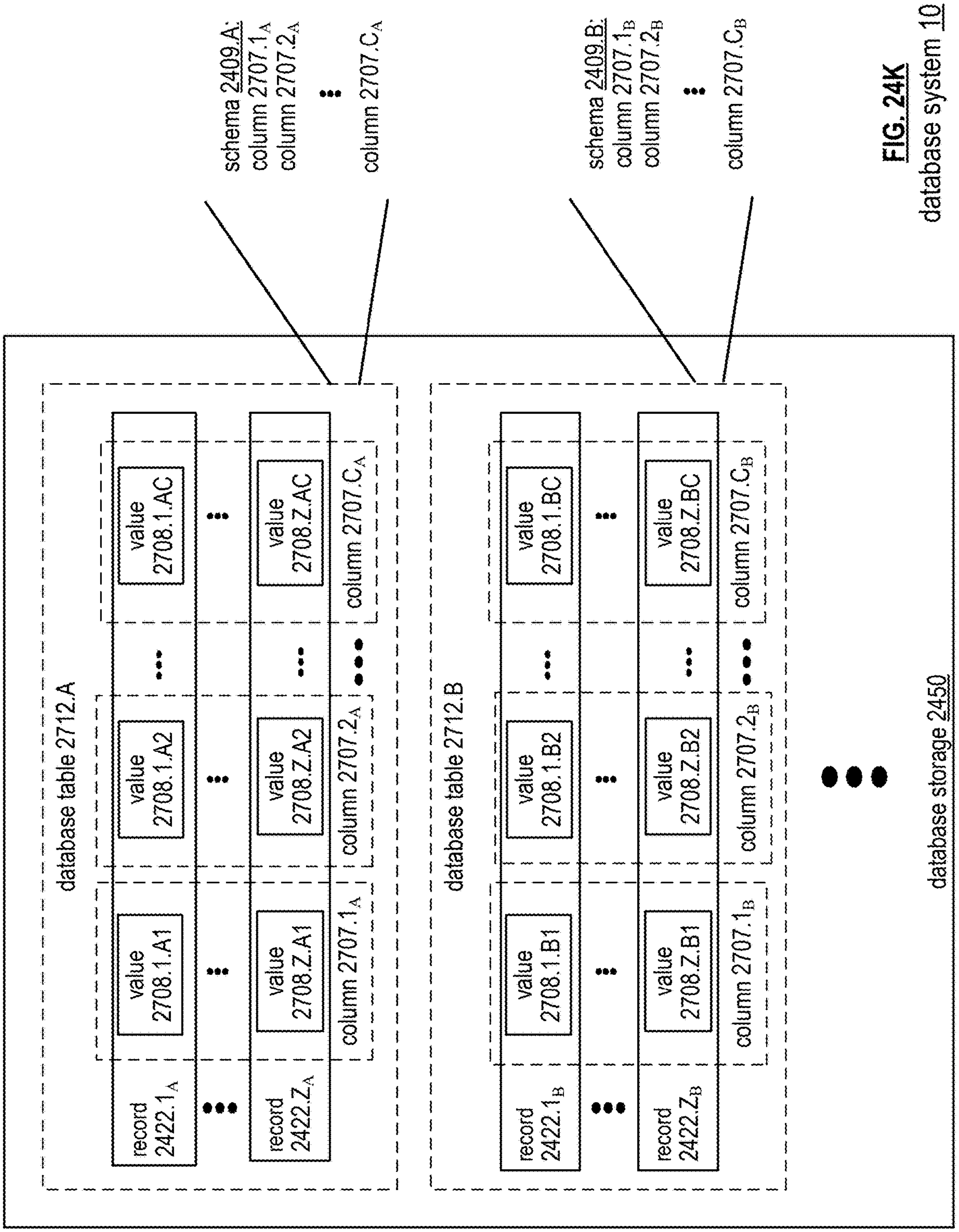
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.1A-2707.$C_A$ of schema 2709.A for database table 2712.A can have a different number of columns than and/or can have different datatypes for some or all columns of the set of columns 2707.$1_B$-2707.$C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
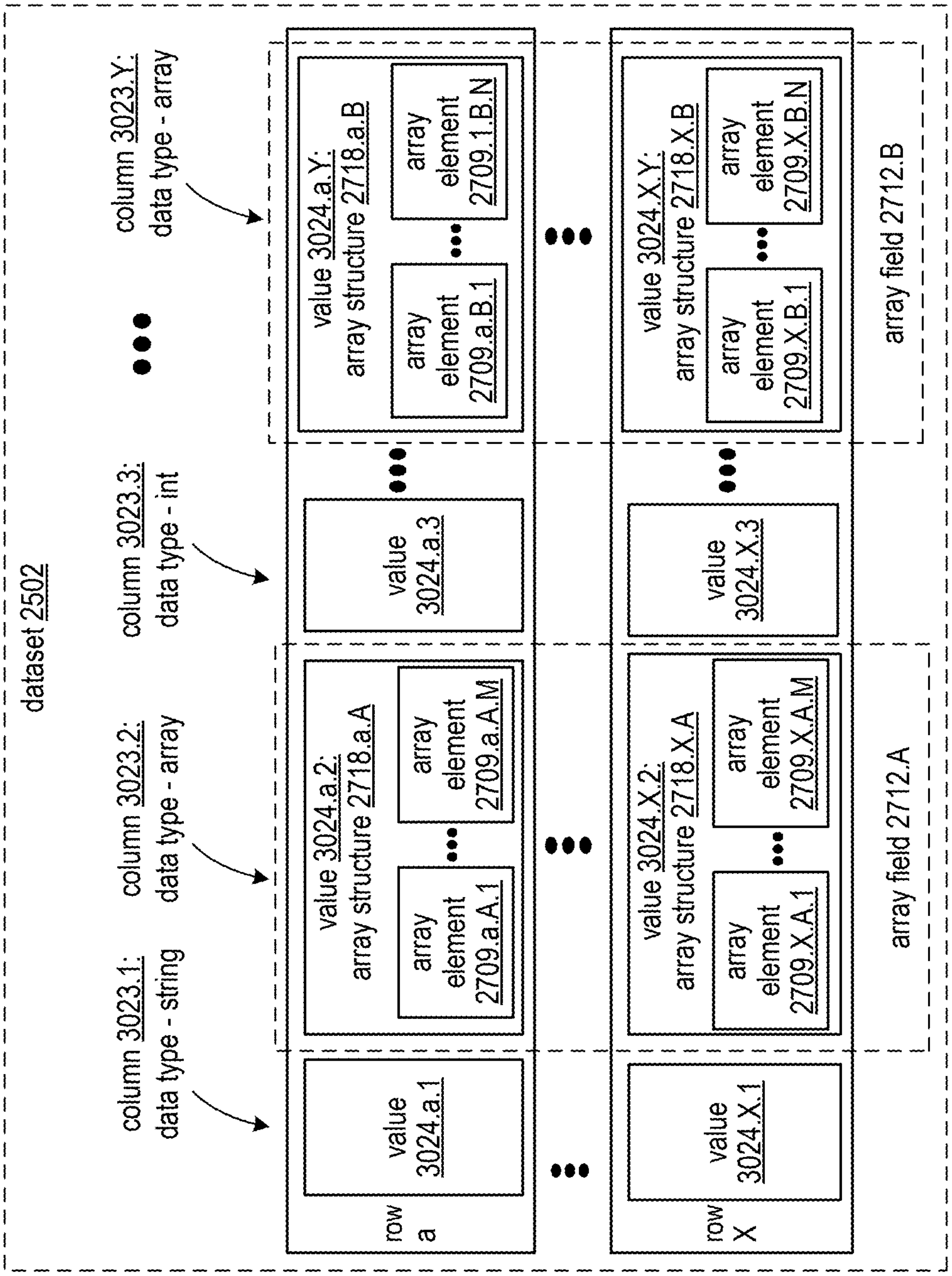
FIG. 24L illustrates an example embodiment of a dataset stored in database storage that includes at least one array field in accordance with various embodiments.

FIG. 24L illustrates an embodiment of a dataset 2502 having one or more columns 3023 implemented as array fields 2712. Some or all features and/or functionality of the dataset 2502 of FIG. 24L can be utilized to implement one or more of the database tables 2712 of FIG. 24K and/or any embodiment of any database table and/or dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712.A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712.A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 24M:
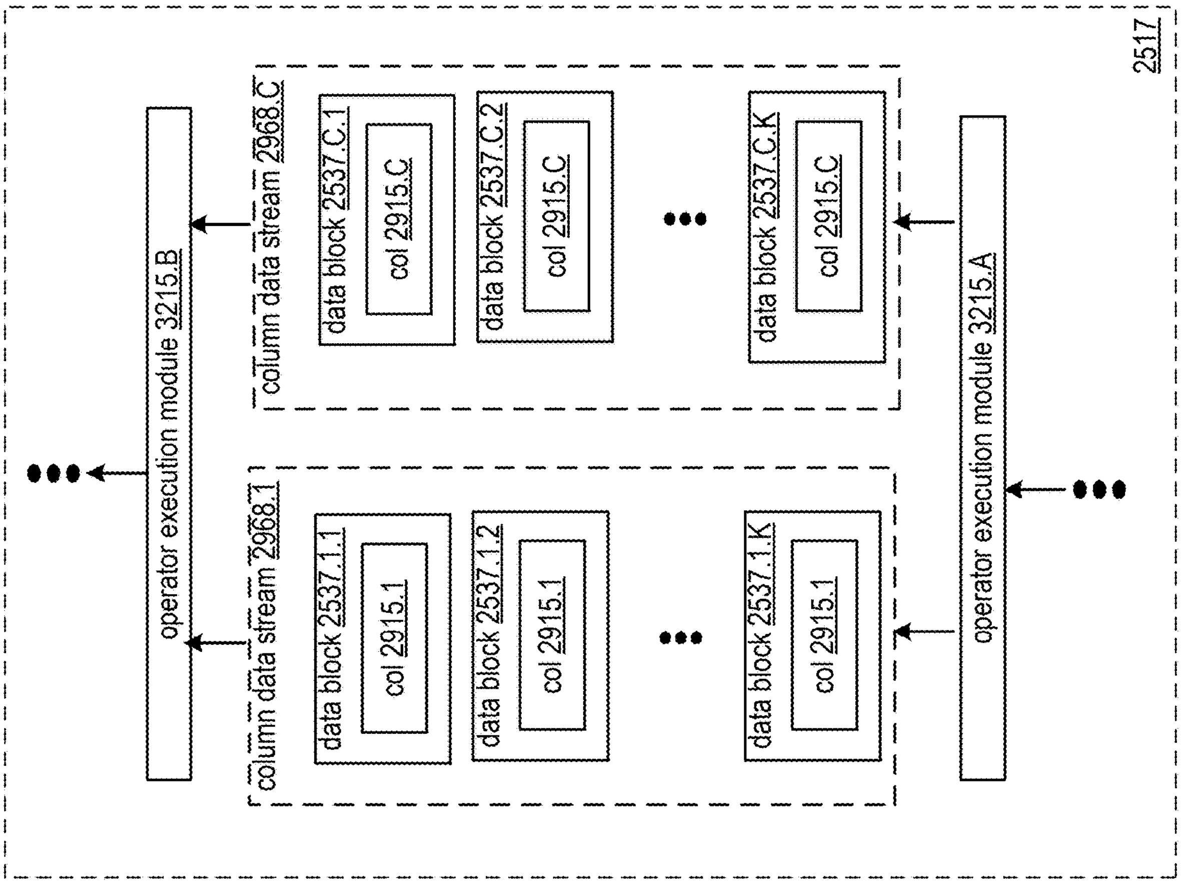
FIG. 24M is a schematic block diagram of a query execution module that implements a plurality of column data streams in accordance with various embodiments.
Figure 24N:
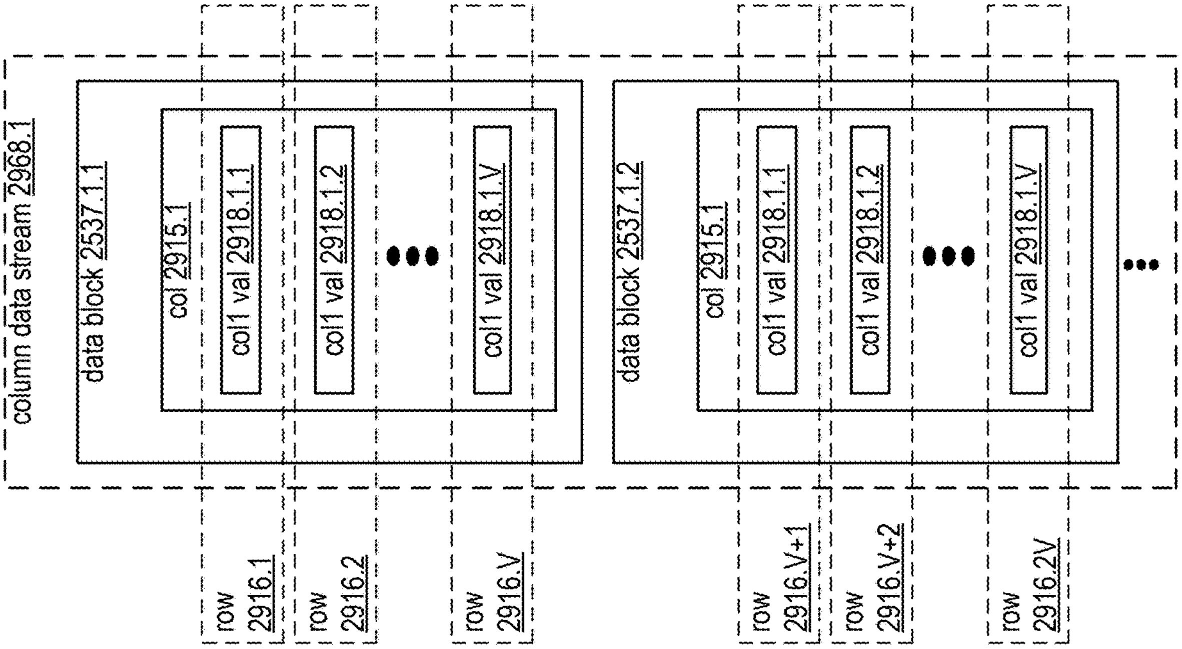
FIG. 24N illustrates example data blocks of a column data stream in accordance with various embodiments.

FIGS. 24M-24N illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24M-24N can implement any embodiment of query execution module 2504 described herein and/or any performance of query execution described herein. Some or all features and/or functionality of column data streams 2968 of FIGS. 24M-24N can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24M, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24N, each data block 2537 of a given column data stream 2968 can include values 2918 for the respective column for one or more corresponding rows 2916. In the example of FIG. 24N, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple columns can be emitted in a same multi-column data stream.

Figure 24O:
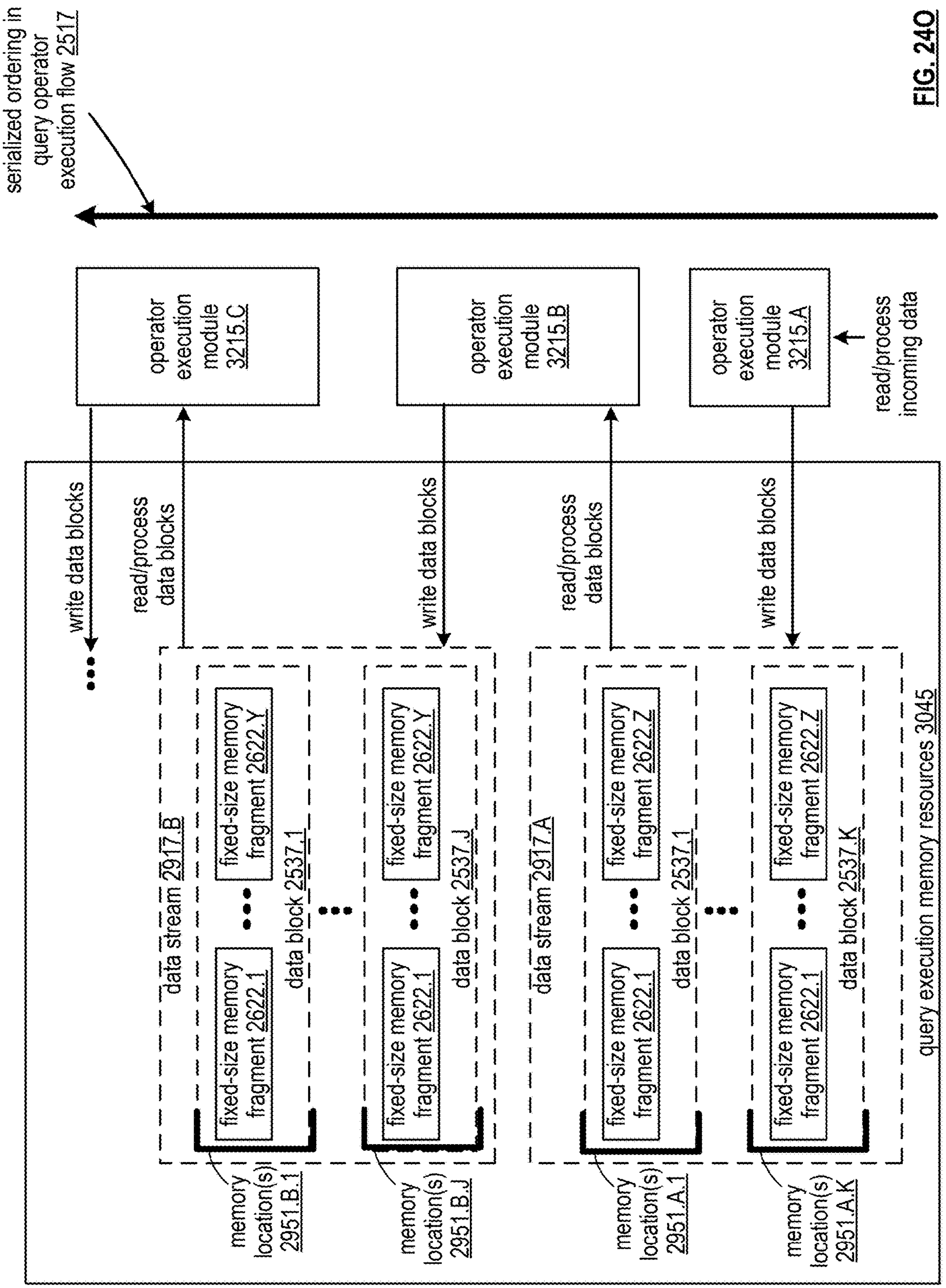
FIG. 24O is a schematic block diagram of a query execution module illustrating writing and processing of data blocks by operator execution modules in accordance with various embodiments.

FIG. 24O illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24O can implement the operator execution modules of FIG. 24J and/or can implement any query execution described herein. The data blocks 2537 can implement the data blocks of column streams of FIGS. 24M and/or 24N, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24P:
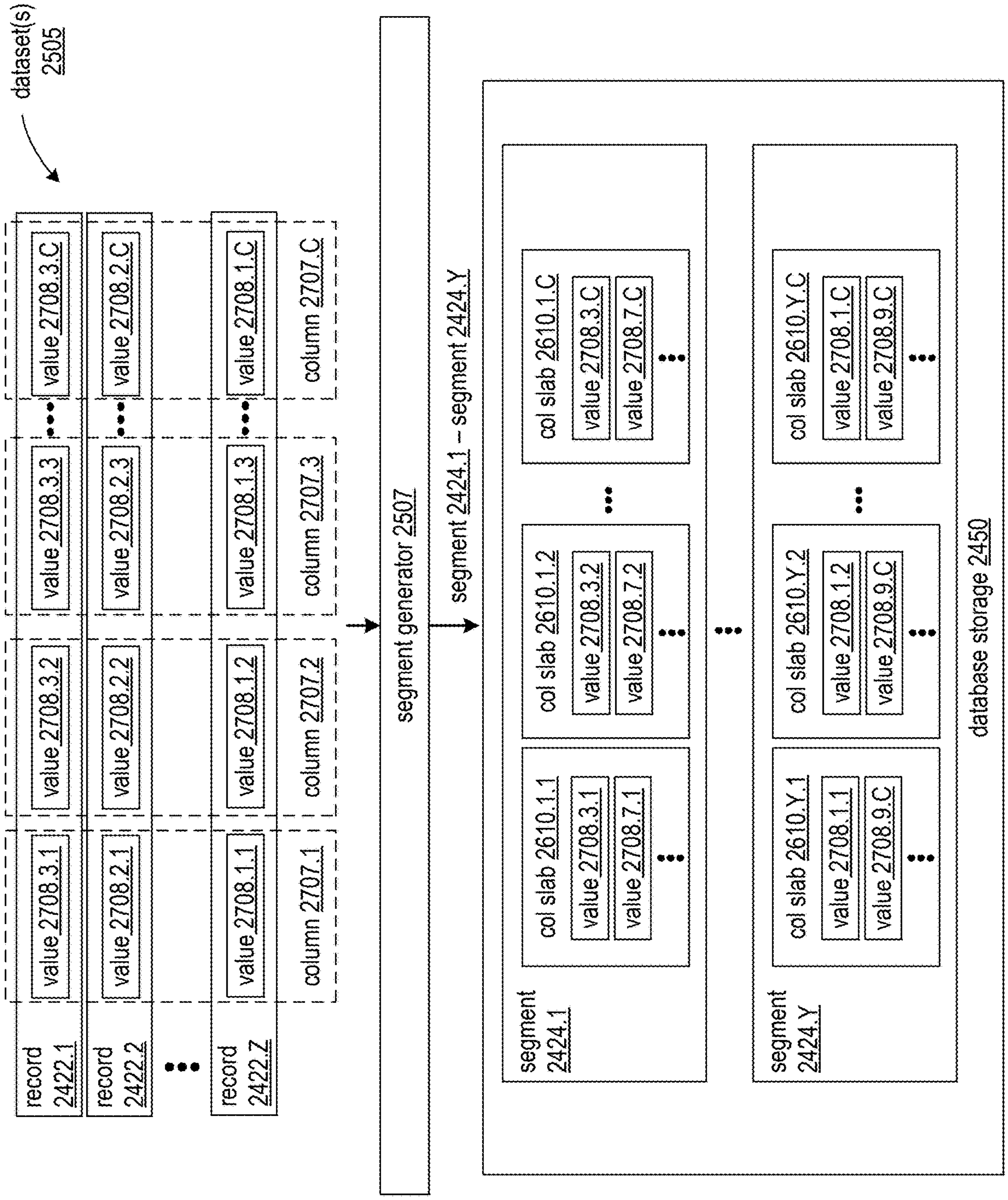
FIG. 24P is a schematic block diagram of a database system that implements a segment generator that generates segments from a plurality of records in accordance with various embodiments.

FIG. 24P illustrates an embodiment of a database system 10 that implements a segment generator 2507 to generate segments 2424. Some or all features and/or functionality of the database system 10 of FIG. 24P can implement any embodiment of the database system 10 described herein. Some or all features and/or functionality of segments 2424 of FIG. 24P can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows the respective values are further filtered/processed/etc., for example, via operators 2520 of a corresponding query operator execution flow 2517, or otherwise accordance with the query to render generation of the query resultant.

Figure 24Q:
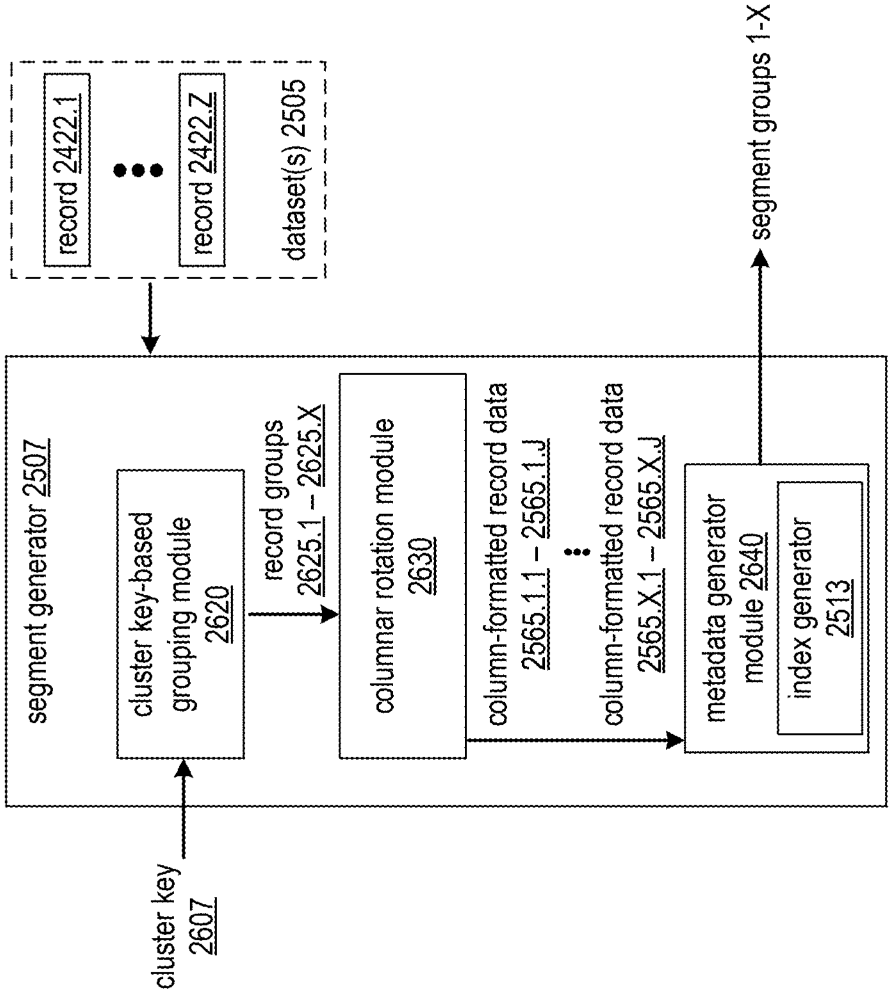
FIG. 24Q is a schematic block diagram of a segment generator that implements a cluster key-based grouping module, a columnar rotation module, and a metadata generator module in accordance with various embodiments.

FIG. 24Q illustrates an example embodiment of a segment generator 2507 of database system 10. Some or all features and/or functionality of the database system 10 of FIG. 24Q can implement any embodiment of the database system 10 described herein. Some or all features and/or functionality of the segment generator 2507 of FIG. 24Q can implement the segment generator 2507 of FIG. 24P and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Applications for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Applications for all purposes, and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system of U.S. Utility application Ser. No. 16/985,723, U.S. Utility application Ser. No. 16/985,957, and/or U.S. Utility application Ser. No. 16/985,930.

Figure 24R:
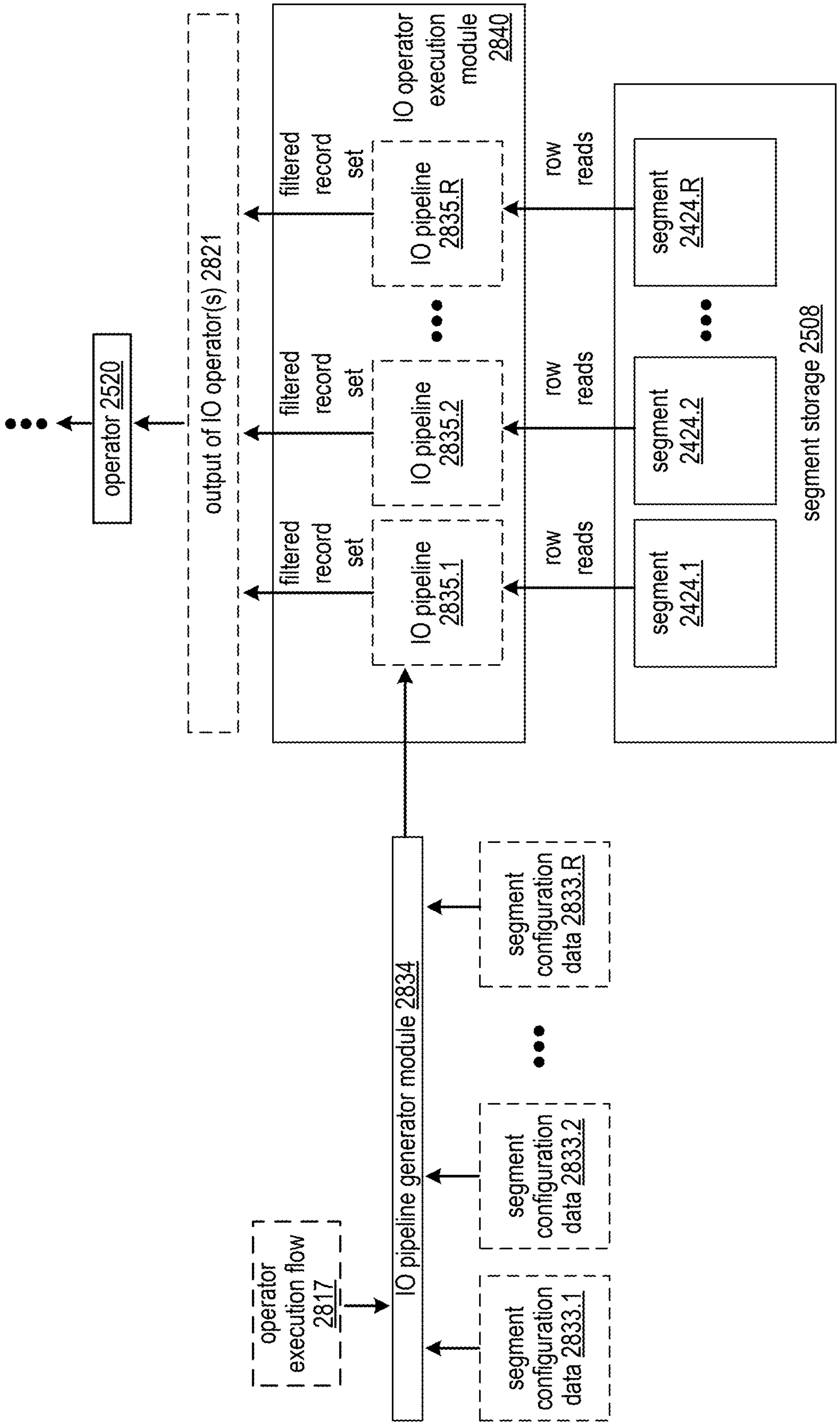
FIG. 24R is a schematic block diagram of a query processing system that generates and executes a plurality of IO pipelines to generate filtered records sets from a plurality of segments in conjunction with executing a query in accordance with various embodiments.

FIG. 24R illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24R can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given quay based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding quay execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24S:
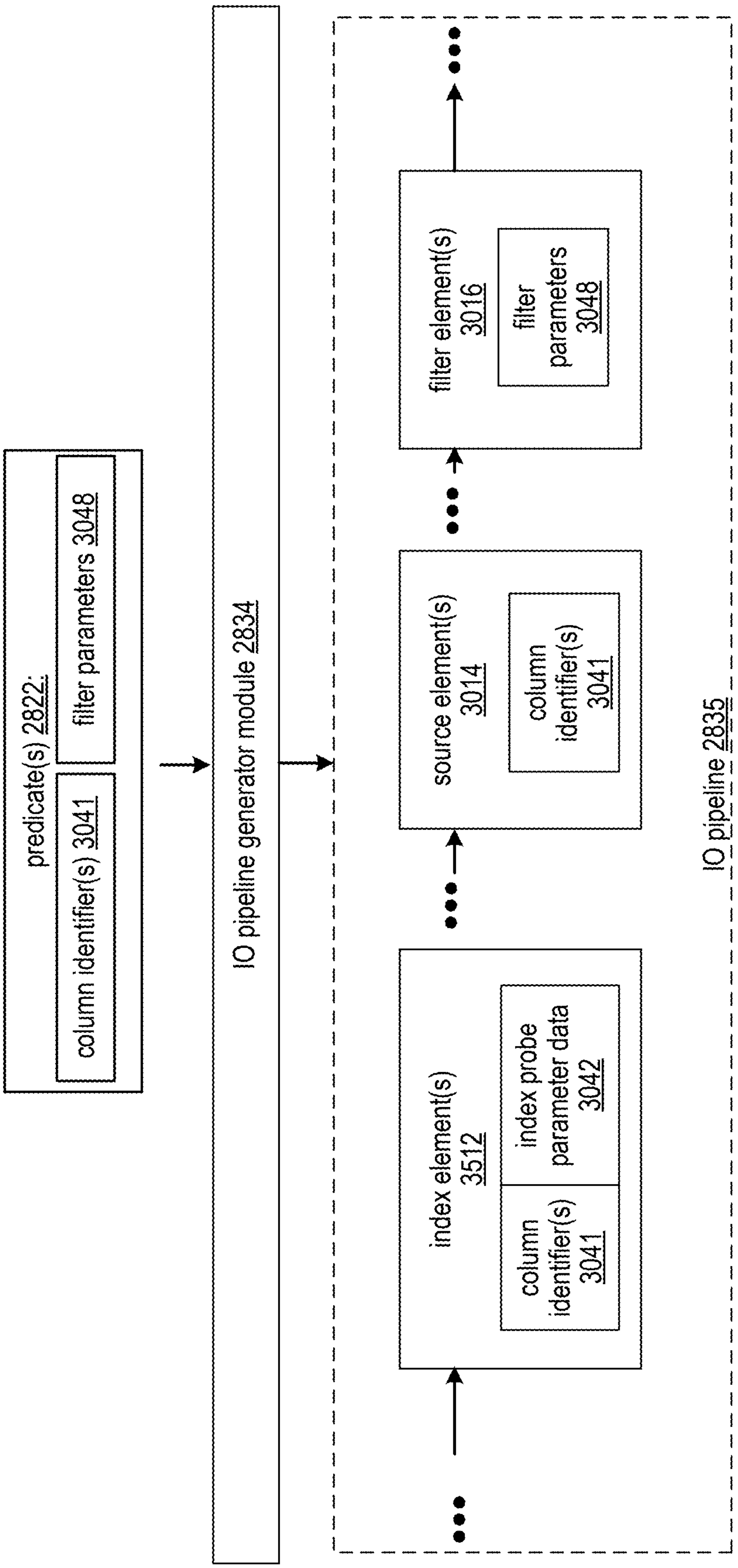
FIG. 24S is a schematic block diagram of a query processing system that generates an IO pipeline for accessing a corresponding segment based on predicates of a query in accordance with various embodiments.

FIG. 24S illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths (e.g. the IO pipeline includes an acyclic directed graph of elements). These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24S can implement the IO pipeline 2835 and/or IO pipeline generator module 2834 of FIG. 24R, and/or any embodiment of IO pipeline 2835, of IO pipeline generator module 2834, or of any query execution via accessing segments described herein.

In some embodiments, the IO pipeline generator module 2834, IO pipeline 2835, IO operator execution module 2840, and/or any embodiment of IO pipeline generation and/or IO pipeline execution described herein, implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility Patent Application for all purposes.

Figure 24T:
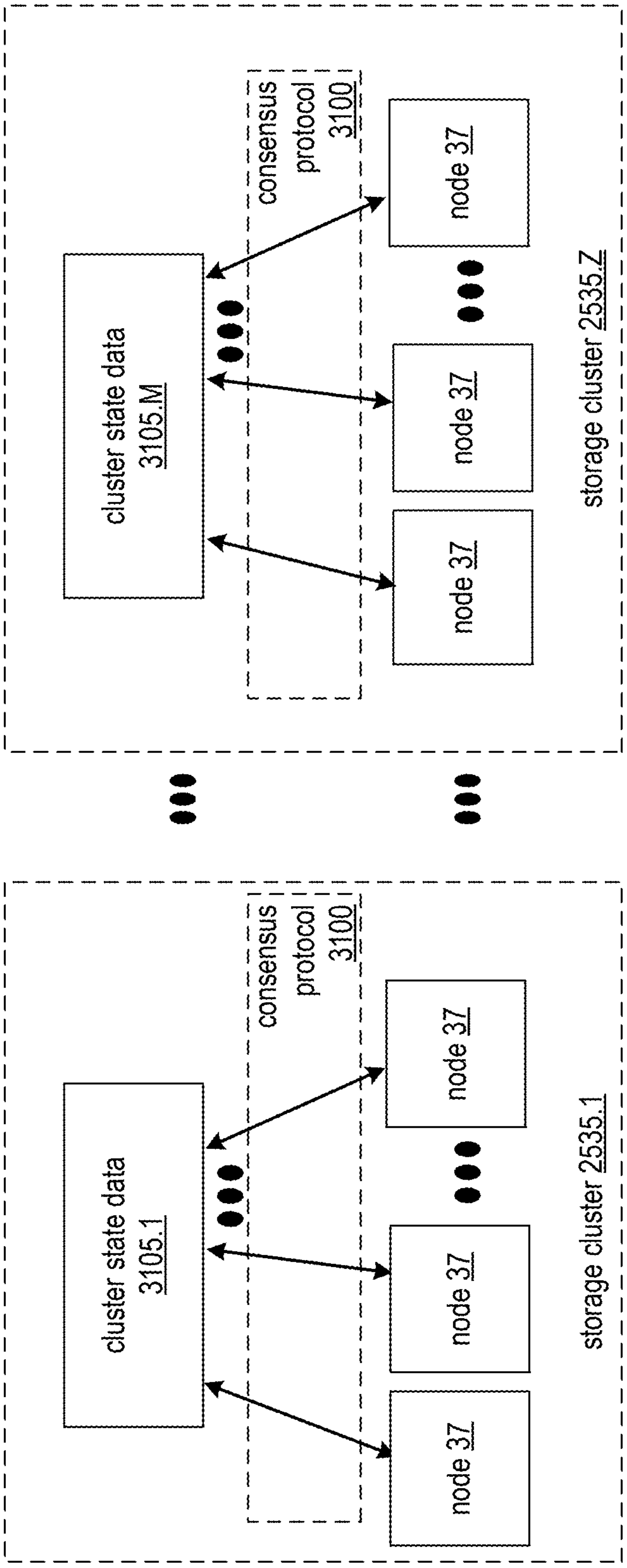
FIG. 24T is a schematic block diagram of a database system that includes a plurality of storage clusters that each mediate cluster state data via a plurality of nodes in accordance with a consensus protocol in accordance with various embodiments.

FIG. 24T presents an embodiment of a database system 10 that includes a plurality of storage clusters 2535. Storage clusters 2535.1-2535.Z of FIG. 24T can implement some or all features and/or functionality of storage clusters 35-1-35-Z described herein, and/or can implement some or all features and/or functionality of any embodiment of a storage cluster described herein. Some or all features and/or functionality of database system 10 of FIG. 24T can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

In some embodiments, updating of state data (such as configuration data, system metadata, data shared via a consensus protocol, and/or any other state data described herein), for example, utilized by nodes to perform respective functionality over time, can be performed in conjunction with an event driven model. In some embodiments, such updating of state data over time can be performed in a same or similar fashion as updating of configuration data as disclosed by: U.S. Utility application Ser. No. 18/321,212, entitled COMMUNICATING UPDATES TO SYSTEM METADATA VIA A DATABASE SYSTEM, filed May 22, 2023; and/or U.S. Utility application Ser. No. 18/310,262, entitled "GENERATING A SEGMENT REBUILD PLAN VIA A NODE OF A DATABASE", filed May 1, 2023; which are hereby incorporated herein by reference in their entirety and made part of the present U.S. Utility Patent Application for all purposes.

In some embodiments, system metadata can be generated and/or updated over time with different corresponding metadata sequence numbers (MSNs). For example, such generation/updating of metadata over time can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility Patent Application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 24U:
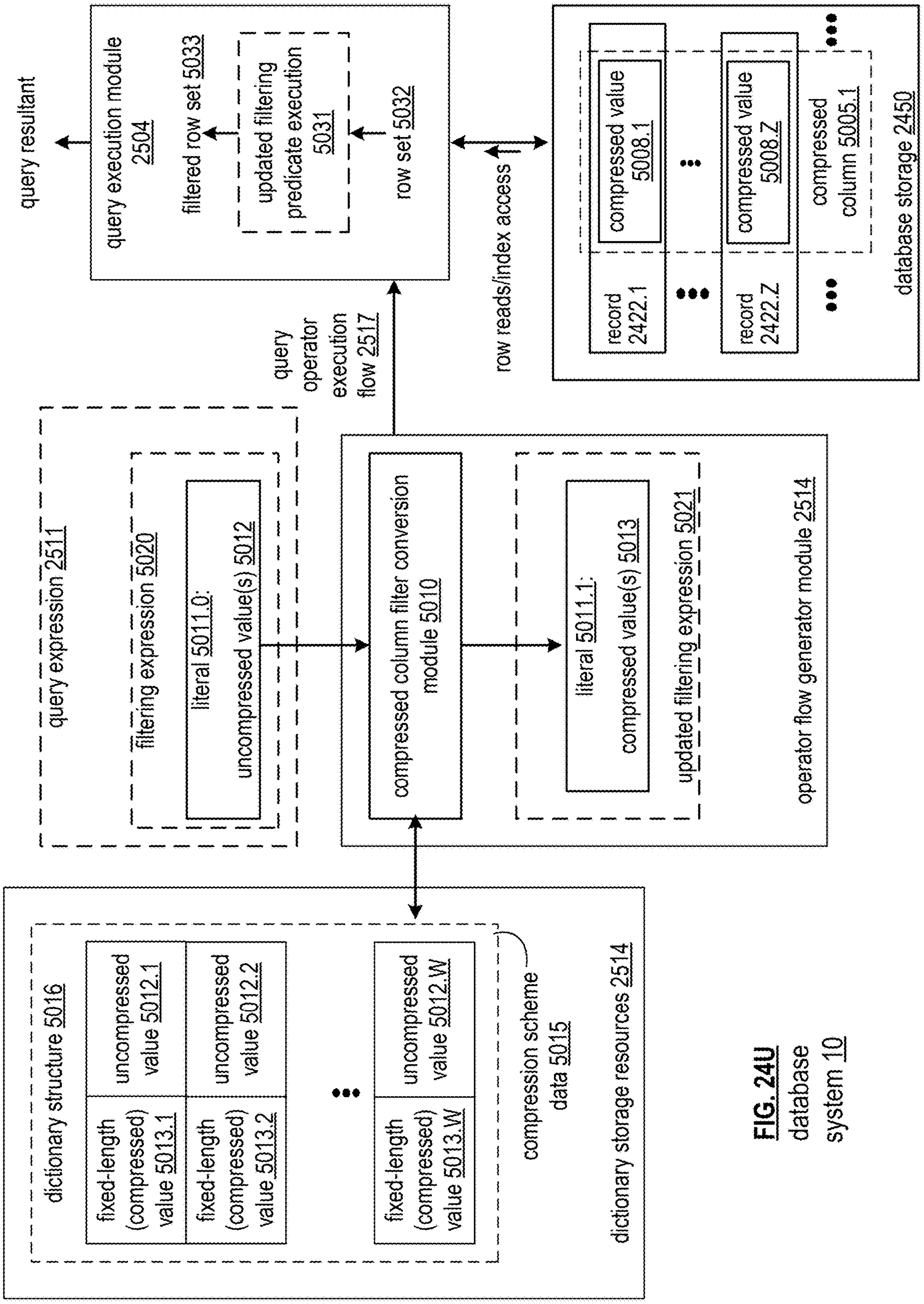
FIG. 24U is a schematic block diagram of a database system that implements a compressed column filter conversion module based on accessing a dictionary structure in accordance with various embodiments.
Figure 24V:
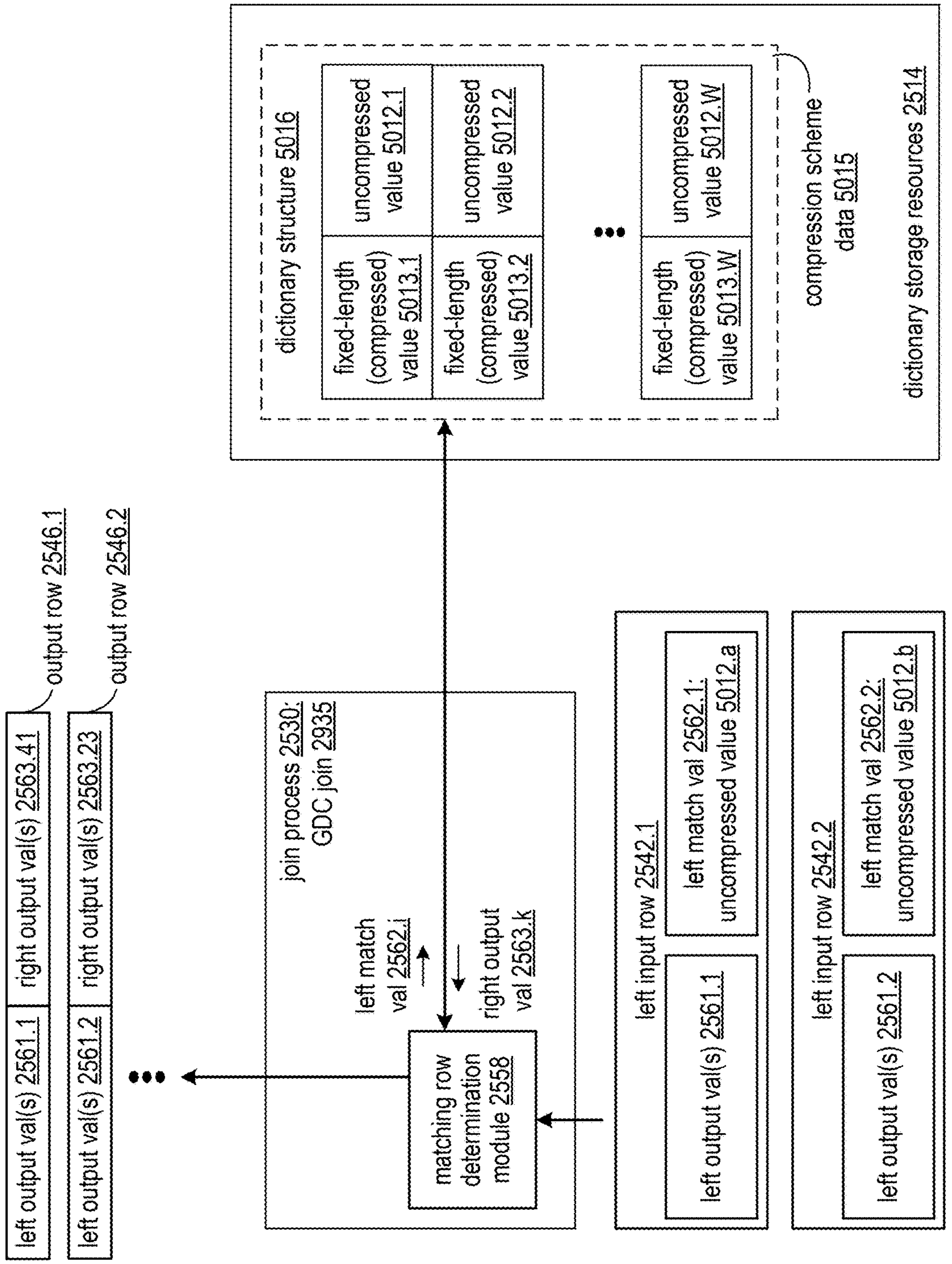
FIG. 24V is a schematic block diagram of a query execution module that implements a Global Dictionary Compression join via access to a dictionary structure in accordance with various embodiments.

FIGS. 24U and 24V illustrate embodiments of a database system 10 that utilizes a dictionary structure to store compressed columns. Some or all features and/or functionality of the dictionary structure 5016 of FIGS. 24U and/or 24V can implement any compression scheme data and/or means of generating and/or accessing compressed columns described herein. Any other features and/or functionality of database system 10 of FIG. 24U and/or 24V can implement any other embodiment of database system 10 described herein.

In some embodiments, columns are compressed as compressed columns 5005 based on a globally maintained dictionary (e.g. dictionary structure 5016), for example, in conjunction with applying Global Dictionary Compression (GDC). Applying Global Dictionary Compression can include replaces variable length column values with fixed length integers on disk (e.g. in database storage 2450), where the globally maintained dictionary is stored elsewhere, for example, via different (e.g. slower/less efficient) memory resources of a different type/in a different location from the database storage 2450 that stores the compressed columns 5005 accessed during query execution.

The dictionary structure can store a plurality of fixed-length, compressed values 5013 (e.g. integers) each mapped to a single uncompressed value 5012 (e.g. variable-length values, such as strings). The mapping of compressed values 5013 to uncompressed values 5012 can be in accordance with a one-to-one mapping. The mapping of compressed values 5013 to uncompressed values 5012 can be based on utilizing the fixed-length values 5013 as keys of a corresponding map and/or dictionary data structure, and/or can be based on utilizing the uncompressed values 5012 as keys of a corresponding map and/or dictionary data structure.

A given uncompressed value 5012 that is included in many rows of one or more tables can be replaced (i.e. "compressed") via a same corresponding compressed value 5013 mapped to this uncompressed value 5012 as the compressed value 5008 for these rows in compressed column 5005 in database storage. As new rows are received for storage over time, their column values for one or more compressed columns 5005 can be replaced via corresponding compressed values 5008 based on accessing the dictionary structure and determining whether the uncompressed value 5012 of this column is stored in the dictionary structure 5016. If yes, the compressed value 5013 mapped to the uncompressed value 5012 in this existing entry is stored as compressed value 5008 in the compressed column 5005 in the database storage 2450. If no, the dictionary structure 5016 can be updated to include a new entry that includes the uncompressed value 5012 and a new compressed value 5013 (e.g. different from all existing compressed values in the structure) generated for this uncompressed value 5012, where this new compressed value 5013 is stored as is applied as compressed value 5008 in the database storage 2450.

The dictionary structure 5016 can be stored in dictionary storage resources 2514, which can be different types of resources from and/or can be stored in a different location from the database storage 2450 storing the compressed columns for query execution. In some embodiments, the dictionary storage resources 2514 storing dictionary structure 5016 can be considered a portion/type of memory as of database storage 2450 that are accessed during query execution as necessary for decompressing column values. In some embodiments, the dictionary storage resources 2514 storing dictionary structure 5016 can be implemented as metadata storage resources, for example, implemented by a metadata consensus state mediated via a metadata storage cluster of nodes maintaining system metadata such as GDCs of the database system 10.

The dictionary structure 5016 can correspond to a given column 5005, where different columns optionally have their own dictionary structure 5016 build and maintained. Alternatively, a common dictionary structure 5016 can optionally be maintained for multiple columns of a same table/same dataset, and/or for multiple columns across different tables/different datasets. For example, a given uncompressed value 5012 appearing in different columns 5005 of the same or different table is compressed via the same fixed-length value 5013 as dictated by the dictionary structure 5016.

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data described herein.

In some embodiments, dictionary compression via dictionary structure 5016 can implement the compression scheme utilized to generate (e.g. compress/decompress the values of) compressed columns 5005 of FIG. 24U based on implementing some or all features and/or functionality of the compression of data during ingress via a dictionary as disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes.

In some embodiments, dictionary compression via dictionary structure 5016 can implement the compression scheme utilized to generate (e.g. compress/decompress the values of) compressed columns 5005 of FIG. 24U based on implementing some or all features and/or functionality of global dictionary compression as disclosed by U.S. Utility application Ser. No. 16/220,454, entitled "DATA SET COMPRESSION WITHIN A DATABASE SYSTEM", filed Dec. 14, 2018, issued as U.S. Pat. No. 11,256,696 on Feb. 22, 2022, which is hereby incorporated herein by reference in its entirety and made part of the present U.S. Utility Patent Application for all purposes.

In some embodiments, dictionary compression via dictionary structure 5016 can be utilized in performing GDC join processes during query execution to enable recovery of uncompressed values during query execution, for example, based on implementing some or all features and/or functionality of GDC joins as disclosed by U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility Patent Application for all purposes.

FIG. 24U illustrates an embodiment of database system 10 where a compressed column filter conversion module 5010 accesses a dictionary structure 5016 to generate an updated filtering expression 5021 in conjunction with query execution.

The compressed column filter conversion module 5010 can generate updated filtering expression 5021 based on updating one or more literals 5011.1 from corresponding literals 5011.0 based on replacing uncompressed values 5012 with compressed values 5013 mapped to these compressed values based on accessing dictionary structure 5016 and determining which fixed-length compressed value 5013 is mapped to each given uncompressed value 5012. Such functionality can be implemented for one or more queries executed by database system 10 to reduce access to the dictionary structure during query execution in conjunction with performing one or more optimizations of the query operator execution flow to improve query performance.

FIG. 24V illustrates an embodiment of executing a join process 2530 that is implemented as a global dictionary compression (GDC) join. This can include applying a matching row determination module 2558 via access to a dictionary structure 5016.

In some embodiments, unlike hash maps generated during query execution for access in conjunction with executing other types of JOIN operations (e.g. as described in U.S. Utility application Ser. No. 18/226,525), the dictionary structure 5016 can optionally be accessed during GDC join processes based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

For example, segments can store the fixed length values to improve storage efficiency and/or queries can access and process these fixed length values, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

Figure 24W:
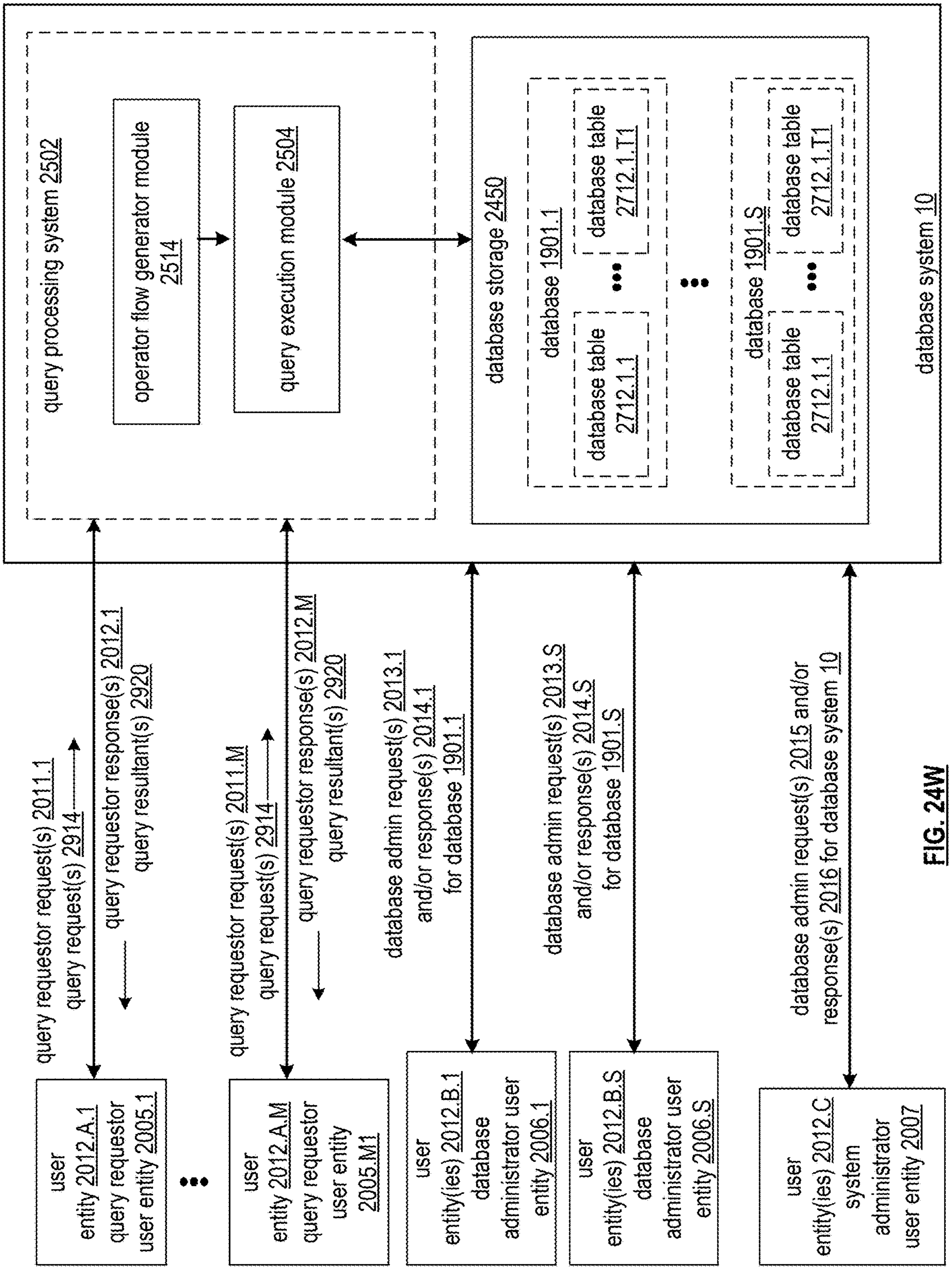
FIG. 24W is a schematic block diagram illustrating communication between database system 10 and a plurality of user entities in accordance with various embodiments.

FIG. 24W illustrates an embodiment of database system 10 operable to communicate with a plurality of user entities. Some or all features and/or functionality of FIG. 24W can implement any embodiment of database system 10 described herein.

Various users can send data to and/or receive data from database system 10 over time, for example, as corresponding requests and/or responses. Requests can indicate requests for queries to be executed, requests that include data to be loaded/stored, requests that include configuration data configuring any values/functionality utilized by database system 10 to perform its functionality, data supplied in response to a request from database system 10, and/or other requests to database system 10 for processing by database system 10. Responses can indicate query resultants of executed queries, notifications/confirmation that requests were processed successfully or rendered failure, error notifications, data supplied in response to a request from user entity 2012, and/or other information.

Some or all user entities 2012 can be implemented as user entities corresponding to humans that communicate with database system 10 (e.g. requests are configured via user input to a corresponding computing device of database system 10 or communicating with database system 10); user entities corresponding to groups of multiple people, for example, corresponding to companies/establishments that communicate with database system 10; user entities corresponding to automated entities such as one or more computing devices and/or server systems (e.g. implemented via artificial intelligence, machine learning, and/or configured instructions to cause these automated entities to send requests and/or process responses; and/or corresponding to a given person and configured to send/receive data based on user input from a corresponding person); and/or other user entities. Some or all user entities 2012 can be implemented as humans and/or devices included in/associated with database system 10 (e.g. personnel/employees of a service provided by database system 10; computing devices implementing nodes/processing modules of database system 10 that communicate via internal communication resources of database system 10, etc.). Some or all user entities 2012 can be implemented as humans and/or devices external from database system 10 (e.g. humans/companies that are customers of a service provided by database system 10; computing devices external from the computing devices/nodes/processing resources of database system 10 that communicate with database system 10 via a corresponding communication interface, etc.)

User entities 2012 can include various type of user entities 2012, which can include one or more user entities 2012.A, one or more user entities 2012.B, and/or one or more user entities 2012.C. A given user entity can optionally implement multiple types of user entities 2012 (e.g. a given user entity 2012 operates as both a user entity 2012.A and a user entity 2012.B). Multiple different users (e.g. different people, different devices) can implement a given user entity 2012 (e.g. different employees of a given company implement a given user entity 2012 at different times; different devices associated with a given person or company implement a given user entity 2012 at different times, etc.).

In some embodiments, some or all user entities 2012 can configure/perform functionality corresponding to workload management (WLM).

User entities 2012 can include one or more user entities 2012.A.1-2012.A.M corresponding to query requestor user entities 2005.1-2005.M. Query requestor user entities 2005 can send query requests 2914 indicating queries for execution and/or receive query resultants in response 2920. User entities 2012 can optionally be implemented in a same or similar fashion as external requesting entity 2912.

User entities 2012 can include one or more user entities 2012.B.1-2012.B.S corresponding to database administrator user entities 2006 that request/configure/monitor loading/storage of/access to a corresponding database 1901 that stores a corresponding plurality of database tables 2712.1-2712-T (e.g. database administrator user entities 2006 optionally correspond to data sources that load their data to the system for use in query execution, where this data source sources data included in tables 2712 of a corresponding database 1901).

For example, in some embodiments, database system 10 can implement database storage 2450 to store various tables 2712 corresponding to multiple different databases 1902.1-1901.S, for example, each sourced by, accessible by, and/or configured via corresponding user entities 2012.B. Different databases 1901 can store same or different types of data, same or different numbers of tables 2712, etc. Some or all user entities 2012.A can correspond to a given database 1901 (e.g. based on being associated with the corresponding data source and/or user entities 2012.B) for example, where these user entities are only allowed to query against the given database 1901.

User entities 2012 can include one or more user entities 2012.C corresponding to system administrators of the database system 10 that request/configure/monitor loading/storage of/access to databases in query execution and/or otherwise configure/monitor functionality of database system 10 described herein.

Different user entities can have different corresponding permissions/privileges/access types, for example, indicated in corresponding user permissions data stored by and/or accessible by database system 10. In some embodiments, one or more given user entities can configure permissions of other user entities. Such permissions can configure types of requests that can be sent, restrictions on data included in responses, and/or which data can be accessed (e.g. in loading data and/or requesting data). For example, some users entities 2012.A can be restricted to certain types of queries/query functions be performed, access to only some databases 1902 and/or only some tables 2712, limits on how many queries be executed/how much data be returned, certain levels of query priority, certain service classes of query execution defining corresponding attributes of how queries be executed/how query execution be restricted, etc. As another example, some user entities 2012.B can be restricted to certain types/rates of data loading to a corresponding database 1901, certain permissions regarding how much configuration of database system 10 they can have power over, etc. As another example, different user entities 2012.C can have different permissions regarding how much configuration of database system 10 they can have power over, different functionalities/aspects of database system that they have permissions to configure, etc.

Figure 25A:
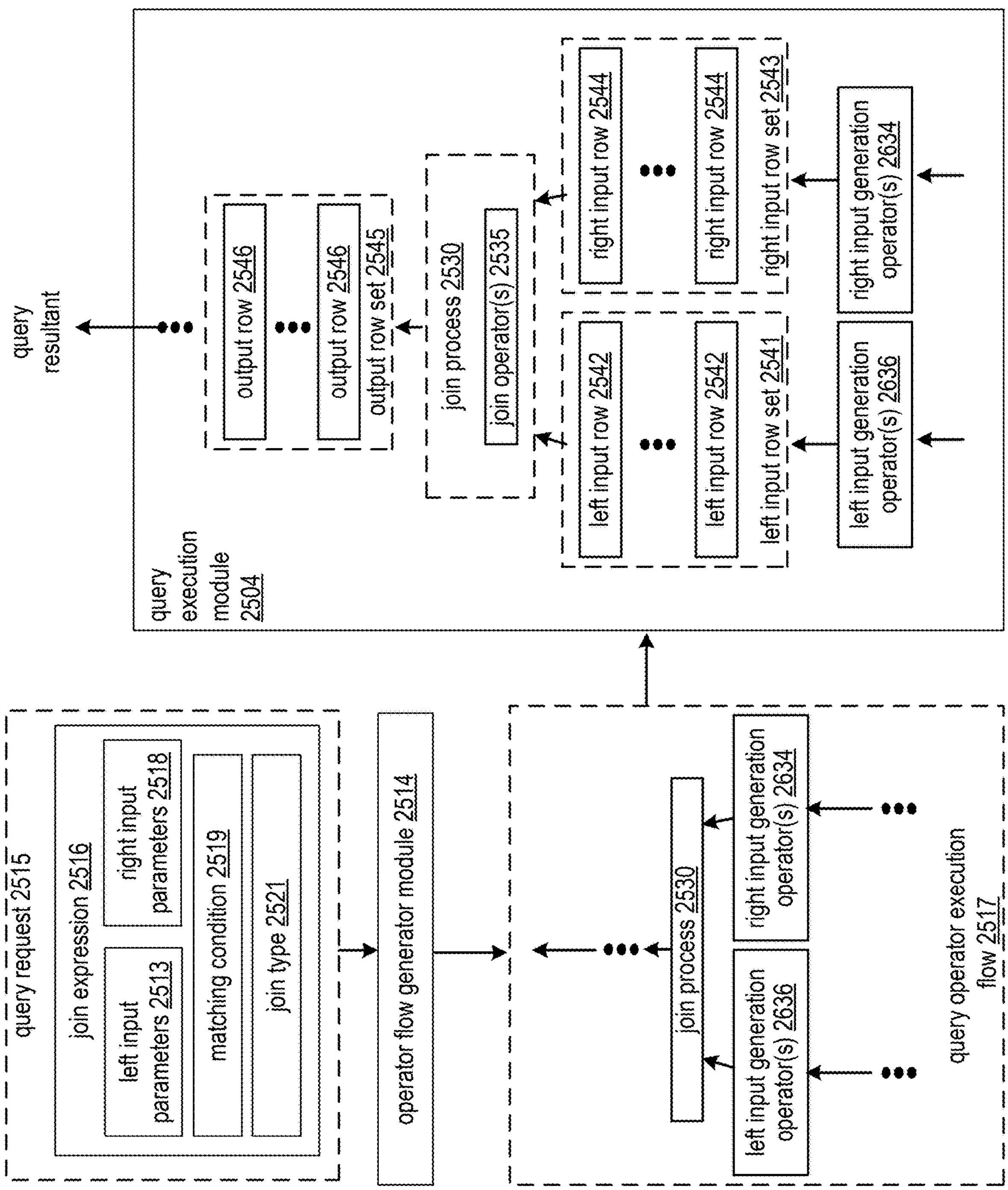
FIG. 25A is a schematic block diagram of a database system executing a join process based on a join expression of a query request in accordance with various embodiments.
Figure 25B:
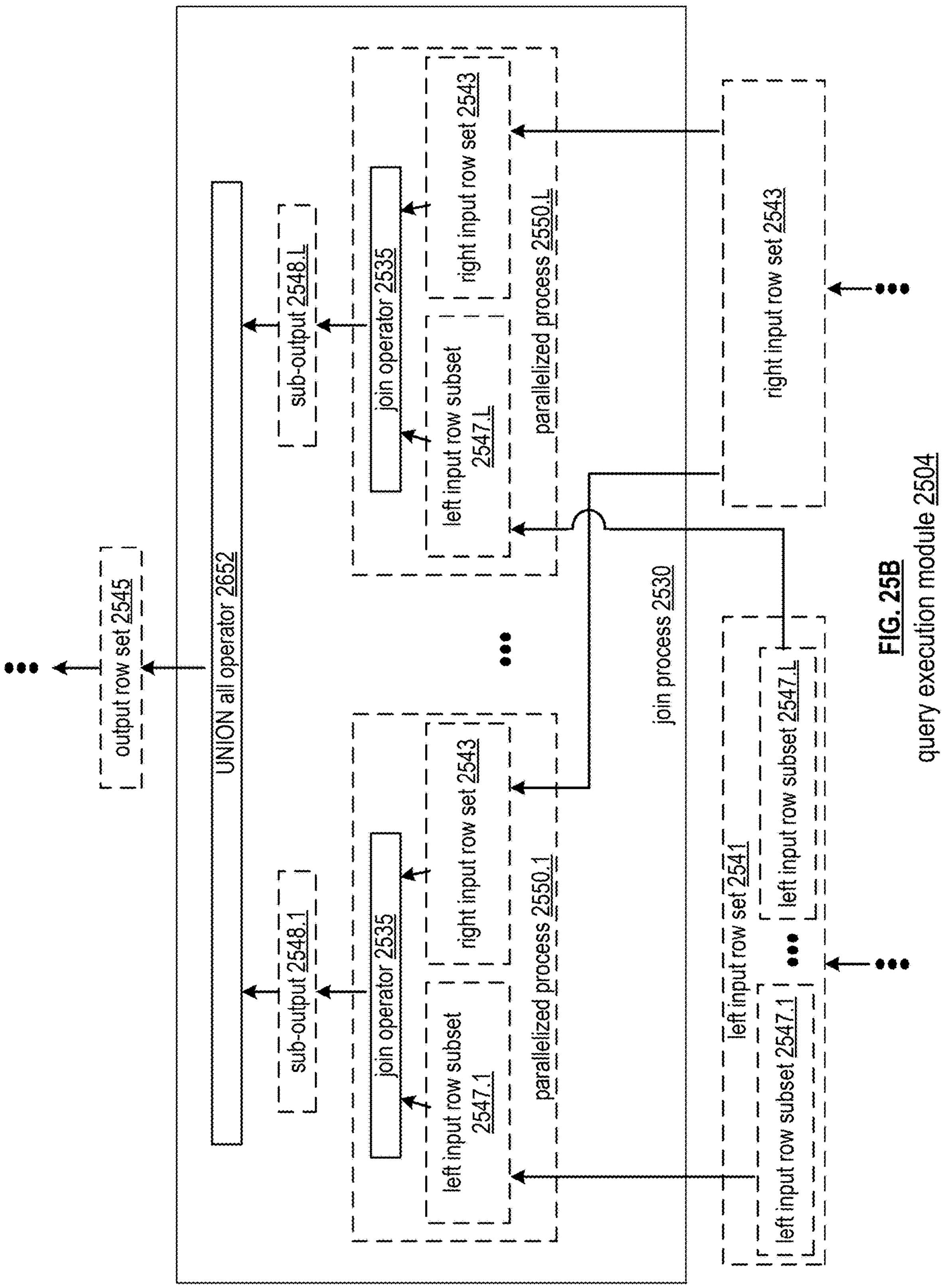
FIG. 25B is a schematic block diagram of a query execution module executing a join process via multiple parallel processes in accordance with various embodiments.
Figure 25C:
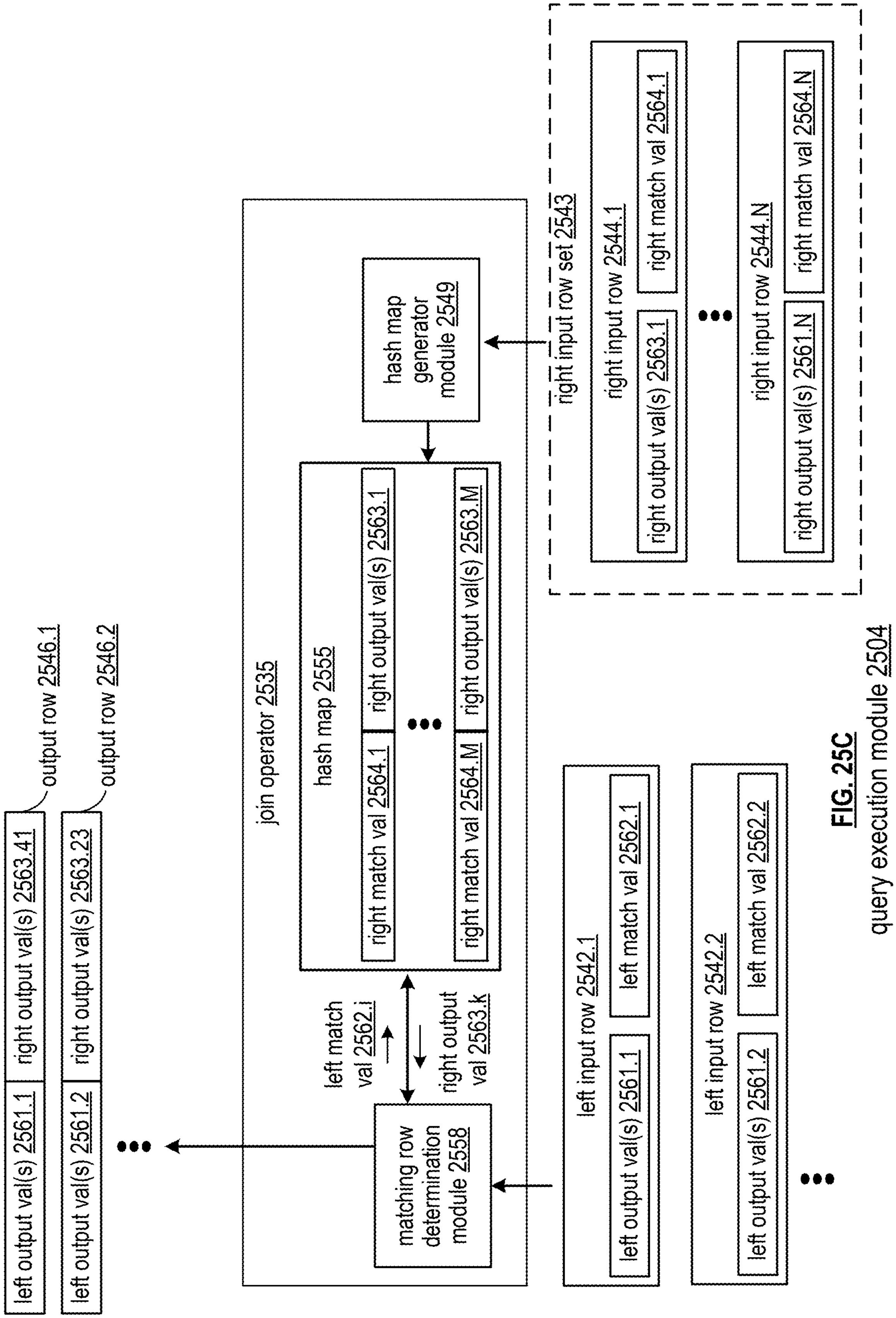
FIG. 25C is a schematic block diagram of a query execution module executing a join operator based on utilizing a hasp map generated from right input rows in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 when executing queries indicating join expressions. Some or all features and/or functionality of FIGS. 25A-25C can be utilized to implement any embodiment of the database system 10 described herein.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output rows 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

FIG. 25B illustrates an embodiment of a query execution module 2504 executing a join process 2530 via a plurality of parallelized processes 2550.1-2550.L. Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. The plurality of parallelized processes 2550.1-2550.L can be implemented via any other set of parallelized and/or distinct memory and/or processing resources.

Each parallelized process 2550 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, L different nodes and/or L different subsets of nodes that each include multiple nodes generate a corresponding left input row subset 2547 at a corresponding level of the query execution plan at a level below the level of nodes implementing the plurality of parallelized processes 2550.1-2550.L. For example, each parallelized process 2550 only receives the left input rows 2542 generated by its own one or more child nodes, where each of these child nodes only sends its output data blocks to one parent. The left input row set 2541 can otherwise be segregated into the set of left input row subsets 2547.1-2547.L, each designated for a corresponding one of the set of parallelized processes 2550.1-2550.L. The plurality of left input row subsets 2547.1-2547.L can be mutually exclusive and collectively exhaustive with respect to the left input row set 2541, where each left input row 2542 is received and processed by exactly one parallelized process 2550.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, L different nodes and/or L different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2550.1, for example, based on each node of this other set of nodes sending its output data blocks to all L nodes implementing the L parallelized processes 2550, rather than a single parent. Alternatively, the right input rows 2544 generated by a given node can be sent by the node to one parent implementing a corresponding one of the plurality of parallelized processes 2550.1-2550.L, where the L nodes perform a shuffle and/or broadcast process to share received rows of the right input row set 2543 with one another via a shuffle network 2480 to facilitate all L nodes receiving all of the right input rows 2544. Each right input row 2544 is otherwise received and processed by every parallelized process 2550.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2550, and instead processing all left input rows of the right outer join by all parallelized processes 2550.

The left input row set that is segregated across all parallelized processes 2550 vs. the right input row set processed via every parallelized processes 2550 can be selected, for example, based on an optimization process performed when generating the query operator execution flow 2517. For example, for a join specified as being performed upon two sets of input rows, while the input row set segregated amongst different parallelized processes 2550 and the input row set processed via every parallelized processes 2550 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the “left” input row set 2541 that is segregated across all parallelized processes 2550 is selected to instead correspond to the right hand side designated by the query expression, and the “right” input row set 2543 that is segregated across all parallelized processes 2550 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

FIG. 25C illustrates an embodiment of a query execution module 2504 executing a join operator 2535. The embodiment of implementing the join operator 2535 of FIG. 25C can be utilized to implement the join process 2530 of FIG. 25A and/or can be utilized to implement the join operator 2535 executed via each of a set of parallelized processes 2550 of FIG. 25B.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2536. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.*i*, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544.*k*, the right output value 2563 is retrieved and/or otherwise determined based on the hash map 2555, and the respective output row 2546 is generated to include the a new row generated to include both the one or more left output values 2561.*i* of the left input row 2542.*i*, as well as the right output values 2563.*k* of the identified matching right input row 2544.*k*.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values.

In some embodiments, any performance of join operations and/or execution/optimization of query operator execution flows that include join operators described herein can be implemented via some or all features and/or functionality of performing join operations and/or implementing join operators as disclosed by: U.S. Utility application Ser. No. 18/321,906, entitled "PROCESSING LEFT JOIN OPERATIONS VIA A DATABASE SYSTEM BASED ON FORWARDING INPUT", filed May 23, 2023; U.S. Utility application Ser. No. 18/494,230, entitled "GENERATING EXECUTION TRACKING ROWS DURING QUERY EXECUTION VIA A DATABASE SYSTEM", filed Oct. 25, 2023; and/or U.S. Utility application Ser. No. 18/326,305, entitled "HANDLING NULL VALUES IN PROCESSING JOIN OPERATIONS DURING QUERY EXECUTION", filed May 31, 2023, which are all hereby incorporated herein by reference in its entirety and made part of the present U.S. Utility Patent Application for all purposes.

Figure 26A:
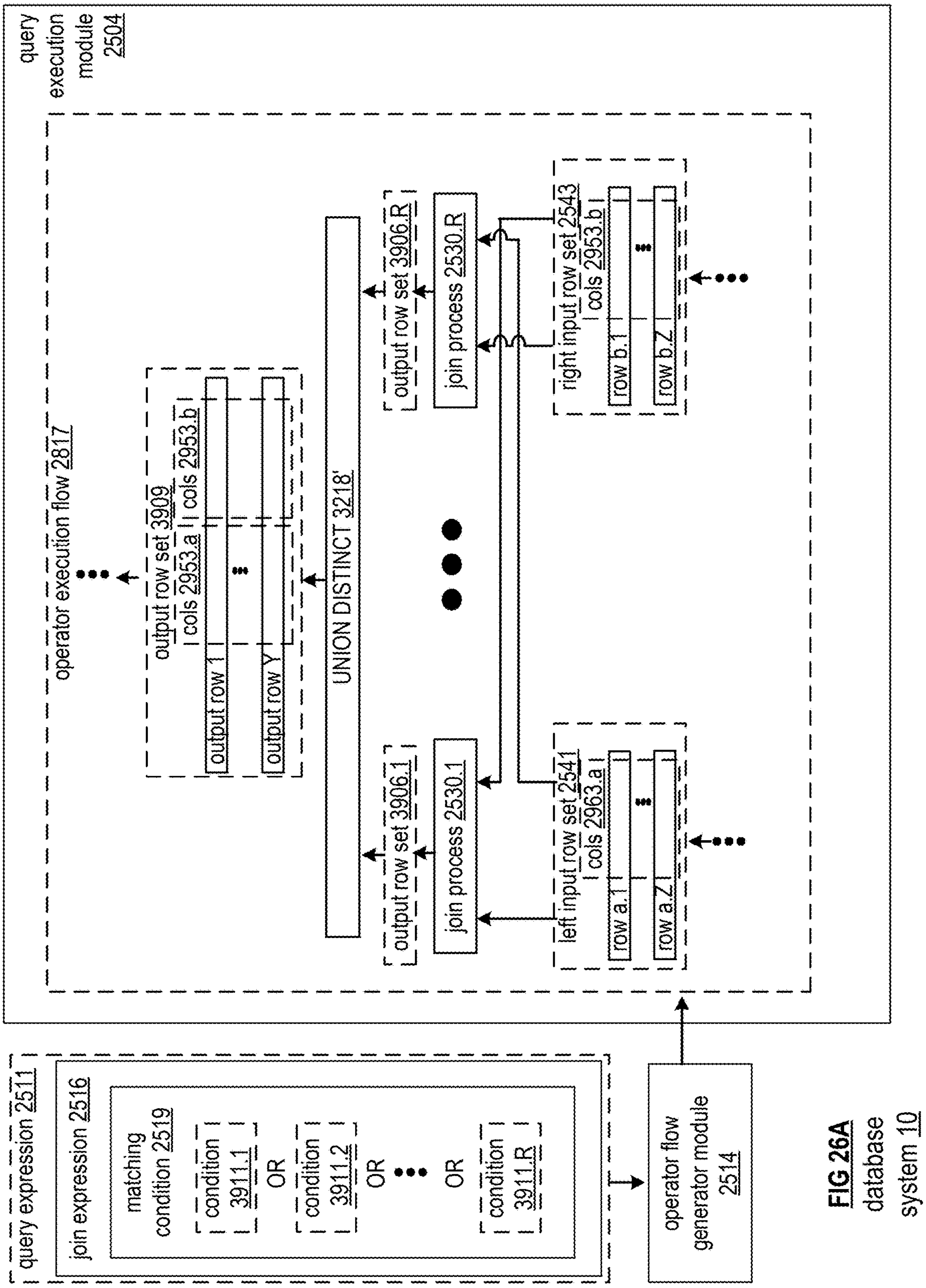
Figure 26C:
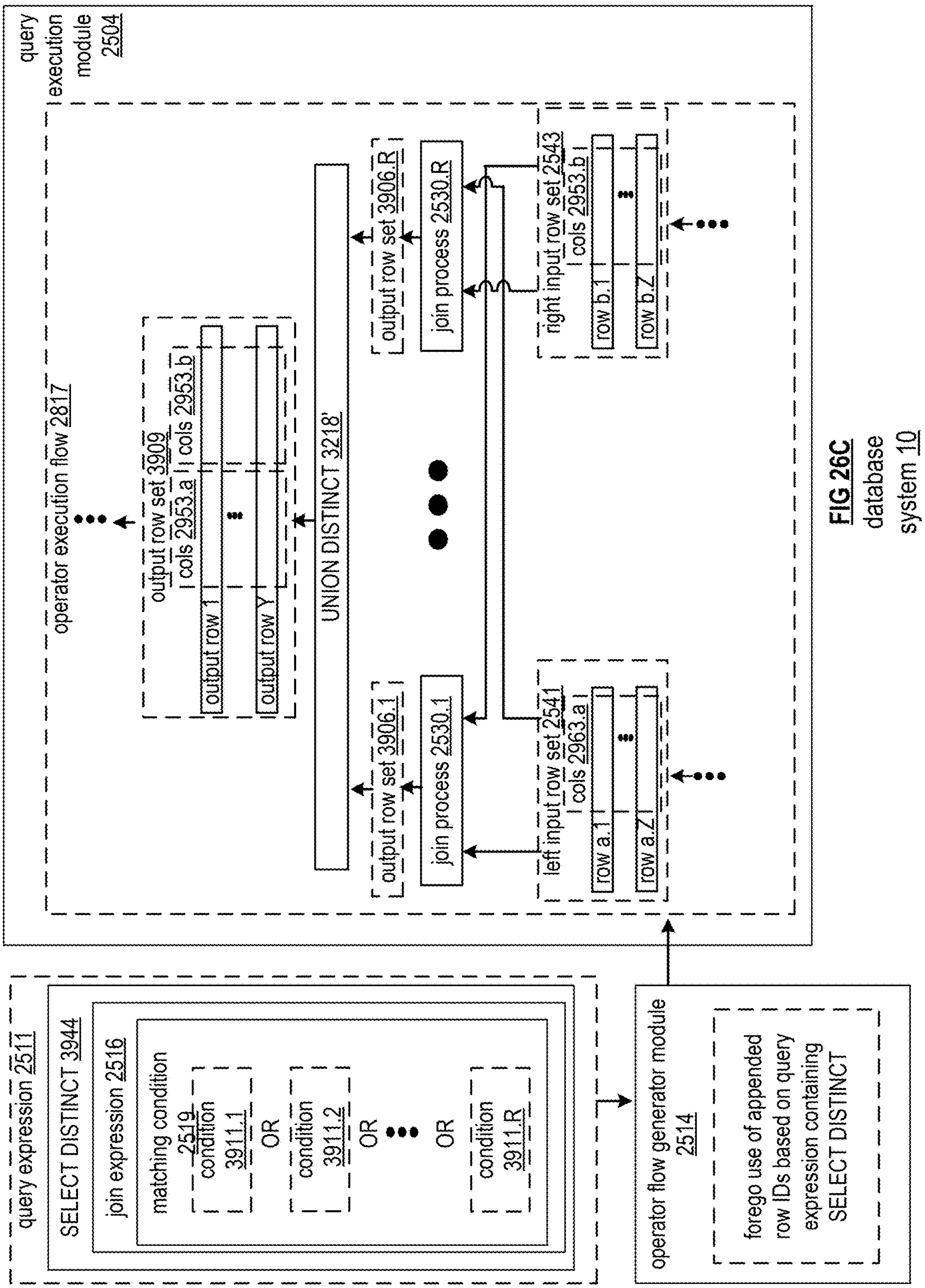

FIGS. 26A-26C illustrate embodiments where a query expression that indicates execution of a join operation to identify pairs of rows meeting any of a set of conditions is executed via performing a plurality of corresponding join operations, each for a corresponding one of the set of conditions, and performing a union distinct upon the output of plurality of corresponding join operation to remove duplicate rows (e.g. rather than performing a product join for the set of conditions). The embodiments illustrated in 26A-26C can be utilized to implement one or more nodes 37 of one or more computing devices 18 implementing database system 10. Some or all features and/or functionality of FIGS. 26A-26C can be utilized to implement any embodiment of database system 10 described herein.

FIG. 26A illustrates an embodiment of processing a query expression 2511 that includes a join expression 2516 (e.g. explicitly or implicitly)indicating a matching condition 2519 that includes a disjunction of a plurality of conditions 3911.1-3911.R. As a particular example, the query expression 2511 includes a FROM and WHERE clause. For example, consider the following example excerpt of an example query expression 2511 indicating a product join implicitly:

```
FROM table1, table2
  WHERE table1.col1 = table2.col1 or table1.col2 = table2.col2 or
  table1.col3 = table2.col3
```

Note that in some embodiments, some or all query expression 2511 can indicate the same product join explicitly using explicit INNER JOIN . . . ON syntax, where the corresponding flow of FIG. 26A can be applied in both the case where the join on a disjunction of conditions is implicit or explicit.

In some embodiments, such a query is executed via one or more product joins. However, in some embodiments, product joins are large and/or slow to execute, which can lead to corresponding queries taking a long time to execute and/or consuming many memory resources to execute.

In some embodiments, such queries can executed without product joins, and can instead involve taking the union of a set of independent hash joins (e.g. in the example above: a first hash join on table1.col1=table2.col1; a second hash join on table1.col2=table 2.col2; and/or a third hash join on table1.col3=table2.col3). However, simply converting the use of a product join to a union of separate hash joins does not guarantee equivalent results because one or more rows could pass more than one of the conditions (e.g. a given rowA from table1 and a given rowB from table2 have the same values for both col1 and col2 and the join output indicating the pairing of rowA and rowB is thus incorrectly included twice in the output of the union). A union distinct operator 3218' can be implemented rather than a union to enable removal of duplicates.

An example of such an embodiment is illustrated in FIG. 26A, where each of a plurality of join processes 2530.1-2530.R each apply a corresponding matching condition 3911 of the disjuncted set of conditions in matching condition 2519 to a same pair of row sets: left input row set 2541 having a first set of rows a.1-*a*.Z having values for one or more columns 2963.*a* (e.g. of a first relational database table, such as col1 col2 and col3 of table1 of the example above) and right input row set 2543 having a second set of rows b.1-*b*.Z having values for one or more columns 2963.*b* (e.g. of a second relational database table, such as col1 col2 and col3 of table2 of the example above, where the second relational database table is the same as or different from the first relational database table). Each join process 2530 can be performed to generate a corresponding output row set 3906, for example, as a hash join and/or via implementing some or all functionality of join process 2530 of FIGS. 25A-25C and/or any embodiment of join process 2530 described herein. Each join process can apply its respective condition 3911 to identify matches between rows of left input row set and right input row set, where such pairs are included/represented in its output row set 3906 (e.g. some or all columns 2963.*a* and/or 2963.*b* are included in the output row sets 3906, where all output row sets 3906.1-3906.R are generated to include the same set of columns in the same order). The union distinct operator 3218' can emit output row set to remove any duplicates across output row sets 3906.1-3906.R of join processes 2530.1-2530.R in generating output row set 3909 to include a set of output rows 1-Y.

In some embodiments, simply applying this union distinct 3218' does not guarantee the correct result, for example, based on some or all of the shortcomings of simply applying a union distinct to parallelized processes without further structuring in implementing NNF predicates discussed herein. In particular, multiple rows of left input row set 2541 can pair with a given row of right input row set in a given join process 2530 or across multiple join processes 2530 (e.g. multiple rows of left input row set 2541 have their table1.col1 equal to table2.col1 of some row of right input row set 2543, for example, where the outputs are identical based on these multiple rows having the same values for all columns 2953.*a* included in the output row set 3909), and/or multiple rows of right input row set 2543 can pair with a given row of left input row set in a given join process 2530 or across multiple join processes 2530 (e.g. multiple rows of right input row set 2543 have their table2.col1 equal to table1.col1 of some row of left input row set 2541, for example, where the output rows are identical based on these multiple rows having the same values for all columns 2953.*b* included in the output row set 3909). In this case, a correct result would require all of these output rows being included in output row set 3909, but the union distinct 3218' would filter these rows out if additional structuring is not applied.

FIG. 26B illustrates an embodiment where further operations are included in query operator execution flow 2817 to ensure such rows are not incorrectly filtered out in this case. In particular, rows can be appended with row identifiers prior to being processed in parallel via the set of join processes 2530.1-2530.R for removal after the union distinct is applied, for example, in conjunction with any embodiment of handing NNF predicates disclosed by U.S. Utility application Ser. No. 19/014,732, entitled "SPILLING A HASH SET STRUCTURE TO DISK IN CONJUNCTION WITH EXECUTING A SET OPERATION VIA A DATABASE SYSTEM", filed Jan. 9, 2025, which is hereby incorporated herein by reference in its entirety and made part of the present U.S. Utility Patent Application for all purposes. This can include generating hashes (e.g. unique row identifiers) to identify the input rows on both inputs to the join, for example, were a random (e.g. in practice unique 128-bit identifier) can be extended for every row (e.g. via an extend operator or other row identifier appending operator). After the joins are executed in parallel upon both inputs with these identifiers to generate a set of respective output, a distinct can be applied after unioning the hash joins (e.g. as a union distinct operator) and then the row ID columns can be dropped (e.g. via a project out operator).

As illustrated in FIG. 26B, a set of ID appending operators 4110.*a* and 4110.*b* can be applied to left input row set 2541 and right input row set 2543, respectfully, to render modified left input row set 2541' and modified right input row set 2543', respectfully, where rows of modified left input row set 2541' includes a new row ID column 2954.*a*, generated via ID appending operator 4110.*a* and appended to its column(s) 2963.*a*, that includes a corresponding unique identifier for each row (e.g. a 128-bit value or other identifier), and/or where rows of modified right input row set 2543' similarly include a new row ID column 2954.*b*, generated by row ID appending operator 4110.*b* and appended to its column(s) 2963.*b*, that includes a corresponding unique identifier for each row (e.g. a 128-bit value or other identifier). For example, the ID appending operator 4110.*a* and/or 4110.*b* are implemented via an extend operator 3110 (e.g. that implements extend function 3113 as a random value generator function 2952, where the values are random values as discussed in conjunction with FIG. 26B) and/or a window operator.

A tee operator 2956.*a* can be executed to assign modified left input row set 2541' for processing by join processes 2530.1-2530.R as the left input by each given join process, and/or a tee operator 2956.*b* can assign modified right input row set 2543' for processing by join processes 2530.1-2530.R as the left input by each given join process. The output row sets 3906.1-3906.R generated by join processes 2530.1-2530.R can thus include row ID column 2954.*a* and row ID column 2954.*b*, where the output row set 3909' generated via union distinct 3218' applied to these output row sets 3906.1-3906.R also includes the row ID column 2954.*a* and row ID column 2954.*b*. This can ensure that same pair of rows is included in the output row set 3909, as duplicate instances of the given pair would have identical columns 2953.*a*, 2953.*b*, 2954.*a*, and 2954.*b* and would thus be removed by the union distinct 3218'. Meanwhile, instances where different pairs of rows have identical columns 2953.*a* and 2953.*b* would all be correctly included in the output row set 3909' based on having different pairs of IDs in columns 3954.*a* and 2954.*b*, thus causing these rows to be distinct and not filtered via the union distinct operator 3218'. A project out operator 2957 can be applied to remove the row ID column 2954.*a* and row ID column 2954.*b* from output row set 3909' generated via execution of the union distinct operator 3218'.

In some embodiments, a query expression 2511 is structured such that this additional overhead of generating identifiers for use in applying the union distinct is not necessary, for example, in the case where a SELECT DISTINCT is indicated in the query expression 2511 that requires all duplicates be removed (e.g. regardless of whether corresponding input rows had duplicate values vs. a given input row/given pair being reflected in the output twice due to processing the disjunction via parallelized processes).

As a particular example, if the join is followed by a DISTINCT operation, the expression can be rewritten as union of hash joins followed by a distinct. Consider the following example query expression 2511.

```
SELECT DISTINCT ... FROM table1, table2 WHERE table1.col1 =
table2.col1 or table1.col2 = table2.col2 or table1.col3 = table2.col3
```

For example, this example expression corresponds to the example predicate indicated in the example above, where a SELECT DISTINCT is applied.

This example expression can be rewritten to indicate applying of a plurality of corresponding join processes 2530 as follows:

```
SELECT DISTINCT ... FROM table1, table2 WHERE table1.col1 =
table2.col1 UNION DISTINCT SELECT
DISTINCT ... FROM table1, table2 WHERE table1.col2 = table2.col2
UNION DISTINCT SELECT DISTINCT ...
FROM table1, table2 WHERE table1.col3 = table2.col3
```

As illustrated in FIG. 26C, the operator flow generator module 2514 can forego generation and use of the appended row identifiers (e.g. forego the structuring of FIG. 26B in executing the join expression 2516) when a select distinct 3944 is determined to be indicated in the query expression 2511, as the query is evaluated correctly when applying the union distinct without applying these identifiers due to the requirement for the SELECT DISTINCT 3944 being indicated in the query expression 2511. For example, when the query expression 2511 is instead determined to not indicate a SELECT DISTINCT 3944, the operator flow generator module 2514 can be configured to generate the corresponding operator execution flow 2817 to apply the generation and use of the appended row identifiers (e.g. by implementing the structuring of FIG. 26B in executing the join expression 2516).

In some embodiments, any embodiment described herein of implementing NNF blocks and/or appending row identifiers for use in removing duplicate rows in union distincts applied to parallelized paths, for example, in evaluating NNF expressions can similarly be applied only when SELECT DISTINCT statements 3944 are determined to not be indicated in the corresponding query expression, where operator flow generator module 2514 is configured to generate the corresponding operator execution flow 2817 to apply such structuring using appended row identifiers based on determining the corresponding query expression does not include a SELECT DISTINCT statement 3944.

Figure 26D:
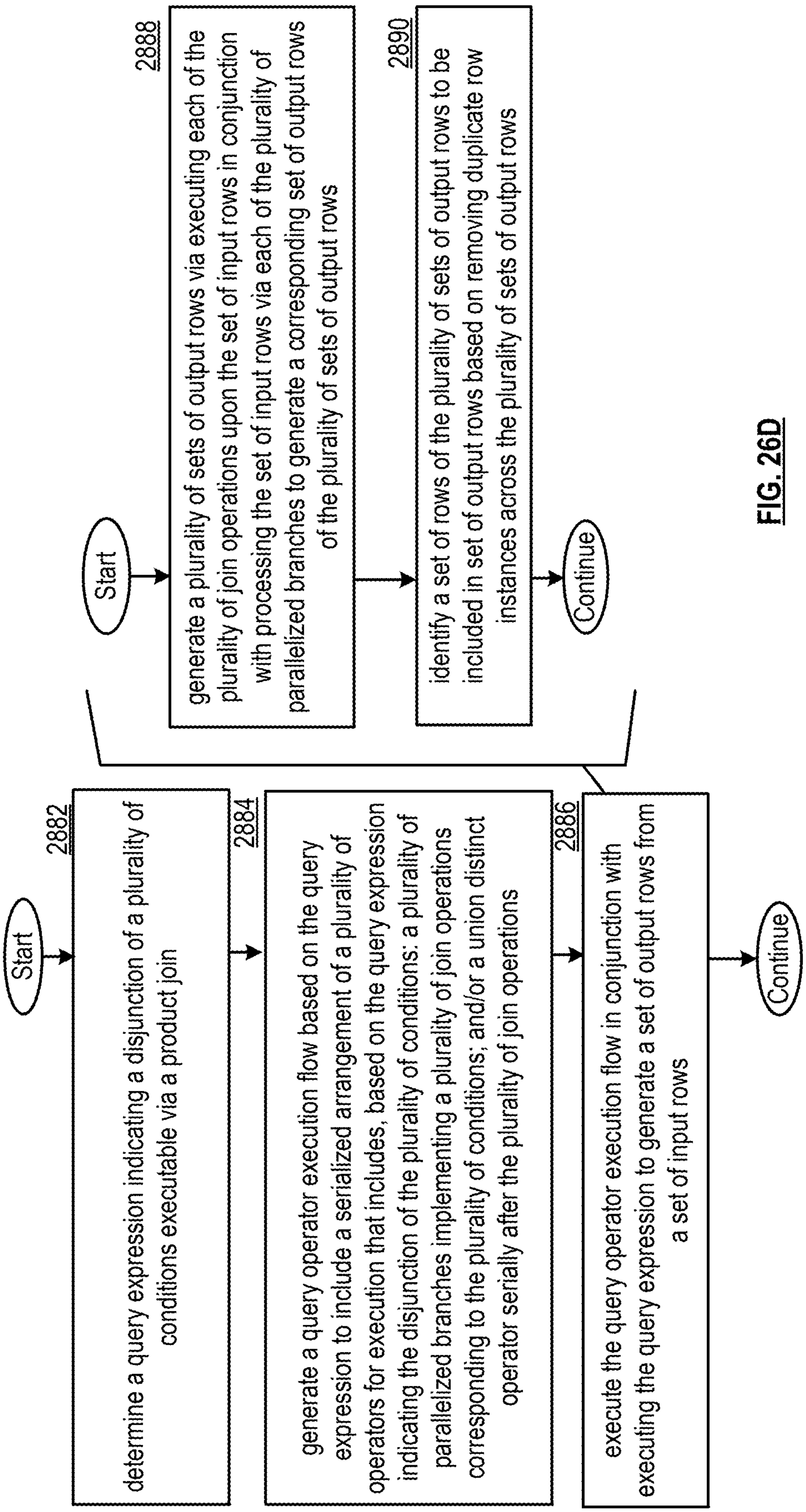
FIG. 26D is a logic diagram illustrating a method for execution in accordance with various embodiments.

FIG. 26D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26D, for example, based on participating in execution of a query being executed by the database system 10. Some or all of the method of FIG. 26D can be performed by nodes executing a query in conjunction with a query execution, for example, via one or more nodes 37 implemented as nodes of a query execution module 2504 implementing a query execution plan 2405. Some or all of the steps of FIG. 26D can optionally be performed by any other one or more processing modules of the database system 10.

Some or all steps of FIG. 26D can be performed in parallel and/or concurrently via a plurality of parallelized processing resources (e.g. implemented via a plurality of nodes 37 and/or a plurality of processing core resources 48). For example, multiple instances of any given step of FIG. 26D can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 26D can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 26D can be performed to implement some or all of the functionality of the database system 10 as described in conjunction with FIGS. 26A-26C, for example, by implementing some or all of the functionality of query execution module 2504 and/or operator flow generator module 2514. For example, some or all of the steps of FIG. 26D are based on executing a plurality of join processes and a union distinct operation on output of the plurality of join processes. Some or all steps of FIG. 26D can be performed by database system 10 in accordance with other embodiments of the database system 10 and/or nodes 37 discussed herein. Some or all of the steps of FIG. 26D can be performed in conjunction with performing some or all steps of any other method described herein.

Step 2882 includes determining a query expression indicating a disjunction of a plurality of conditions executable via a product join. Step 2884 includes generating a query operator execution flow based on the query expression to include an arrangement of a plurality of operators for execution. In various examples, the arrangement of the plurality of operators for execution that includes, based on the query expression indicating the disjunction of the plurality of conditions: a plurality of parallelized branches implementing a plurality of join operations corresponding to the plurality of conditions; and/or a union distinct operator serially after the plurality of join operations. Step 2886 includes executing the query operator execution flow in conjunction with executing the query expression to generate a set of output rows from a set of input rows.

Performing step 2886 can include performing step 2888 and/or 2890. Step 2888 includes generating a plurality of sets of output rows via executing each of the plurality of join operations upon the set of input rows in conjunction with processing the set of input rows via each of the plurality of parallelized branches to generate a corresponding set of output rows of the plurality of sets of output rows. Step 2890 includes identifying a set of rows of the plurality of sets of output rows to be included in set of output rows based on removing duplicate row instances across the plurality of sets of output rows.

In various examples, a query resultant for the query expression is generated based on the set of output rows.

In various examples, the set of input rows includes a first set of input rows and a second set of input rows. In various examples, executing the each of the plurality of join operations upon the set of input rows includes processing the first set of input rows via the each of the plurality of join operations as left input rows and processing the second set of input rows via the each of the plurality of join operations as right input rows In various examples, the query expression includes a FROM clause indicating a first relational database table and a second relational database table. In various examples, the first set of input rows correspond to rows of the first relational database table and wherein the second set of input rows correspond to rows of the second relational database table.

In various examples, each of the plurality of conditions indicates a match condition implemented via a corresponding join operation of the plurality of join operations based on indicating a relationship between values of a pair of columns required for inclusion of a pair of rows from the first set of input rows and the second set of input rows in a corresponding set of output rows of the plurality of sets of output rows. In various examples, a first one of the pair of columns is included in the first relational database table. In various examples, a second one of the pair of columns is included in the second relational database table. In various examples, different ones of the plurality of conditions indicate different pairs of columns.

In various examples, the serialized arrangement of the plurality of operators for execution further includes: a set of unique identifier generator operators that includes a first unique identifier generator operator and a second unique identifier generator operator, and/or a set of tee operators, serially after the set of unique identifier generator operators and serially before the plurality of parallelized branches, that includes a first tee operator and a second tee operator. In various examples, executing the query expression is further based on: generating a unique identifier for each of the first set of input rows via executing the first unique identifier generator operator upon the first set of input rows; generating a unique identifier for each of the second set of input rows via executing the second unique identifier generator operator upon the second set of input rows; assigning each of the first set of input rows for processing by each of the plurality of parallelized branches via the first tee operator, and/or assigning each of the second set of input rows for processing by each of the plurality of parallelized branches via the second tee operator. In various examples, each row in any of the plurality of sets of output rows has a corresponding pair of unique identifiers based on being generated from a first corresponding row of the first set of input rows having a first corresponding unique identifier and based on being generated from a second corresponding row of the second set of input rows having a second corresponding unique identifier. In various examples, removing the duplicate row instances across the plurality of sets of output rows is based on generating the set of output rows to include up to one row having any given pair of unique identifiers.

In various examples, the set of output rows includes a set of columns. In various examples, multiple ones of the set of output rows have a same set of values for the set of columns based on having different pairs of unique identifiers as a result of having been generated from different pairs of rows.

In various examples, the unique identifier for each of the first set of input rows is included in a first row identifier column appended to a first set of columns of the first set of input rows. In various examples, the unique identifier for each of the second set of input rows is included in a second row identifier column appended to a second set of columns of the second set of input rows. In various examples, the each row in the any of the plurality of sets of output rows includes a set of output columns that includes the first row identifier column and the second row identifier column.

In various examples, the serialized arrangement of the plurality of operators for execution further includes a project out operator, serially after the union distinct operator, applied to the first row identifier column and the second row identifier column. In various examples, executing the query operator execution flow includes removing the first row identifier column and the second row identifier column from the set of rows identified to be included in the set of output rows based on executing the project out operator.

In various examples, the first unique identifier generator operator is implemented via a first extend operator operable to generate, for each of the first set of input rows, a corresponding random value for the first row identifier column appended to the first set of input rows, and wherein the second unique identifier generator operator is implemented via a second extend operator operable to generate, for each of the second set of input rows, a corresponding random value for the second row identifier column appended to the second set of input rows.

In various examples, the unique identifier for each of the first set of input rows and each of the second set of input rows is generated as a corresponding unique 128-bit identifier.

In various examples, the serialized arrangement of the plurality of operators for execution is generated to include the set of unique identifier generator operators based on the query expression not including a SELECT DISTINCT statement.

In various examples, the query expression includes a SELECT DISTINCT statement. In various examples, the union distinct operator implements the SELECT DISTINCT statement.

In various examples, the set of output rows includes a set of columns, and wherein the SELECT DISTINCT statement is implemented via the union distinct operator based on including up to one row in the set of output row having any given set of column values for the set of columns.

In various examples, the serialized arrangement of the plurality of operators for execution is generate to exclude any unique identifier generator operators based on the query expression including the SELECT DISTINCT statement.

In various examples, the disjunction of the plurality of conditions is indicated in a WHERE clause. In various examples, the plurality of conditions are separated by a plurality of OR operators in the WHERE clause.

In various examples, a plurality of keywords included in the query expression does not include a join keyword for executing the product join.

In various examples, generating the query operator execution flow includes performing an optimizing step to indicate execution of the query via the plurality of parallelized branches implementing the plurality of join operations rather than execution of the query via a product join operation.

In various examples, the query operator execution flow is generated to include an optimized join tree implementing a plurality of join operations based on: identifying a set of filter predicates indicated by the query expression; generating, based on the plurality of input row sets and the set of filter predicates, cardinality data for each of the plurality of input row sets; and/or generating the optimized join tree based on selecting an ordering for applying the plurality of join operations to the plurality of input row sets based on the cardinality data for the each of the plurality of input row sets, wherein each of the plurality of join operations of the optimized join tree is applied to a pair of row sets that includes: at least one of the plurality of input row sets, or at least one intermediate row set corresponding to output of at least one other one of the plurality of join operations.

In various embodiments, any one of more of the various examples listed above are implemented in conjunction with performing some or all steps of FIG. 26D. In various embodiments, any set of the various examples listed above can be implemented in tandem, for example, in conjunction with performing some or all steps of FIG. 26D, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26D, for example, in conjunction with further implementing any one or more of the various examples described above.

In various embodiments, the operational instructions, when executed by the at least one processor, cause the database system to determine a query expression indicating a disjunction of a plurality of conditions executable via a product join. In various embodiments, the operational instructions, when executed by the at least one processor, further cause the database system to generate a query operator execution flow based on the query expression to include an arrangement of a plurality of operators for execution that includes, based on the query expression indicating the disjunction of the plurality of conditions: a plurality of parallelized branches implementing a plurality of join operations corresponding to the plurality of conditions; and/or a union distinct operator serially after the plurality of join operations. In various embodiments, the operational instructions, when executed by the at least one processor, further cause the database system to execute the query operator execution flow in conjunction with executing the query expression to generate a set of output rows from a set of input rows based on: generating a plurality of sets of output rows via executing each of the plurality of join operations upon the set of input rows in conjunction with processing the set of input rows via each of the plurality of parallelized branches to generate a corresponding set of output rows of the plurality of sets of output rows; and/or identifying a set of rows of the plurality of sets of output rows to be included in set of output rows based on removing duplicate row instances across the plurality of sets of output rows. In various embodiments, a query resultant for the query expression is generated based on the set of output rows.

FIGS. 27A-27K illustrate embodiments where a query expression that indicates joining of a plurality of input row sets via executing a plurality of corresponding join operations in an ordering specified by a join tree generated in generating a corresponding query operator execution flow. The embodiments illustrated in 27A-27K can be utilized to implement one or more nodes 37 of one or more computing devices 18 implementing database system 10. Some or all features and/or functionality of FIGS. 27A-27K can be utilized to implement any embodiment of database system 10 described herein.

Figure 27A:
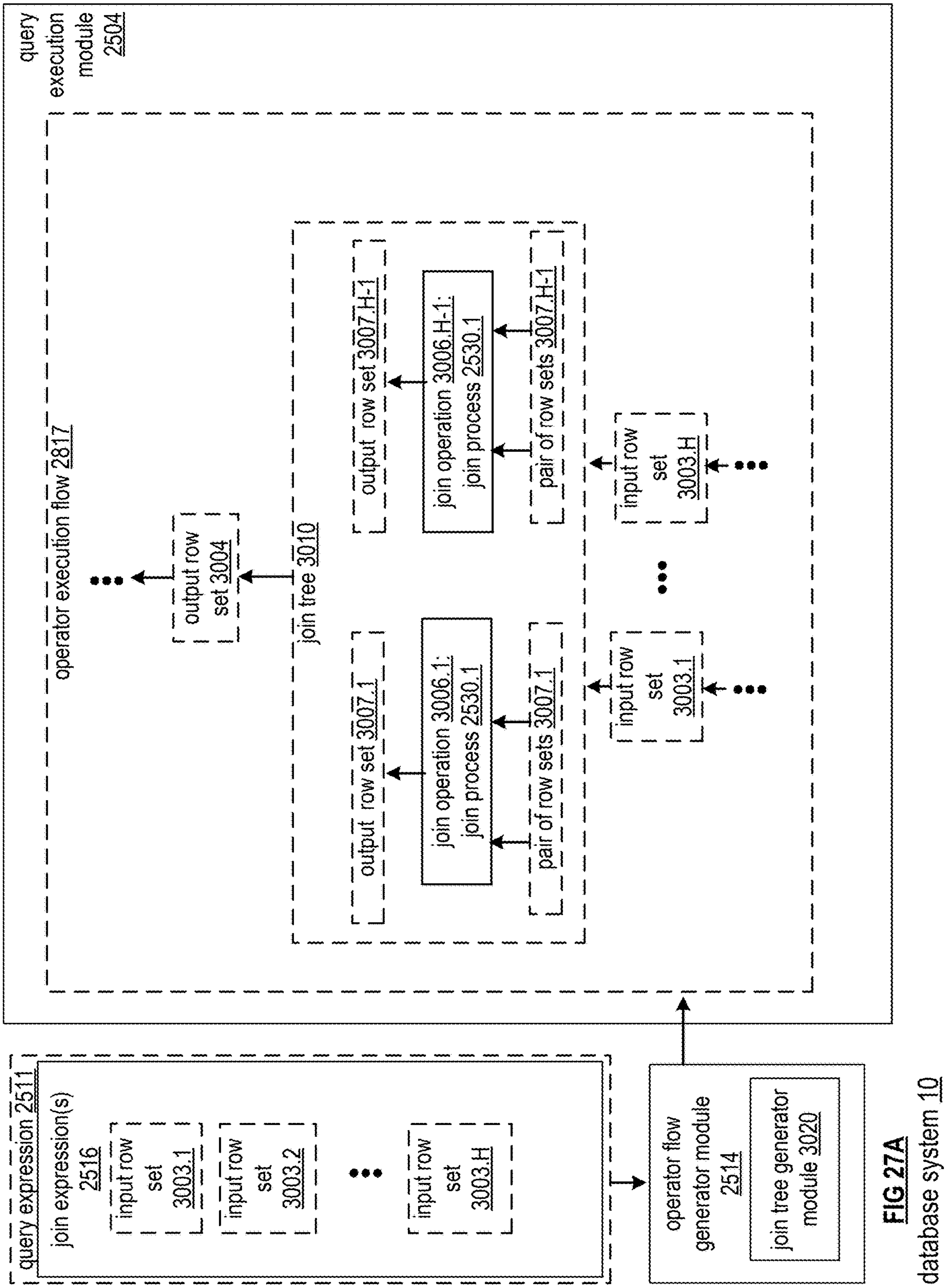
FIGS. 27A-27C illustrates embodiments of a query operator execution flow executed via a query execution module that implements execution of a join tree generated via a join tree generator module in accordance with various embodiments.

FIG. 27A illustrates an embodiment of a query operator execution flow 2817 generated from a query expression 2511 for execution via query execution module 2504 that indicates a join tree that includes a plurality of join operations 3006.1-3006.H. The join operations 3006.1-3006.H can be collectively implemented via their topology in join tree 3010 to join a plurality of input row sets 3003.1-3003.H to build a corresponding output row set 3004, based on one or more join expressions 2516 of the query expression indicating the plurality of input row sets 3003.1-3003.H be joined. The join tree 3010 can be generated for inclusion in the operator execution flow 2817 via implementing a join tree generator module.

Some or all features and/or functionality of operator execution flow 2817 of FIG. 27A can be implemented via any embodiment of operator execution flow 2817, query operator execution flow 2517, and/or query operator execution flow 2422 described herein. Some or all join operations 3006 of FIG. 27A can be implemented via execution of a corresponding join process 2530 and/or one or more join operators 2535. Operator flow generator module 2514, query execution module 2504, and/or query expression 2511 of FIG. 27A can be implemented via any embodiment of operator flow generator module 2514, query execution module 2504, and/or query expression 2511 described herein.

Figure 27C:
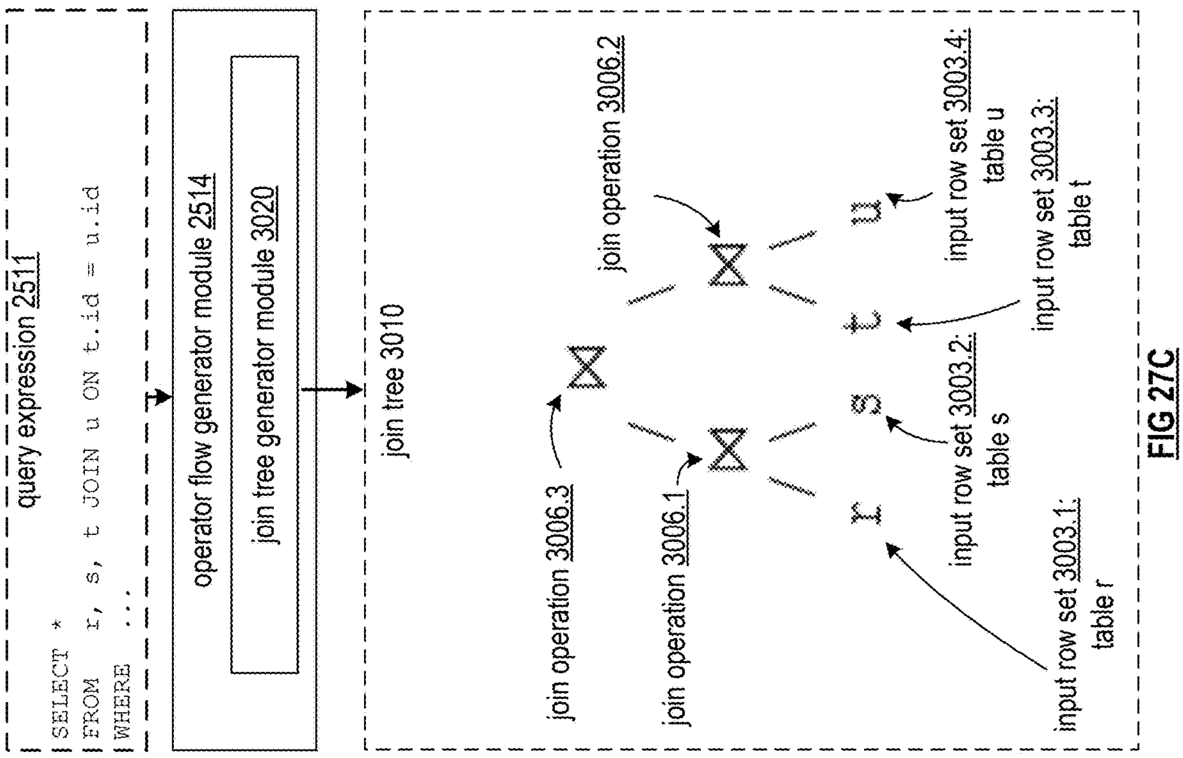
Figure 27B:
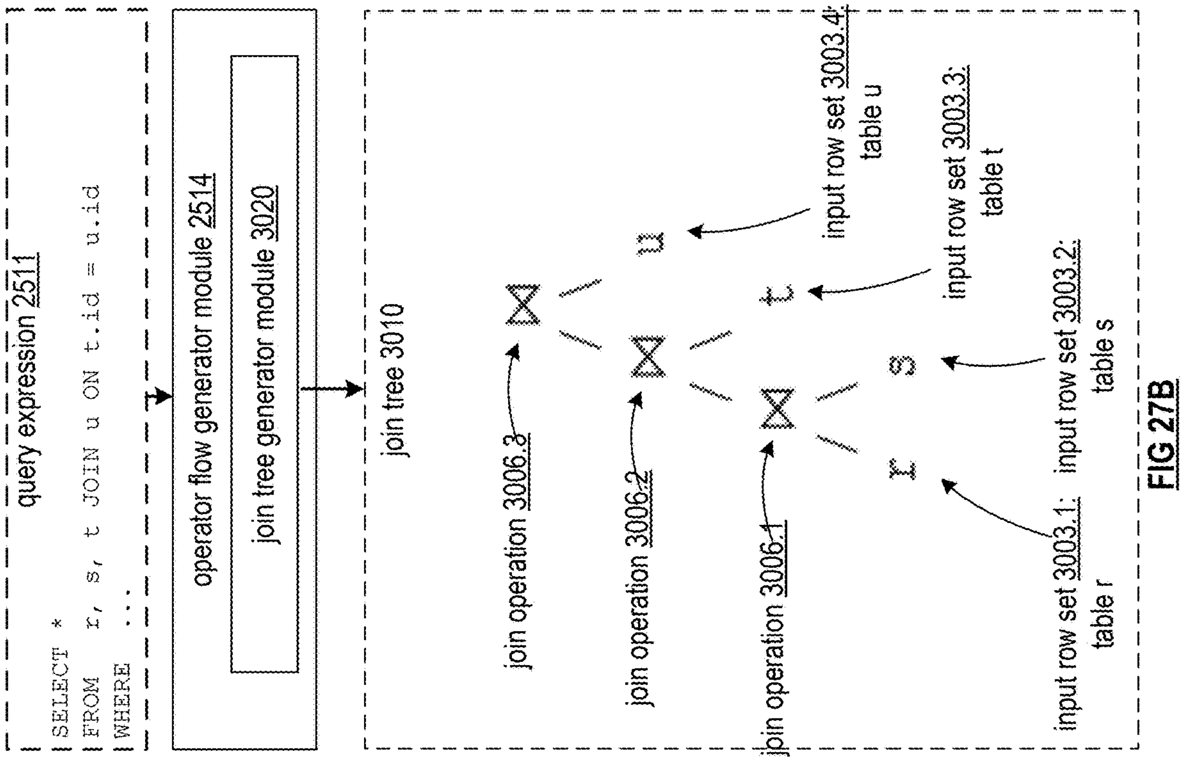

FIGS. 27B and 27C illustrate example join trees 3010 generated via a join generator module 3020 for an example query expression 2511 indicating joining of an example set of tables r, s, t, and u (e.g. where tables r, s, t, and u corresponding to input row sets 3003.1, 3003.2, 3003.3, and 3003.4 respectively). Query expression 2511 can be implemented as a SQL query expression or query expression in other syntax. Query expression 2511 can be implemented via some or all of the following commands and/or corresponding logic:

```
SELECT *
FROM r, s, t JOIN u ON t.id = u.id
WHERE ...
```

As a particular example, the example query expression 2511 is a code snippet from a larger query expression, such as:

```
SELECT *
FROM r, s, t JOIN u ON t.id = u.id
WHERE ...
ORDER BY ...
LIMIT ...
```

As used herein, the '⋈' symbol can represent a join operation executed upon the input on either side of this symbol. In some embodiments, joins depicted via the '⋈' are implemented as inner joins, where the '⟕' symbol represents left outer joins, where the '⟕' symbol represents right outer joins, and/or where the '⟗' symbol represents full outer join. Some or all instances of the '⟗' symbol can optionally correspond to any type of join, and not strictly an inner join.

FIG. 27B illustrates a first example of join tree 3010 generated via join tree generator module 3020 for joining tables r, s, t, and u that is implemented via a left-deep tree topology. FIG. 27C illustrates a second example join tree 3010 for joining tables r, s, t, and u that is implemented via a bushy tree topology.

Both join trees of FIGS. 27B and 27C are valid options for producing the desired result. However, the differences in join ordering applied to tables r, s, t, and u may yield differences in query performance in executing the respective query (e.g. runtime, memory utilization, energy/power utilization involved, etc.). For example, such differences can be based on sizes of the different tables, how many rows are filtered out via join operations on different pairs of tables, etc.

Such differences can be based on differences in cardinality of the input row sets and/or intermediate row sets generated via output of join operations utilized as input to other join operations. As used herein, cardinality can correspond to number of unique rows (e.g. number of unique sets of column values across all columns, or optionally number of unique column value for a column upon which a join is performed). As used herein, cardinality can optionally correspond to and/or be estimated as and/or based on a total number of rows (e.g. number of rows in the respective table for an input row set; estimated number of rows to be included in an intermediate row set generated as output of another join operation, etc.).

Such differences can be based on differences in selectivity of filters applied to generate the input row sets and/or intermediate row sets generated via output of join operations utilized as input to other join operations. As used herein, selectivity can indicate a proportion of input rows expected to be included in output after filtering via a respective filter and/or can indicate a proportion of input rows expected to be filtered out. For example, a selectivity value for a given filter indicates this proportion as a value between 0 and 1. Selectivity of a filter can optionally be a function of cardinality of a corresponding row set used as input to the filter. Such filters can include filters applied to tables that implement query filtering predicates (e.g. rows are filtered out of tables prior to being joined based on filtering parameters for these tables indicated in the query). Such filters can include join operations themselves that emit only rows (e.g. generated from pairs of rows in each of two respective input row sets) meeting corresponding join predicates, such as a matching condition for the respective join operation as described herein, where the strictness of this matching condition and/or proportion of pairs of rows across the pair of row sets as input to the join expected to meet these matching conditions dictates the selectivity.

FIG. 27D illustrates an example of different possible join trees 3010 for implementing for a query that joins tables "r" with 1'000'000 rows, "s" with 1'000 rows and "t" with 10 rows. The cardinality (e.g. estimated as/based on number of rows that can be emitted) of the first join in the plan, the intermediate join, can vary enormously. For example, the selection of join tree from this set of options for executing the query can make the difference between building an in-memory hash table for the top join vs. an external join algorithm involving spilling.

In some embodiments, filtering predicates (e.g. join conditions)make estimation of output cardinality even more complex. Furthermore, different join types like semi/anti/outer as well as set operations (union/intersect/except) can further influence output cardinality. Additionally, more complex query expressions have more tables involved in the join yielding even more possible options to consider.

Different join orders can have a significant impact on query performance, for example by joining tables such that intermediate results are kept small. In some embodiments, the join order implemented for a given query is set as and/or influenced primarily by the order in which tables occur in the query expression (e.g. corresponding SQL statement text).

Figure 27E:
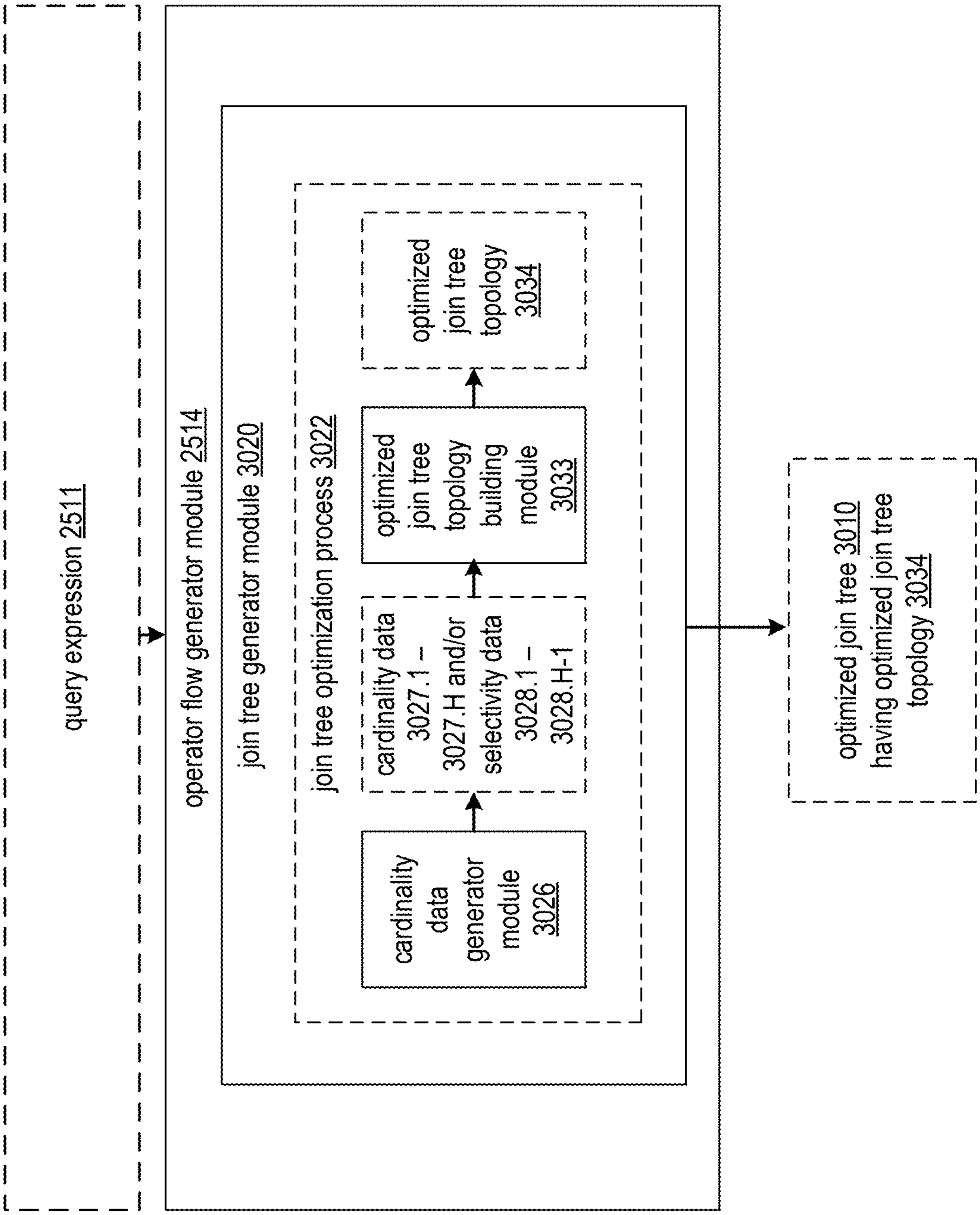
FIG. 27E-27H illustrates embodiments of an operator flow generator module that implements an optimized join tree topology building module to generate an optimized join tree in accordance with various embodiments.

FIG. 27E illustrates an embodiment of operator flow generator module that implements join tree generator module 3020 to generate an optimized join tree 3010 having an optimized join tree topology 3034 via performance of a join tree optimization process 3022.

In particular, in some embodiments, it can be ideal to intelligently select a join tree for generating a corresponding join on a plurality of tables. For example, intelligent selection of a join tree as an optimized join tree 3010 generated by join tree generator module 3020 based on performing join tree optimization process 3022 can improve the technology of database systems based on rendering faster runtimes and/or otherwise better query performance.

As a particular example, a join tree is selected via join tree optimization process 3022 based on selecting a pair of input for the first join operation to emit/be expected to emit as few rows a possible, based on the size (e.g. cardinality) of the respective input row sets and/or selectivity rendered by the join itself (e.g. based on corresponding join predicates of the join operation). For example, this strategy makes it less likely that an external join involving spilling is required, which can render faster runtimes in executing corresponding queries in the case where no spilling to disk is required. Applying this methodology to the example case of FIG. 27D would render selection of the second join tree option 3010.B via join tree optimization process 3022: in this case, the pair of tables "s" and "t" are selected based on having the smallest output cardinality (e.g. smallest expected output), for example, based on having the smallest numbers of rows.

However, in some embodiments, finding the optimal plan for a SQL query is an NP-hard problem. The can solution space grows exponentially with the number of tables referenced in a query. FIGS. 27E-27K illustrate embodiments of selecting an optimized join tree, where this join tree is not necessarily the singularly optimal join tree of every possible option, but is yet intelligently selected as an optimal/sufficiently efficient tree, for example, that would perform better than a plurality of other options considered at least in part. For example, optimized join tree 3010 is selected via performance of a greedy optimization algorithm and or is selected as a local maxima/minima rather than a global maxima/minima in terms of optimizing best performance and/or in terms of minimizing cardinality of the lower joins in the tree.

In some embodiments, the join tree optimization process 3022 is performed based on, first, collecting all tables to be joined, together with their join predicates/filters. In some embodiments, set operations like union, except and intersect can also be implemented to "combine" tables and can be implemented as joins themselves to be ordered. (e.g. in particular, except/intersect operations can be treated as semi/anti joins with specialized filters). Other join operations may be expressed implicitly rather than explicitly in the statement (e.g. a join operation need not be stated with the "join" function call to render performance of a corresponding join operation).

The identification of tables to be joined along with their join predicates can be implemented via cardinality data generator module 3026, which can be implemented to determine cardinality data 3027.1-3027.H for the plurality of input row sets 3003.1-3003. H, for example, once identified as tables to be joined. This can include applying a selectivity of a filter upon a given input table to a size of the input table and/or otherwise determining/estimating how many/what proportion of rows of an accessed and/or generated table will persist after any filtering and be processed by a join operation of the plurality of join operations. This can optionally include generating selectivity data 3028.1-3028.H-1 based on join predicates of each join operation 1-H-1 to be applied to join all H input row sets. In some cases, this selectivity data for a given join operation cannot be determined until it is determined which row sets will be applied as input.

In some embodiments, the join tree optimization process 3022 is performed based on, second, determining the desired join order (e.g. arrangement/topology of the join tree 3010). The selection of join order can be implemented via optimized join tree topology building module 3033, which can perform a corresponding process/algorithm to select an optimized join tree topology 3034 for the optimized join tree 3010. As a particular example, optimized join tree topology building module 3033 can be implemented perform an iterative process and/or other process to build a corresponding join tree 3010 based on selecting input to subsequent join operations one at a time, for example, via a greedy optimization algorithm. In particular, in some embodiment the corresponding algorithm is configured with greater simplicity at the cost of being guaranteed to identify the global optimal solution, to ensure that this step does not take an extensive amount of time that could out-weigh the benefits of any runtime savings by the selection of optimized join tree. Example embodiments of applying optimized join tree topology building module 3033 are illustrated and discussed in conjunction with FIGS. 27F and 27G.

In some embodiments, the corresponding query operator execution flow 2817 is generated based on, third, applying the selected join order indicated in optimized join tree topology to the corresponding plan, which can include pushing operators down/rearranging operators, for example, via an optimizer (e.g. via corresponding xforms).

In some embodiments, the first step of collecting tables to be joined along with filtering predicates is based on, first, searching for leaf operators in the plan, which can become vertices in the join graph. For example, upwards traversal is performed from each leaf as long as only operators having a single parent and a single child are found, where the highest operator in such a chain is treated as vertex (e.g. as a corresponding input join set 3003), for example, where the chain itself is not further relevant.

In some embodiments, the first step of collecting tables to be joined along with filtering predicates is based on, second, searching for all join operators and all corresponding filter predicates (e.g. search for all superSelectOperator_t, hashJoinOperator_t, and productJoinOperator_t operators to find all filter predicates). In some embodiments, none of the other operator types can store filters/cnf's that could become join predicates.

In some embodiments, each disjunction in a found filter predicate is processed based on: first, when tree metadata has been collected before (e.g. including statistics), distribution data (e.g. pdfs) have been updated as well to provide output cardinalities and selectivities. In some embodiments, output cardinalities are only meaningful for leaf tree nodes in the join graph.

Meanwhile, cardinalities of higher operators (e.g. joins of joins) will change with different join orders anyway. To calculate those, the selectivity of the disjunction is important.

In some embodiments, the number of referenced leaf tree nodes (the highest-op of a leaf branch) determines how the disjunction is treated. In the case where a non-leaf is referenced, the column originates from an extend operator somewhere higher up in the plan, where the disjunction is ignored since it is not known whether the extend can be pushed down to a leaf. In the case where a single leaf is referenced, the disjunction is a filter on the leaf only and is assumed to be pushed down. The disjunction's selectivity can be factored into the output cardinality of the leaf. In the case where two leaves are referenced, the disjunction is treated as a join predicate and/or becomes an edge in the join graph. In the case where more than 2 leafs are referenced (e.g. predicates like table1.col=2 OR table2.col=table3.col), the disjunction can be treated as hyper-edges in the join graph and/or can optionally be ignored in embodiments where hyper-edges are not supported.

In some embodiments, the second step of determining join order via optimized join tree topology building module 3033 is performed after a plan generation phase of optimizing query operator execution flow 2817 (e.g. before a pre-optimization phase), which can include performing parsing and/or validation, and/or generating an initial operator tree as query operator execution flow 2817. In some embodiments, based on determining join order via optimized join tree topology building module 3033 after plan generation: the specific join type (e.g. product vs. hash join) is not yet known; most filters are still above the joins due to not yet being pushed down (e.g. which can reduce effectiveness of the optimization based on selectivity estimates not accounting for filtering that is pushed down later, and/or where only join conditions next to join operations are applied, for example, only if specified in an ON clause); and/or other constructs (e.g. extend clauses) can occur between join operations.

In some embodiments, the second step of determining join order via optimized join tree topology building module 3033 is performed during the pre-optimization phase of optimizing query operator execution flow 2817 (e.g. after the plan generation phase and/or before a heuristic optimization phase), which can include: pushing reorders into sets, converting eos, projecting before semi/anti, tee detection & cleanup, merging adjacent ops, pushing up reorders/renames/offsets/make-tuple/unnest, converting count to count-star, pushing down project-out, pushing up joins, slitting aggregation distinct and/or sorted aggregations, deleting unnecessary tees, converting product joins to hash joins, projecting before partial aggregation, filtering nulls before aggregation, making window operations more idea, removing unnecessary sorts, pushing down selects, pushing down joins closer to IO, and/or inverting join children (e.g. swapping left and right children), and/or pushing down windows. In some embodiments, the selection of optimized join tree topology 3034 is improved based on determining join order via optimized join tree topology building module 3033 during pre-optimization, as a result of performing pre-optimization based on: filters are pushed down already which enables transitive column equity analysis; GDC joins are pushed up; join type as known; join conditions (e.g. from WHERE clause) are pushed into the join operation; and/or cardinalities are known. In some embodiments, drawbacks of selection of optimized join tree topology 3034 based on determining join order via optimized join tree topology building module 3033 during pre-optimization include: the presence of additional join operation (e.g. tees), join operators being further apart in the plan with other operators in between (e.g. which could prevent moving joins around); pushing joins closer to IO adding shuffles and/or broadcasts which can inhibit join push down in various situations, and/or the necessity of converting hash joins to product joins.

In some embodiments, the second step of determining join order via optimized join tree topology building module 3033 is performed during the a heuristic optimization of optimizing query operator execution flow 2817 (e.g. after the pre-optimization phase and/or before a post-optimization phase), which can include (e.g. via multiple parallelized threads): pushing gathers up, L1/L3 push down, pushing down limit/offset/load, swapping joins next to each other (E.g. converting more product joins into hash joins), merging tees, pushing up tees/project/select/GDC join, pushing down select/project, pushing down select above tees into index, spatial join optimizations, pushing adjacent aggregation and/or set around joins, and/or pushing down expensive operations. In some embodiments, drawbacks of selection of optimized join tree topology 3034 based on determining join order via optimized join tree topology building module 3033 during heuristic optimization include: the presence of additional join operation (e.g. tees), join operators being further apart in the plan with other operators in between (e.g. which could prevent moving joins around); pushing joins closer to IO adding shuffles and/or broadcasts which can inhibit join push down in various situations, and/or the necessity of converting hash joins to product joins.

In some embodiments, the second step of determining join order via optimized join tree topology building module 3033 is performed during the a post-optimization of optimizing query operator execution flow 2817 (e.g. after the heuristic optimization phase), which can include: removing pointless aggregations, pushing up reorder/renames, pushing down project-out, adding unneeded unions before semi/anti, converting inner to semi joins, pushing down expensive operations, handling virtual tables, converting distinct aggregation into union distinct+aggregation, converting count into count-star, combining adjacent offset/limit/project, adding sort before grouped offset/limit, combining projects and index, cleaning filters at IO, handling segment distinct, and/or pushing down sort.

Figure 27F:
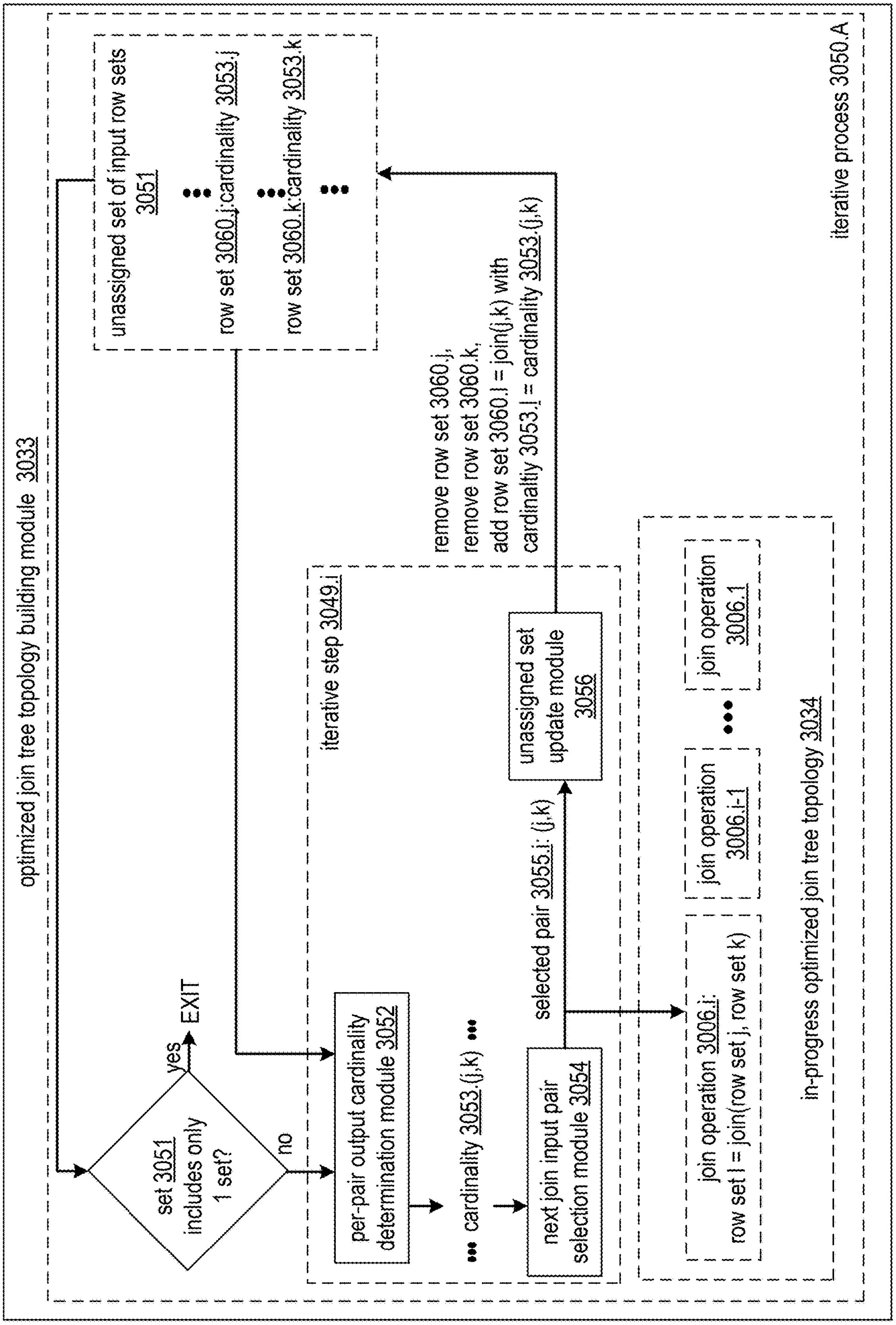

FIG. 27F illustrates an example of an optimized join tree building module 3033 that implements a first type of iterative process 3050.A to generate optimized join tree topology.

In some embodiments, optimized join tree building module 3033 is implemented based on keeping a set of all the row sets (e.g. tables) yet to be joined as an unassigned set of input rows 3051 of row sets 3060, where initially this is set includes all identified input row sets 3003.1-3003.H as its row sets 3060, and where intermediate row sets corresponding to output of join operations are added to this unassigned set of input rows 3051 as additional row sets 3060 as the iterative process progresses.

First, a first iterative step 3049.1 of iterative process 3050.A is performed to select two input row sets 3060 (e.g. tables) from the unassigned set of input rows 3051 to join such that the expected output cardinality is the lowest (e.g. the intermediate set of rows generated by the join is known/expected to be the smallest). This output cardinality for some or all possible pairs of rows in unassigned row set can be estimated via a per-pair output cardinality determination module 3052 that generates a cardinality 3053 for each of these pairs. For example, the cardinality 3053 can be estimated based on any filters that could be pushed below the join, and thus affect input cardinalities, as well as any join filter condition (if any) that would affect the output cardinality of the join.

As rearranging joins may change input/output cardinalities, the cardinalities can be calculated by multiplying the input cardinality of each input with the selectivity, where for filters, the selectivity is a value between 0 and 1 and defines the percentage of the rows satisfying the filter predicate. For joins, the output cardinality is determined by "n×m" (with "n" and "m" being the output cardinality of the join's children), and this product is multiplied by the selectivity of the join condition(s), which is also a filter.

For example, the per-pair output cardinality determination module generates cardinalities 3053 as a function of cardinalities of the input rows, where cardinality 3053.(*j,k*) is a function of cardinality 3053.*j* and cardinality 3053.*k* The selectivity of each filtering predicate that define join conditions as well as those predicates that are pure filters on a single table only can be applied in generating these cardinalities as well, where the cardinality 3053.(*j,k*) is a function of cardinality 3053.*j* and cardinality 3053.*k*, as well as the selectivity of the join being applied via the corresponding join conditions.

The input row sets selected for the join are removed from the set of things that need to be joined, and the output is added to this set. Then the processes is repeated to pick the next 2 tables from the set in the subsequent iteration of the process. This could involve the previously joined table or 2 new tables. In the latter case, the join tree becomes bushy. This process can continue until the set contains only a single table and everything is joined.

In some embodiments, this algorithm runs in O(n^3) where "n" is the number of tables. In some embodiments, this algorithm supports star joins where dimension tables are joined first, and the fact table is joined last (e.g. even if there are no join filter conditions between those dimension tables).

Figure 27G:
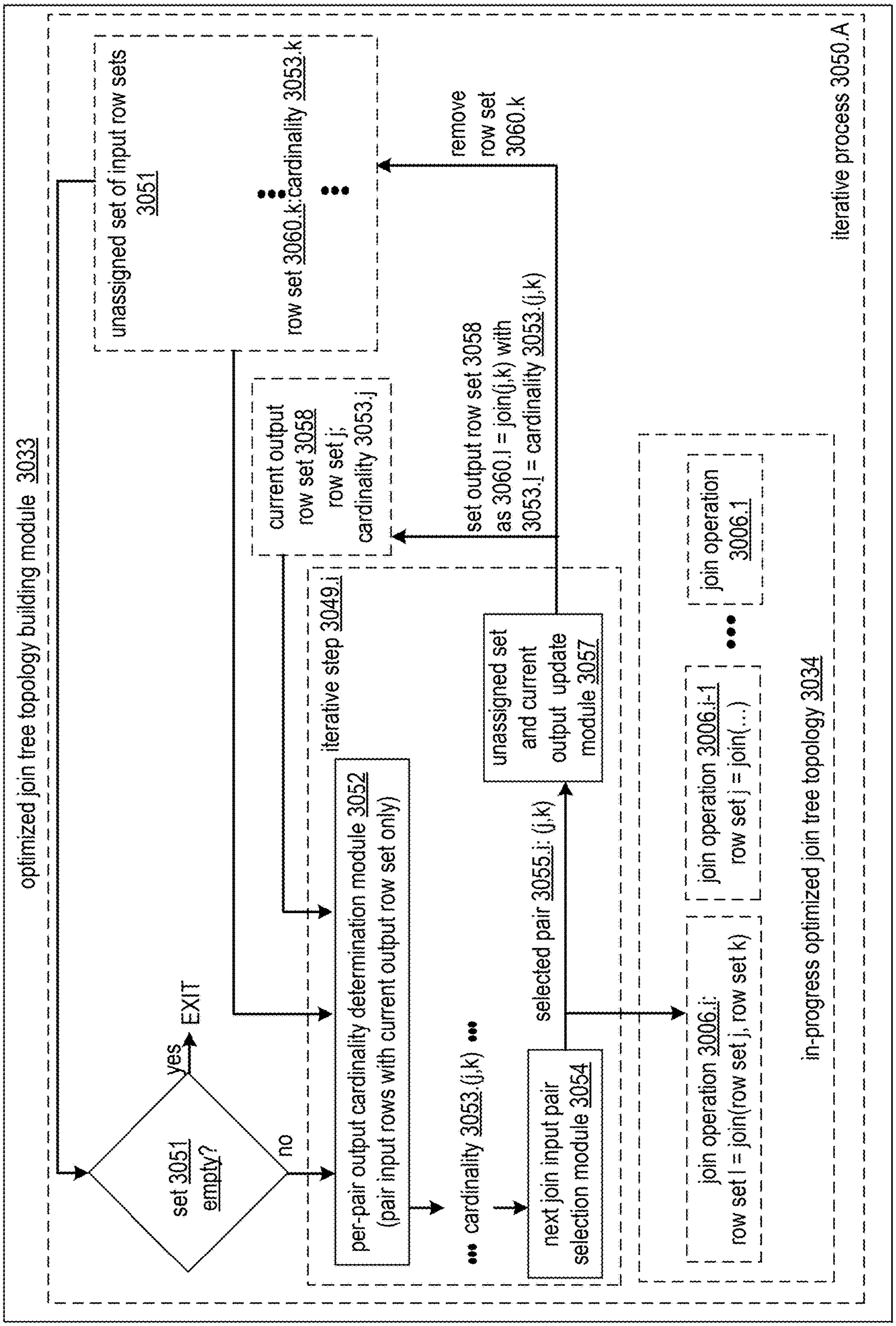

FIG. 27G illustrates an example of an optimized join tree building module 3033 that implements a second type of iterative process 3050.B to generate optimized join tree topology. This second type of iterative process 3050.B can be considered a simplistic join order optimization implemented as a variation of 3050.A that generates left-deep, right-deep, or zig-zag tree topologies, but not bushy tree topologies.

First, a first iterative step 3049.1 of iterative process 3050.B is performed to select two input rows (e.g. tables) from the unassigned set of input rows to join such that the expected output cardinality is the lowest (e.g. will produce the smallest intermediate result), for example considering any applicable join filter conditions (e.g. in the same fashion as performed in implementing 3050.B, and track this output row set as the current output row set 3058. The two selected rows are removed from the unassigned set of input rows 3051. The iterative step 3049 is performed, while the unassigned set of input rows 3051 is not empty, to find the next table in the unassigned set of input rows 3051 which will produce the smallest intermediate result (e.g. lowest output cardinality) when joined with the current output row set 3058 (considering any applicable join filter condition), where the selected table is removed from the unassigned set of input rows 3051, and where output of joining the selected table and the current output row set 3058 of a given iterative step 3049.*i* becomes the current output row set 3058 of a next iterative step 3049.*i*+1. Unlike iterative process 3050.A, no row sets are added to the unassigned set of input row sets 3051 over time.

In some embodiments, iterative process 3050.B is performed instead of iterative process 3050.A to reduce complexity of selecting a topology. In some embodiments, iterative process 3050.A is performed instead of iterative process 3050.B to render possible selection of a more efficient tree configuration (e.g. a bushy tree topology with better performance efficiency than any left-deep, right-deep, or zig-zag topology selected via iterative process 3050.B).

This selection of which process to perform can be configurable, determined via user input, etc. For example, iterative process 3050.B is performed instead of 3050.A in the case where the number of tables referenced is higher, while iterative process 3050.A is performed instead of 3050.B in the case where the number of tables referenced is lower (e.g. based on whether the table count exceeds a predefined threshold, etc.).

Figure 27H:
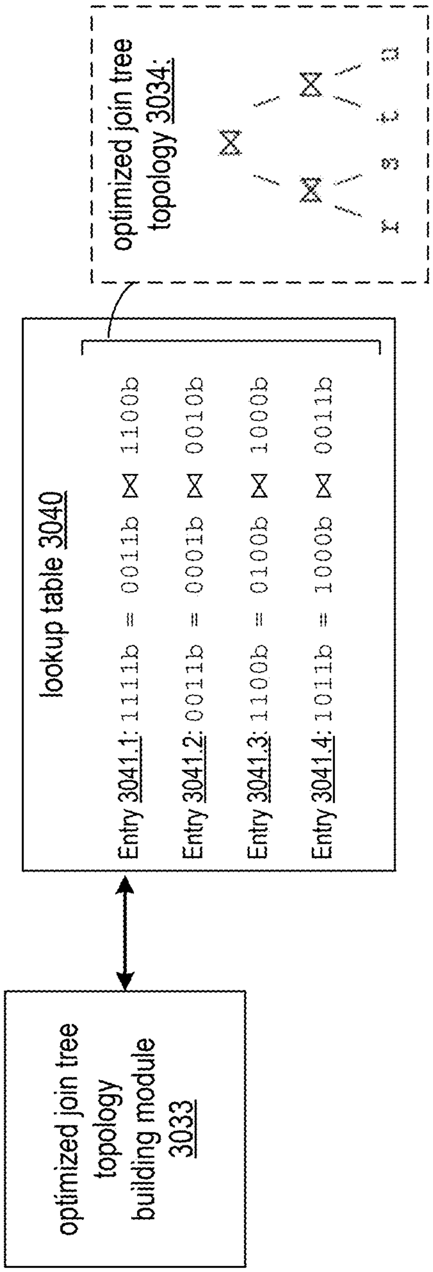

FIG. 27H illustrates an embodiment where optimized join tree topology 3034 is indicated by a lookup table 3040 generated by optimized join tree topology building module 3033.

In some embodiments, each leaf in the operator tree (e.g. each input row set 3003 of the plurality of input row sets 3003.1-3003.H) is uniquely identified by a single bit in a bit mask. The bit mask (e.g. called "join tree id", and/or implemented as a std-:bitset<64> and/or other type that can support bit operations like OR-ing 2 bit masks to describe a new set of joined table, where std-:bitset< > and/or the other corresponding type optionally has an optimized implementation for 64 bits or fewer where no offset calculations into an array of unsigned long values are necessary).

For example, a query accessing 4 tables "r", "s", "t", "u" uses those join tree ids: "r"=0001b, "s"=0010b, "t"=0100b, "u"=1000b. The join of tables "r" and "s" is identified by join tree id 0011b, and a join of "s" and "t" and "u" would be 1110b.

The goal of join order optimization can be to determine the steps how to compose the join tree ids starting with the single bits up to the final join tree id where all bits are set (1111b in the example here). A lookup table can store, for each join tree id, how it will be composed, for example:

$$1111b = 0011b \bowtie 1100b$$

-continued $$0011b = 0001b \bowtie 0010b$$

$$1100b = 0100b \bowtie 1000b$$

$$1011b = 1000b \bowtie 0011b$$

In some embodiments, the lookup table may contain entries that are created during optimization, but may not be needed for the final join order (e.g. 1011b).

In some embodiments, the bits in the left and right join tree ids are exclusive. For example, if they were not, there would be 2 paths from a leaf to a join, which can be an error. In other words, when composing joins to generate optimized join tree topology building module 3033, each bit must be set at the end, and it must have been set exactly once. In some embodiments generating of a lookup table to add new entries indicating output of new joins is performed when adding new join operations 3006 to in progress join tree topology 3034 in applying a corresponding algorithm, for example, via iterative process 3050.A and/or iterative process 3050.B.

Figure 27I:
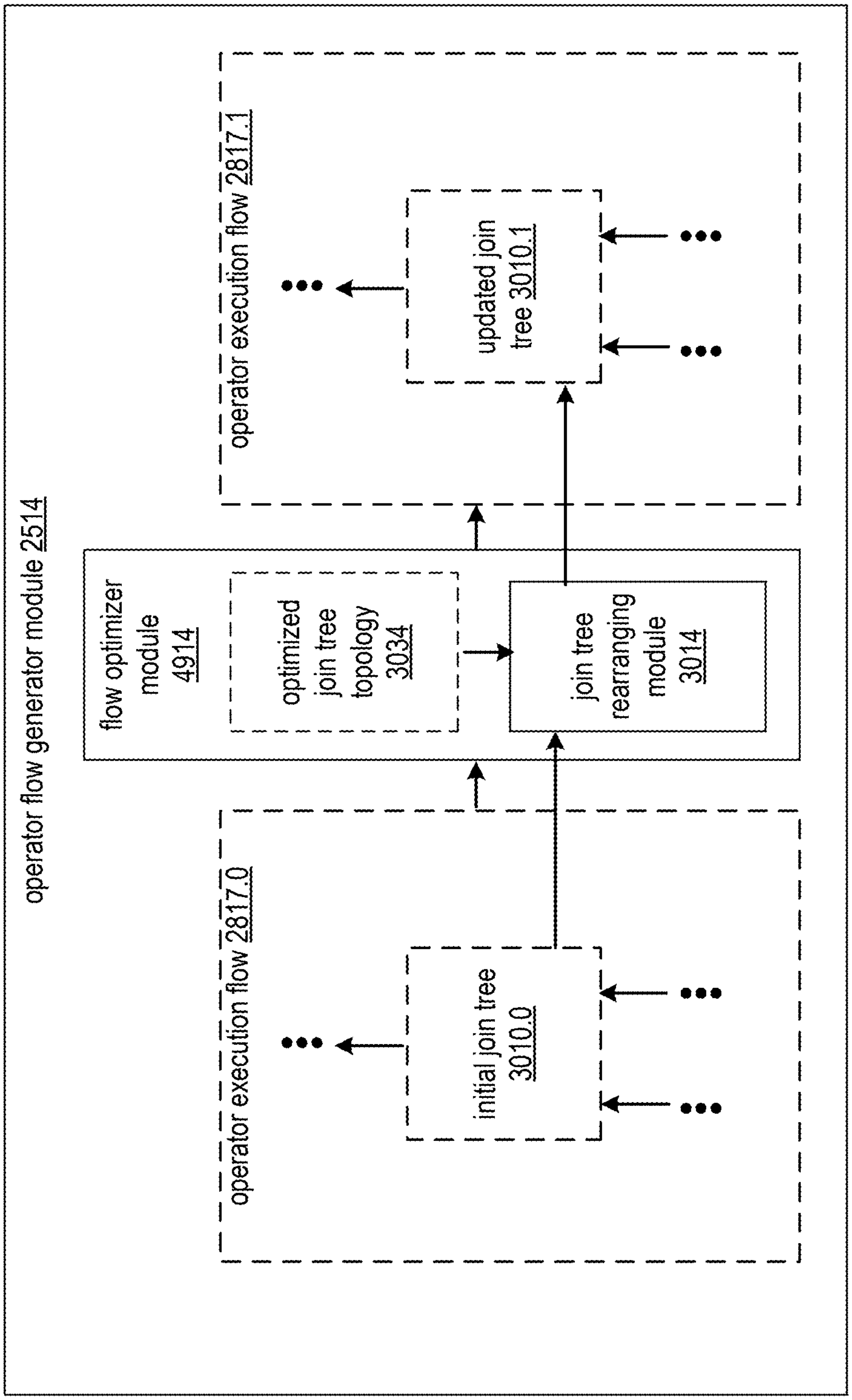
FIGS. 27I-27K illustrate embodiments of a join tree rearranging module implemented by a flow optimizer module that generates an updated join tree from an initial join tree in accordance with various embodiments.

FIG. 27I illustrates an embodiment where a flow optimizer module 4914 of query operator execution flow 2514 is operable to generate an updated operator execution flow 2817.1 from an initial operator execution flow 2817.0 based on implementing a join tree rearranging module 3014 to generate an updated join tree 3010.1 included in the updated operator execution flow 2817.1 to implement the optimized join tree topology 3034 (e.g. generated by optimized join tree topology building module 3033) via rearranging of an initial join tree 3010.0 included in the initial operator execution flow 2817.0.

In some embodiments, this includes moving join operators 3006 in the join tree 3010, such as pushing some join operators 3006 before other join operators 3006 as indicated in the optimized join tree topology 3034 (e.g. via Xform joinPushDown operations). In some embodiments, EXCEPT and INTERSECT are also implemented as joins (e.g. semi joins and/or anti-joins, respectively), which can be handled in a same or similar manner (e.g. via other Xforms, such as exceptPushDown and/or intersectPushDown).

In some embodiments, once optimized join tree topology 3034 is determined, a recursive algorithm is applied to bring the operator tree 3010 into the desired shape (e.g. to place the join operators in the correct sequence). This can be achieved via implementing some or all of the following logic:

```
apply_joinTree_to_operatorTree(joinTreeId)
  // recursive step
  joinInput1 = apply_joinTree_to_operatorTree( joinPartner1( joinTreeId ) )
joinInput2 = apply_joinTree_to_operatorTree( joinPartner2(            joinTreeId ) )
    join = findCommonAncestor(joinInput1, joinInput2)
    moveOperatorDown(join, joinInput1, joinInput2)
```

In some embodiments, the top-level join does not have to be pushed down. For example, the recursion guarantees that its child joins have been pushed down already as much as possible, which is below the top-level join.

Figure 27J:
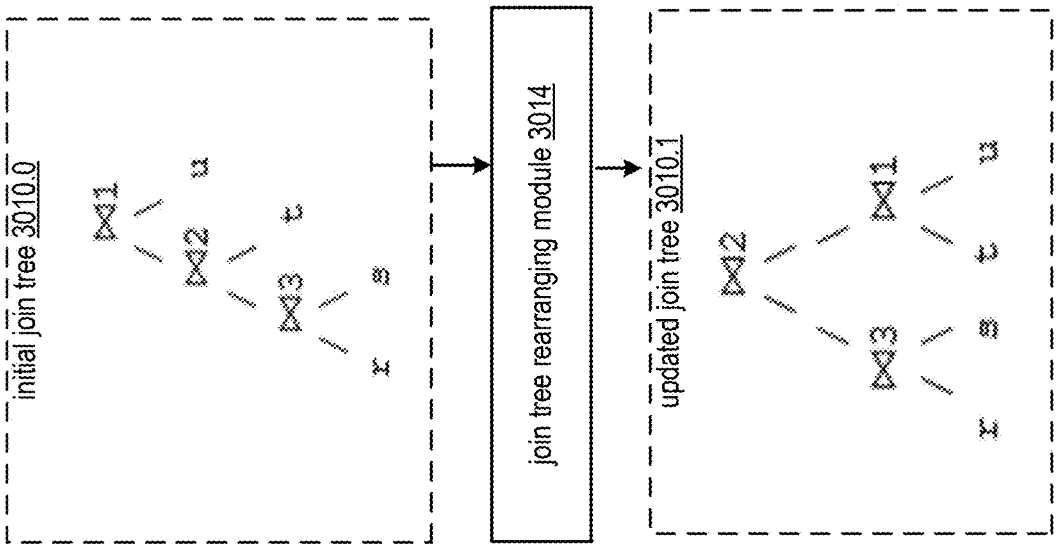
Figure 27K:
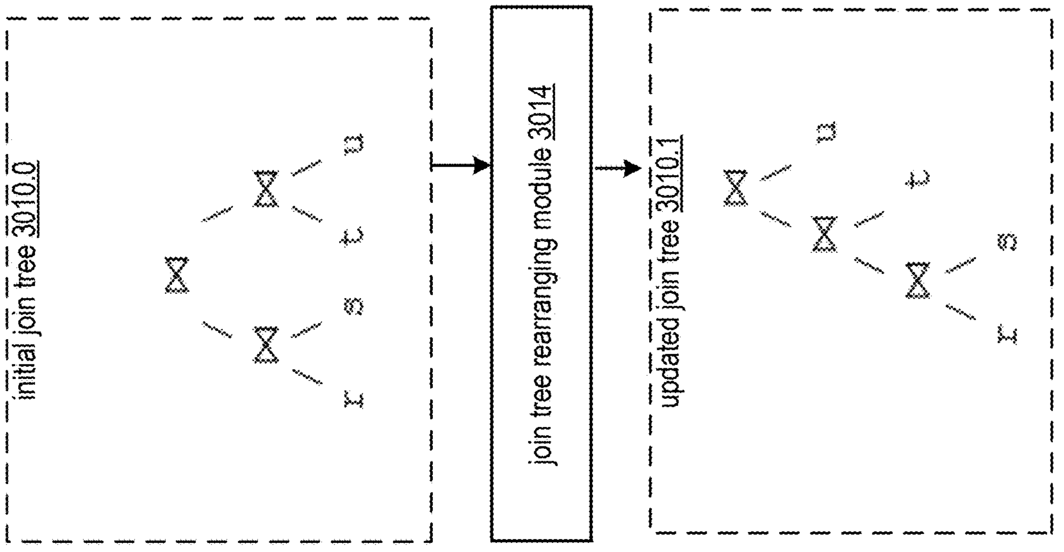

FIGS. 27J and 27K illustrate examples of an initial join tree transformed into an updated join tree via a join tree rearranging module 3014.

In the example of FIG. 27J, an initial join tree 3010.0 in a left-deep tree configuration is rearranged as an updated join tree 3010.1 in a bushy tree configuration, for example, based on the query expression indicating ordering of joins in the left-deep tree configuration and/or based on the optimized join tree topology 3034 indicating this bushy tree configuration.

For example, the bit masks for the tables are: "r"=0001b, "s"=0010b, "t"=0100, "u"=1000b. For the optimized join order applied in generating the updated join tree 3010.1 in this example, the following compositions of join tree ids are optionally indicated in a corresponding lookup table as discussed in conjunction with FIG. 27H:

$$1111b = 0011b \bowtie 1100b$$

$$0011b = 0001b \bowtie 0010b$$

$$1100b = 0100b \bowtie 1000b$$

Applying the example optimized join order to the join tree 3010.0 (e.g. via the recursive process)can include, first, starting with the top-most join tree ID 1111b, recursively descending for join tree ID 0011b (e.g. no further recursion down to 0001b and 0010b is necessary, where a common ancestors of r and s is found as join ⋈3, where the operator joining these children is already is/is above the common ancestor join so the process exits) and recursively descending for join tree ID 1100b (e.g. no further recursion down to 1000*b* or 0100*b* is necessary, where a common ancestors of t and u is found as join ⋈1; ⋈1 is pushed below ⋈2, where ⋈1 becomes the right child of ⋈2 while ⋈3 stays as the left child of ⋈912 2, t becomes the left child of ⋈1 while u stays as right child). In finding the common ancestor for ⋈3 and ⋈1, the operator is already above ⋈1 and ⋈3, so the process exits.

In the example of FIG. 27K, an initial join tree 3010.0 in a bushy tree configuration is rearranged as an updated join tree 3010.1 in a left-deep tree configuration, for example, based on the query expression indicating ordering of joins in the bushy tree configuration and/or based on the optimized join tree topology 3034 indicating this left-deep tree configuration. The rearranging can be similarly applied to render rearranging of the initial join tree 3010.0 into the left-deep tree configuration indicated by optimized join tree topology in this case.

In some embodiments, more complex queries can have several groups of joins that can be reordered but that are separated by other operations that the joins can't cross. In some embodiments, rules are applied to make sure that these possibilities aren't chosen when the join ordering algorithm is run.

In some embodiments, the other non-join elements can be returned back into the tree in the right places, based on, by stating that as soon as some prerequisite condition is true, the operator must be placed into the tree. For example, as soon as all the prerequisite columns are available, this window operator needs to be placed on the top of a tree in the set of join inputs before we move on to evaluating the next best join to choose.

In some embodiments, error handling is performed. For example, join order optimization happens on a copy of the operator execution flow. If any problem is detected (e.g. a join cannot be pushed down) any and all work is discarded, where the operator execution all return back to the previous mechanisms. Thus, the query will run but may be slower as than in the case where join order optimization were applied without an error. In some embodiments, log messages are written if join order optimization fails. In some embodiments, an error and/or warning is optionally emitted to the client.

In some embodiments, the generation and/or execution of join trees implements some or all features and/or functionality of generating and/or executing multi-join operators disclosed by: U.S. Utility application Ser. No. 18/634,450, entitled "EXECUTING MULTI-CHILD OPERATORS DURING QUERY EXECUTION VIA APPLYING A PIECEWISE SCHEDULING STRATEGY", filed Apr. 12, 2024, which is hereby incorporated herein by reference in its entirety and made part of the present U.S. Utility Patent Application for all purposes. For example, join tree 3010 can implement a multi-join topology-based binary tree structure 3130 with multi-join topology 3121, and/or can be executed via execution of a corresponding multi-join operator 3120, where output row set 3004 is implemented as multi-join output 3125 and/or where child branches 3123 are implemented as input row sets 3003.

Figure 27L:
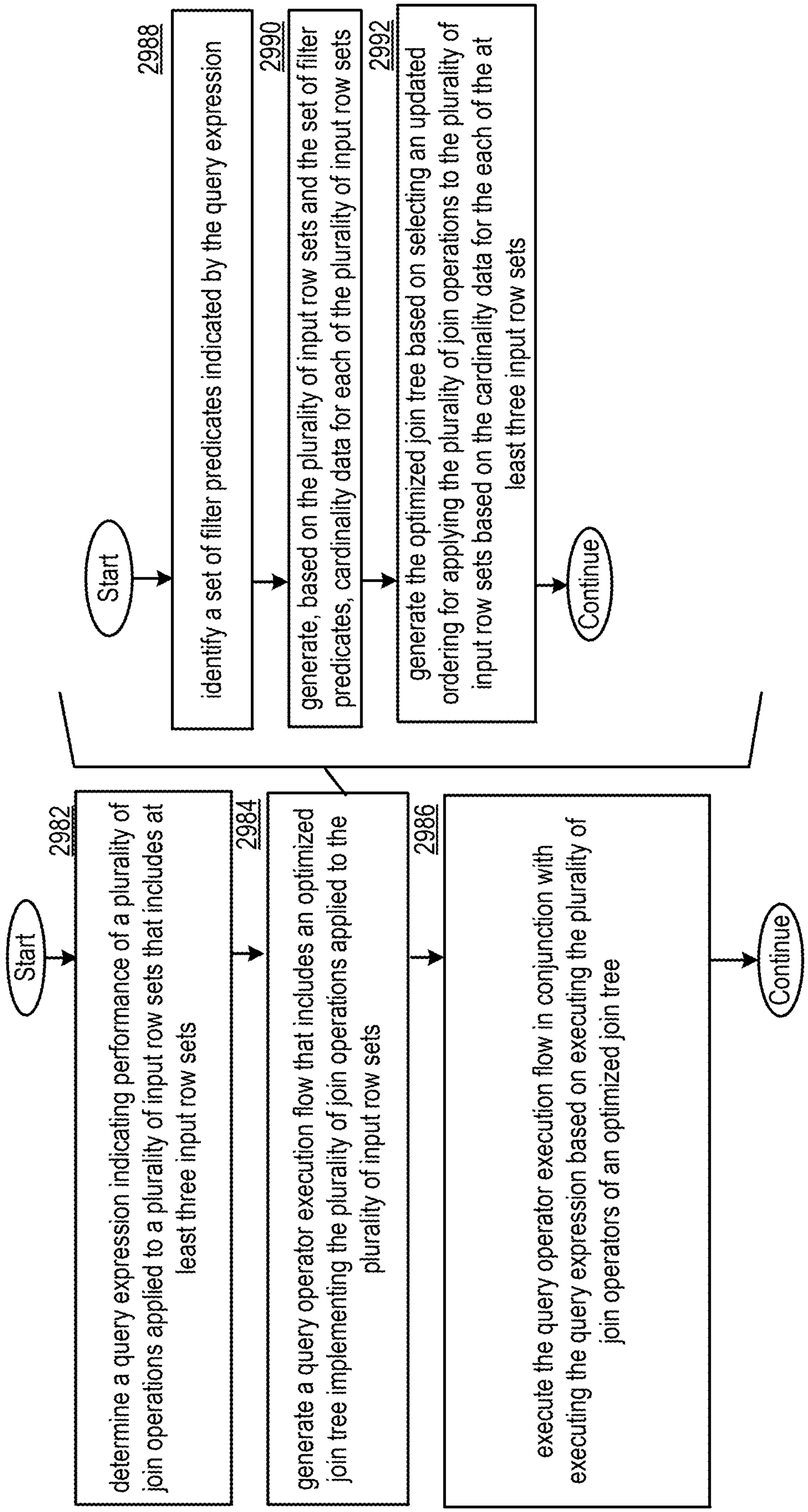
FIG. 27L is a logic diagram illustrating a method for execution in accordance with various embodiments.

FIG. 27L illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27L, for example, based on participating in execution of a query being executed by the database system 10. Some or all of the method of FIG. 27L can be performed by nodes executing a query in conjunction with a query execution, for example, via one or more nodes 37 implemented as nodes of a query execution module 2504 implementing a query execution plan 2405. Some or all of the steps of FIG. 27L can optionally be performed by any other one or more processing modules of the database system 10.

Some or all steps of FIG. 27L can be performed in parallel and/or concurrently via a plurality of parallelized processing resources (e.g. implemented via a plurality of nodes 37 and/or a plurality of processing core resources 48). For example, multiple instances of any given step of FIG. 27L can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 27L can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 27L can be performed to implement some or all of the functionality of the database system 10 as described in conjunction with FIGS. 27A-27K, for example, by implementing some or all of the functionality of query execution module 2504 and/or operator flow generator module 2514. Some or all steps of FIG. 27L can be performed by database system 10 in accordance with other embodiments of the database system 10 and/or nodes 37 discussed herein. Some or all of the steps of FIG. 27L can be performed in conjunction with performing some or all steps of any other method described herein.

Step 2982 includes determining a query expression indicating performance of a plurality of join operations applied to a plurality of input row sets that includes at least three input row sets. Step 2984 includes generating a query operator execution flow that includes an optimized join tree implementing the plurality of join operations applied to the plurality of input row sets. Step 2986 includes executing the query operator execution flow in conjunction with executing the query expression based on executing the plurality of join operators of an optimized join tree.

Performing step 2984 can include performing step 2988, step 2990, and/or step 2992. Step 2988 includes identifying a set of filter predicates indicated by the query expression. Step 2990 includes generating, based on the plurality of input row sets and the set of filter predicates, cardinality data for each of the plurality of input row sets. Step 2992 includes generating the optimized join tree based on selecting an ordering for applying the plurality of join operations to the plurality of input row sets based on the cardinality data for the each of the plurality of input row sets.

In various examples, each of the plurality of join operations of the optimized join tree is applied to a pair of row sets that includes: at least one of the plurality of input row sets, or at least one intermediate row set corresponding to output of at least one other one of the plurality of join operations.

In various examples, a query resultant is generated based on an output set of rows generated via execution of a root level join operation of the optimized join tree.

In various examples, a plurality of join tree identifiers correspond to tree nodes of the optimized join tree. In various examples, an arrangement of the optimized join tree is indicated by a lookup table storing a plurality of entries. In various examples, each of the plurality of entries indicates one corresponding join tree identifier value for a parent tree node mapped to a pair of other corresponding join tree identifiers of the plurality join tree identifiers denoting child tree nodes of the parent tree node.

In various examples, a unique corresponding value of each join tree identifier of the plurality of join tree identifiers is defined by a corresponding set of bits. In various examples, all of the plurality of join tree identifiers have a same number of bits for their corresponding value equal to a number of input row sets in the plurality of input row sets. In various examples, the corresponding set of bits of the each join tree identifier is different from corresponding sets of bits for all other ones of the plurality of join tree identifiers.

In various examples, each position of the corresponding set of bits corresponds to one of the plurality of input row sets. In various examples, the one corresponding join tree identifier value in the each of the plurality of entries is generated via a bitwise OR operation applied to the pair of other corresponding join tree identifiers of the plurality join tree identifiers of the each of the plurality of entries. In various examples, in the each of the plurality of entries, a first subset of positions set as '1' in a first other corresponding join tree identifier in the pair of other corresponding join tree identifiers has a null intersection with a second subset of positions set as '1' in a second other corresponding join tree identifier in the pair of other corresponding join tree identifiers.

In various examples, selecting the ordering for applying the plurality of join operations to the plurality of input row sets includes: initializing a set of unassigned input row sets to indicate the plurality of input row sets, and/or performing an iterative process build the optimized join tree. In various examples, performing the iterative process build the optimized join tree is based on, while the set of unassigned input row sets includes at least two input row sets, performing a next iterative step of the iterative process based on: determining expected cardinality for join output of each of a plurality of possible pairs of the set of unassigned input row sets; selecting one pair of input row sets from the set of unassigned input row sets having a lowest expected cardinality of the plurality of possible pairs as a corresponding pair of input row sets to be processed via a new join operation added to the optimized join tree; removing each input row set in the one pair of input row sets from the set of unassigned input row sets; and/or adding a new input row set, corresponding to an output row set of the new join operation, to the set of unassigned input row sets.

In various examples, selecting the ordering for applying the plurality of join operations to the plurality of input row sets includes: initializing a set of unassigned input row sets to indicate the plurality of input row sets; determining expected cardinality for join output of each of a plurality of possible pairs of the set of unassigned input row sets; selecting one pair of input row sets from the set of unassigned input row sets having a lowest expected cardinality of the plurality of possible pairs as a corresponding pair of input row sets to be processed via a first join operation added to the optimized join tree; removing each input row set in the one pair of input row sets from the set of unassigned input row sets; initializing a current tree output row set as a first output row set of the first join operation; and/or performing an iterative process further build the optimized join tree as one of: a left-deep tree or a right-deep tree. In various examples, performing the iterative process further build the optimized join tree is based on, while the set of unassigned input row sets is non-empty, performing a next iterative step of the iterative process based on: determining expected cardinality for join output of the current tree output row set paired with each of the set of unassigned input row sets; selecting one input row set from the set of unassigned input row sets having a lowest expected cardinality when paired with the current tree output row set to be processed with the current tree output row set via a new join operation added to the optimized join tree; and/or removing the one input row set from the set of unassigned input row sets.

In various examples, the method further includes generating an initial query operator execution flow based on the query expression that includes an initial ordering of the plurality of join operations applied to the plurality of input row sets. In various examples, the query operator execution flow is generated as an updated query operator execution flow from the initial query operator execution flow. In various examples, the optimized join tree implements the plurality of join operations applied to the plurality of input row sets via an optimized ordering different from the initial ordering based on rearranging of the initial ordering of the initial ordering of the plurality of join operations applied to the plurality of input row sets.

In various examples, the initial ordering of the plurality of join operations corresponds to an initial tree configuration corresponding to a bushy tree configuration based on at least one non-leaf tree node in the initial tree configuration having no leaf tree nodes as child nodes. In various examples, the optimized join tree is generated in accordance with an updated tree configuration corresponding to one of, based on all non-leaf tree nodes of the updated tree configuration having at least one leaf tree node as a child node: a left-deep tree configuration or a right-deep tree configuration.

In various examples, the initial ordering of the plurality of join operations corresponds to an initial tree configuration corresponding to one of, based on all non-leaf tree nodes of the initial tree configuration having at least one leaf tree node as a child node: a left-deep tree configuration or a right-deep tree configuration. In various examples, the optimized join tree is generated in accordance with an updated tree configuration corresponding to a bushy tree configuration based on at least one non-leaf tree node in the updated tree configuration having no leaf tree nodes as child nodes.

In various examples, at least one first join operation of the plurality of join operations is serially after at least one second join operation of the plurality of join operations in the initial query operator execution flow. In various examples, generating the query operator execution flow further includes pushing down the first join operation for execution serially before the at least one second join operation in the updated query operator execution flow.

In various examples, the initial query operation execution flow includes a set of non-join operations. In various examples, the at least one first join operation is also serially after at least one of the set of non-join operations in the initial query operator execution flow. In various examples, generating the query operator execution flow includes pushing down the at least one first join operation for execution serially before the at least one of the set of non-join operations in the updated query operator execution flow.

In various examples, generating the query operator execution flow includes determining whether a set of push-down conditions are met in pushing the at least one first join operation serially before the at least one of the set of non-join operations. In various examples, the at least one first join operation is serially before the at least one of the set of non-join operations in the updated query operator execution flow based on determining the set of push-down conditions are met in pushing the at least one first join operation serially before the at least one of the set of non-join operations.

In various examples, generating the optimized join tree includes generating output cardinality data for each join operation of the plurality of join operations as a function of input cardinality data generated for each input row set of the pair of input row sets for the each join operation. In various examples, the input cardinality data for the each input row set is generated based on one of: cardinality data generated for an input row set of the plurality of input row sets based on the each input row set corresponding to the input row set, or output cardinality data generated for an intermediate row set corresponding to output another one of the plurality of join operations based on the each input row set corresponding to the intermediate row set.

In various examples, the output cardinality data generated for the each join operation is generated based on computing an output cardinality value as a product of a first input cardinality value of first input cardinality data generated for a first input row set of the pair of input row sets for the each join operation with a second input cardinality value of second input cardinality data generated for a second input row set of the pair of input row sets for the each join operation.

In various examples, the set of filter predicates include a set of join conditions indicated in the query expression. In various examples, each of the set of join conditions are applied to a corresponding join operation of the plurality of join operations. In various examples, generating the query operator execution flow is further based on: computing a selectivity value for each of the plurality of join operations based on join conditions of the set of join conditions. In various examples, the output cardinality data generated for the each join operation is generated based on computing a product of the selectivity value, the first input cardinality value, and/or the second input cardinality value.

In various examples, the set of filter predicates includes a set of input filter predicates indicated in the query expression. In various examples, each of the set of input filter predicates are applied to a corresponding input row set of the plurality of input row sets. In various examples, generating the query operator execution flow is further based on computing a selectivity value for each of the plurality of input row sets based on input filter predicates of the set of input filter predicates. In various examples, the cardinality data generated for the each input row set is generated based on computing a product of the selectivity value with a cardinality value of corresponding cardinality data for the input row set.

In various examples, wherein the set of filter predicates includes at least one disjunction of multiple predicates.

In various examples, each of the plurality of input row sets correspond to rows of a corresponding relational database table of a plurality of relational database tables.

In various examples, metadata stored for each of the plurality of relational database tables indicates statistics data for the each of the plurality of relational database tables. In various examples, the cardinality data for the each of the plurality of input row sets is generated based on accessing the statistics data for the corresponding relational database table of the plurality of relational database tables.

In various examples, each of the plurality of input row sets correspond to rows stored across a set of segments. In various examples, each segment of the set of segments includes a statistics section for a corresponding set of rows. In various examples, the cardinality data is generated based on the statistics section for the each segment of the set of segments.

In various examples, the ordering for applying the plurality of join operations to the plurality of input row sets is selected based on minimizing at least one of: a runtime for executing the plurality of join operations; an amount of memory consumed in executing the plurality of join operations; or an amount of energy/power utilized in executing the plurality of join operations.

In various embodiments, any one of more of the various examples listed above are implemented in conjunction with performing some or all steps of FIG. 27L. In various embodiments, any set of the various examples listed above can be implemented in tandem, for example, in conjunction with performing some or all steps of FIG. 27L, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27L described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27L, for example, in conjunction with further implementing any one or more of the various examples described above.

In various embodiments, the operational instructions, when executed by the at least one processor, cause the database system to determine a query expression indicating performance of a plurality of join operations applied to a plurality of input row sets that includes at least three input row sets and/or generate a query operator execution flow that includes an optimized join tree implementing the plurality of join operations applied to the plurality of input row sets based on: identifying a set of filter predicates indicated by the query expression; generating, based on the plurality of input row sets and the set of filter predicates, cardinality data for each of the plurality of input row sets; and/or generating the optimized join tree based on selecting an updated ordering for applying the plurality of join operations to the plurality of input row sets based on the cardinality data for the each of the at least three input row sets, where each of the plurality of join operations of the optimized join tree is applied to a pair of row sets that includes: at least one of the plurality of input row sets, or at least one intermediate row set corresponding to output of at least one other one of the plurality of join operations. In various embodiments, the operational instructions, when executed by the at least one processor, further cause the database system to execute the query operator execution flow in conjunction with executing the query expression based on executing the plurality of join operators of the optimized join tree, where a query resultant is generated based on an output set of rows generated via execution of a root level join operation of the optimized join tree.

FIGS. 28A-28E illustrate embodiments where a query expression that indicates joining of a plurality of input row sets via executing a plurality of corresponding join operations in an ordering specified by a join tree generated based on user-configured join order parameter data in generating a corresponding query operator execution flow The embodiments illustrated in 28A-28E can be utilized to implement one or more nodes 37 of one or more computing devices 18 implementing database system 10. Some or all features and/or functionality of FIGS. 28A-28E can be utilized to implement any embodiment of database system 10 described herein.

In some embodiments, instead of or in addition to automatically selecting join order via an optimization process as discussed in conjunction with FIGS. 27E-27H, the corresponding topology of join tree 3010 is partially or entirely dictated by user-configured join order parameter data 3015.

Figure 28A:
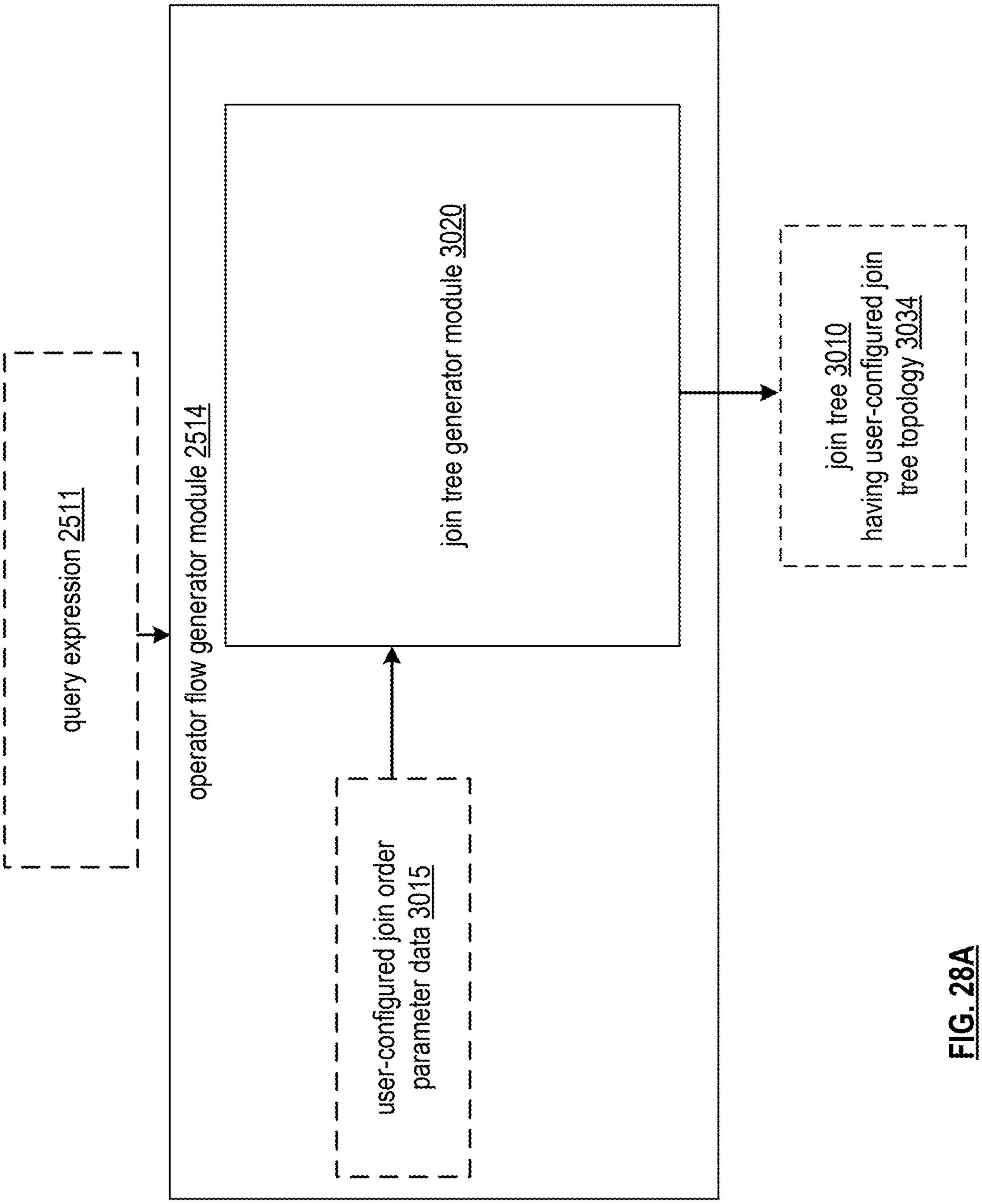
FIGS. 28A-28B illustrate embodiments of a join tree generator module that generates a join tree based on user-configured join order parameter data in accordance with various embodiments.

FIG. 28A illustrates such an embodiment where join tree generator module 3020 generates join tree 3010 for inclusion in the query operator execution flow 2817 based on applying user-configured join order parameter data 3015.

Figure 28B:
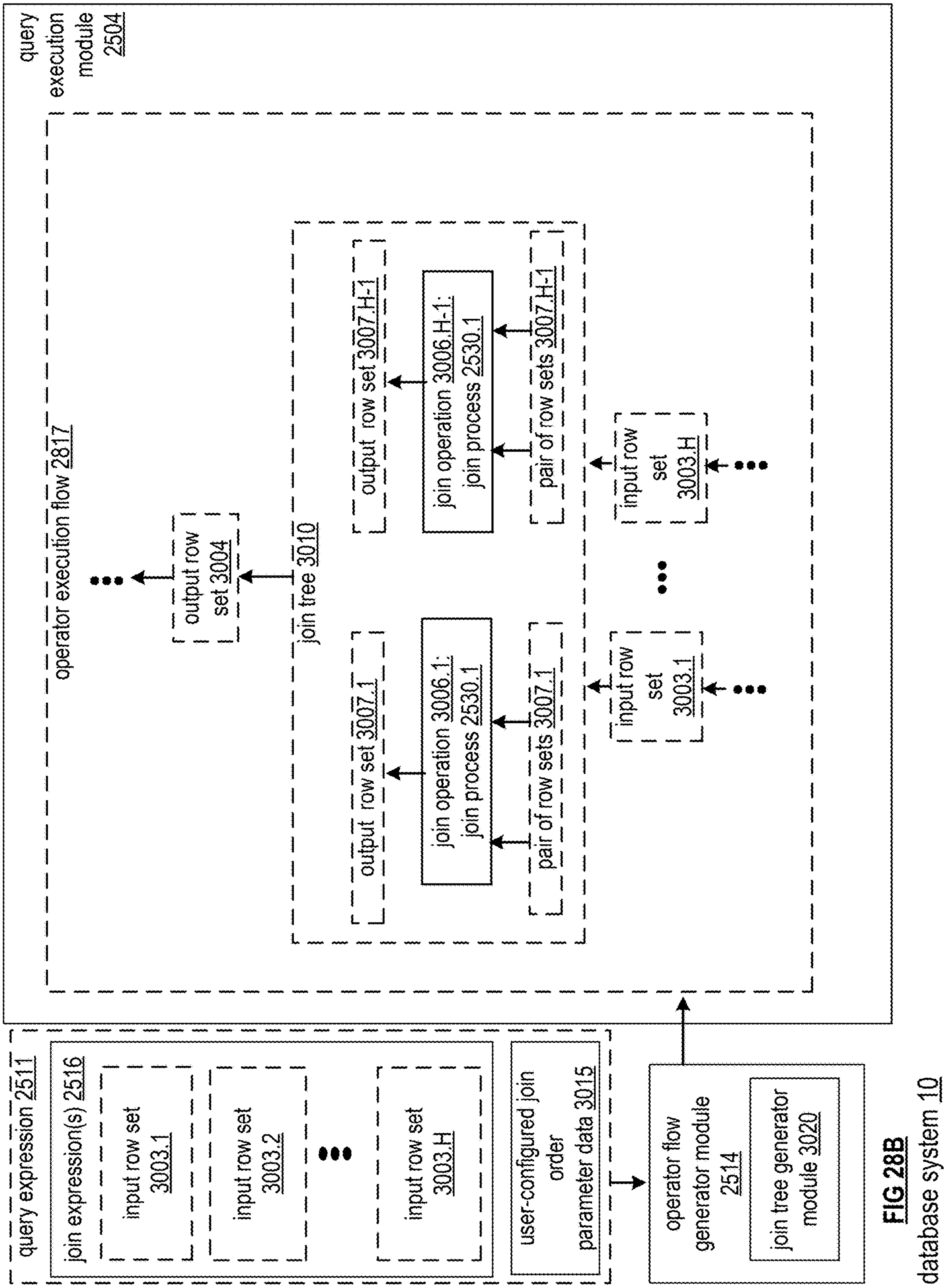

FIG. 28B illustrates an embodiment where this user-configured join order parameter data 3015 is included in the query expression itself (e.g. as corresponding SQL statement text).

In some embodiments, hints are supported so that the user (e.g. the person writing/requesting the query expression 2511) can specify the order in which tables shall be joined. Such hints can be implemented as user-configured join order parameter data 3015 (e.g. using the keyword "PRAGMA" or any other keyword indicating user-configured join order parameter data 3015, for example, as a corresponding hint in the corresponding SQL statement text).

As illustrated in the example of FIG. 28B, the

In some embodiments, join order optimization for a specific query can be disabled via user-configuration. As a particular example, the following clause is added to a query's SQL statement text, the optimization step will be skipped:

SELECT . . . FROM . . . PRAGMA join_order_optimization('off') WHERE . . . .

In such embodiments, this can cause the initial join ordering generated via parsing the query expression to be applied without any reordering, where the user can specify their desired order based on how the corresponding query expression is constructed.

Figure 28C:
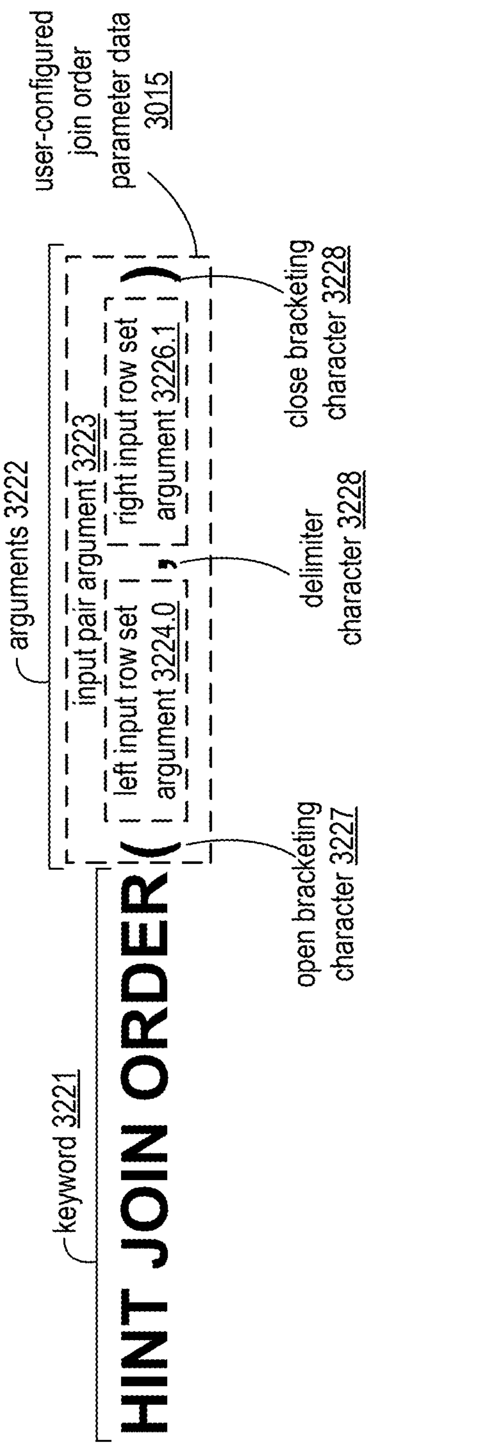
FIGS. 28C-28E illustrate embodiments of an input pair argument indicating user-configured join order parameter data in accordance with various embodiments.

FIG. 28C illustrates an example of text included in a query expression that indicates user-configured join order parameter data 3015.

In some embodiments, it can be convenient for the user to be able to more explicitly state the desired order as part of the SQL statement text, for example:

```
SELECT *
FROM r, s, t JOIN u ON t.id = u.id
WHERE ...
ORDER BY ...
LIMIT ...
HINT JOIN ORDER (((r, s), t), u)
```

For example, the user-configured join order parameter data 3015 is expressed as "HINT JOIN ORDER (((r, s), t), u)". In particular, "HINT JOIN ORDER" can be implemented as a keyword 3221, for example, indicating a corresponding function call or otherwise indicating the user-configured join order parameter data 3015 is included in the corresponding query expression 2511. Keyword 3221 can be optionally implemented as any other keyword (e.g. PRAGMA or any other keyword, for example, unique from other SQL keywords).

As a particular example, the keyword utilized to identify other hints (e.g. PRAGMA) can be implemented as keyword 3221 based on being extended to support join_order_optimization (<parenthesized table references>), for example, to avoid yet another parser for the argument. This keyword can be implemented to be supported for selectStatement (queries), insertIntoTable and/or deleteFromTable. In other embodiments, the keyword 3221 is distinct from the keyword used to identify other hints (e.g. different from PRAGMA).

The user-configured join order parameter data 3015 can be indicated via corresponding arguments of the clause introduced via the keyword 3221. The corresponding arguments 3222 can include an input pair argument 3220 (e.g. root input pair argument) that indicates a left input row set argument 3224.0 and/or a right input row set argument 3226.0. For example, the left input row set argument 3224.0 and/or the right input row set argument 3226.0 are separated by a delimiter character 3228 (e.g. a comma ',' or any other character) and/or the left input row set argument 3224.0 and/or the right input row set argument 3226.0 are enclosed by a pair of bracketing characters (e.g. parenthesis or other bracketing characters) that includes an open bracketing character (e.g. '(') and/or a close bracketing character (e.g. ')').

The input pair argument 3223 can include its own one or more input pair arguments 3223, where arguments 3222 define user-configured join order parameter data 3015 as a nested plurality of such input pair arguments 3223. Each input pair argument 3223 can correspond to a join to be performed upon its respective left input row set argument 3224 and right input row set argument 3226. For example, depending on the corresponding topology of the desired join tree, the left input row set argument 3224.0 and/or a right input row set argument 3226.1 can be expressed as input row set identifiers (e.g. IDs of corresponding tables, such as "r", "s", "t", or "u" in the examples of FIG. 27A-28E), or can be expressed as its own input pair argument 3223 indicating further sub arguments, where any left input row set argument 3224 and/or a right input row set argument 3226 of any nested input pair argument 3223 can similarly be expressed as input row set identifier or as a further nested input pair argument 3223. In the examples of arguments 3222 herein, "0" can indicate a left input row set and "1" can indicate a right input row set, from the root input pair argument.

Figure 28D:
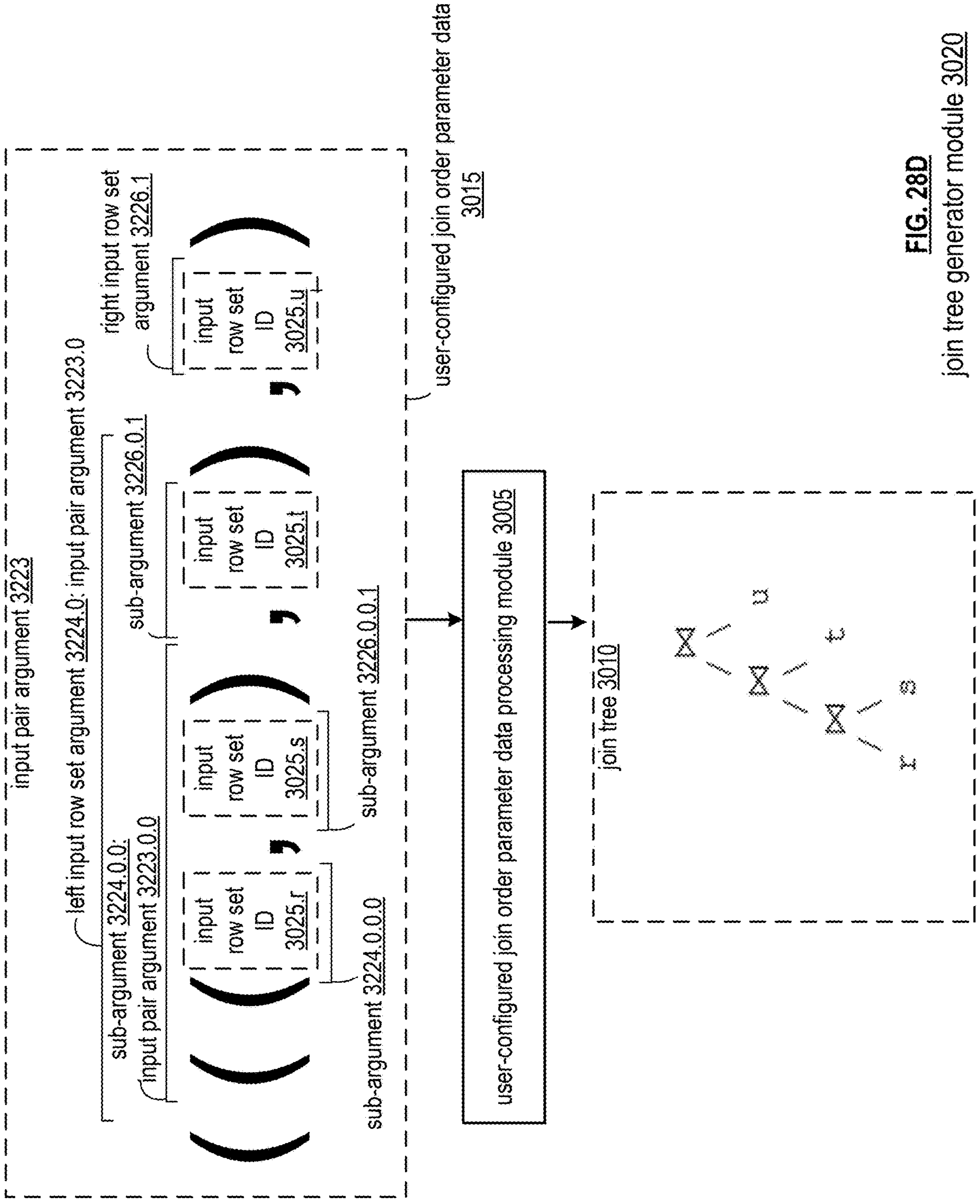

FIG. 28D illustrates an example input pair argument 3223 indicating a join tree with a left-deep tree topology. For example, the example input pair argument 3223 is expressed as "(((r, s), t), u)", for example, following keyword 3221.

In this example, right input row set argument 3226.1 of root input pair argument 3223 indicates input row set ID 3025.*u* (e.g. "u"), and left input row set argument 3224.0 for root input pair argument 3223 is implemented as its own input pair argument 3223.0. Right input row set sub-argument 3226.0.1 of left input pair argument 3223.0 indicates input row set ID 3025.*t* (e.g. "t"), and left input row set sub-argument 3224.0.0 of input pair argument 3223.0 includes its own input pair argument 3223.0.0. Right input row set sub-argument 3226.0.0.1 of input pair argument 3223.0.0 indicates input row set ID 3025.*s* (e.g. "s"), and left input row set sub-argument 3226.0.0.0 of input pair argument 3223.0.0 indicates input row set ID 3025.*r* (e.g. "r").

Figure 28E:
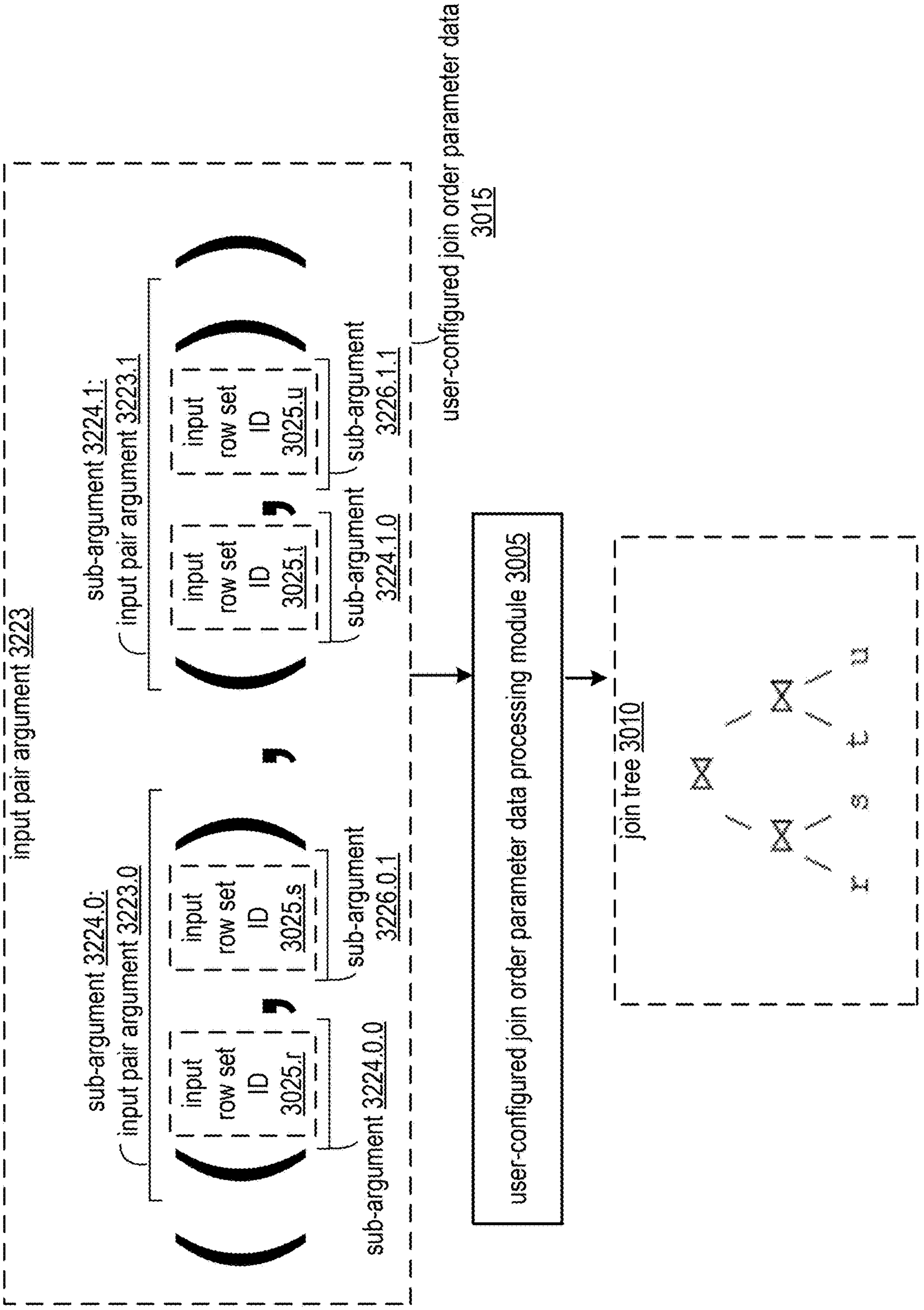

FIG. 28E illustrates an example input pair argument 3223 indicating a join tree with a bushy tree topology. For example, the example input pair argument 3223 is expressed as "((r, s), (t, u))", for example, following keyword 3221.

In this example, left input row set argument 3224.0 of root input pair argument 3223 indicates is implemented as its own input pair argument 3223.0, and right input row set argument 3226.1 for root input pair argument 3223 is also implemented as its own input pair argument 3223.1. Left input row set sub-argument 3224.0.0 of input pair set 3223.0 indicates input row set ID 3025.*r* (e.g. "r"), and right input row set sub-argument 3226.0.1 of input pair argument 3223.0 indicates input row set ID 3025.*s* (e.g. "s"). Left input row set sub-argument 3224.1.0 of input pair argument 3223.1 indicates input row set ID 3025.*t* (e.g. "t"), and right input row set sub-argument 3226.1.1 of left input pair argument 3223.0 indicates input row set ID 3025.*u* (e.g. "u").

Figure 28F:
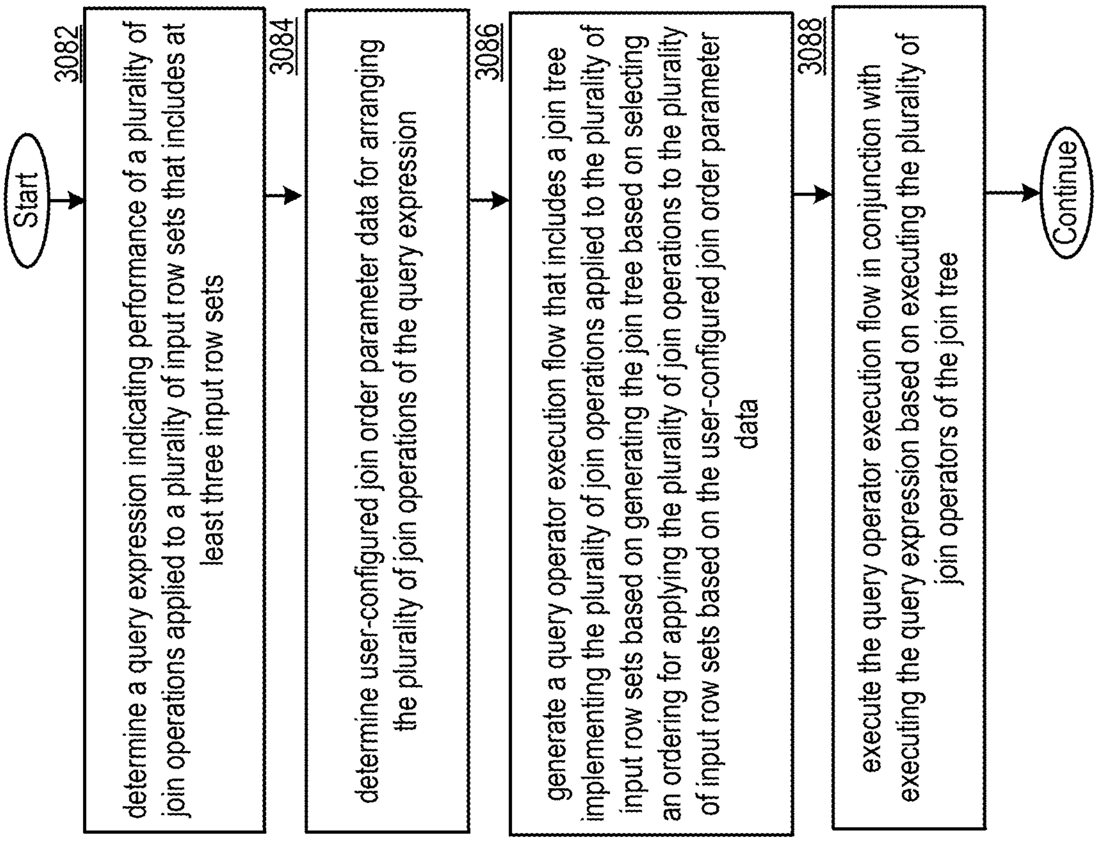
FIG. 28F is a logic diagram illustrating a method for execution in accordance with various embodiments.

FIG. 28F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28F, for example, based on participating in execution of a query being executed by the database system 10. Some or all of the method of FIG. 28F can be performed by nodes executing a query in conjunction with a query execution, for example, via one or more nodes 37 implemented as nodes of a query execution module 2504 implementing a query execution plan 2405. Some or all of the steps of FIG. 28F can optionally be performed by any other one or more processing modules of the database system 10.

Some or all steps of FIG. 28F can be performed in parallel and/or concurrently via a plurality of parallelized processing resources (e.g. implemented via a plurality of nodes 37 and/or a plurality of processing core resources 48). For example, multiple instances of any given step of FIG. 28F can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 28F can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 28F can be performed to implement some or all of the functionality of the database system 10 as described in conjunction with FIGS. 28A-28E, for example, by implementing some or all of the functionality of query execution module 2504 and/or operator flow generator module 2514. Some or all steps of FIG. 28F can be performed by database system 10 in accordance with other embodiments of the database system 10 and/or nodes 37 discussed herein. Some or all of the steps of FIG. 28F can be performed in conjunction with performing some or all steps of any other method described herein.

Step 3082 includes determining a query expression indicating performance of a plurality of join operations applied to a plurality of input row sets that includes at least three input row sets. Step 3084 includes determining user-configured join order parameter data for arranging the plurality of join operations of the query expression. Step 3086 includes generating a query operator execution flow that includes a join tree implementing the plurality of join operations applied to the plurality of input row sets based on generating the join tree based on selecting an ordering for applying the plurality of join operations to the plurality of input row sets based on the user-configured join order parameter data. Step 3088 includes executing the query operator execution flow in conjunction with executing the query expression based on executing the plurality of join operators of the join tree.

In various examples, each of the plurality of join operations of the join tree is applied to a pair of row sets that includes: at least one of the plurality of input row sets, or at least one intermediate row set corresponding to output of at least one other one of the plurality of join operations.

In various examples, a query resultant is generated based on an output set of rows generated via execution of a root level join operation of the join tree.

In various examples, the user-configured join order parameter data indicates a configured ordering of at least some of the plurality of join operations. In various examples, the ordering for applying the plurality of join operations is selected based on the configured ordering of the at least some of the plurality of join operations.

In various examples, the user-configured join order parameter data indicates a configured ordering for all of the plurality of join operations. In various examples, the ordering for applying the plurality of join operations is selected as the configured ordering of the plurality of join operations.

In various examples, the query expression indicates a first ordering of the plurality of join operations having a corresponding first ordering of the at least some of the plurality of join operations. In various examples, the user-configured join order parameter data indicates a second ordering of the at least some of the plurality of join operations that is different from the corresponding first ordering of the at least some of the plurality of join operations. In various examples, the ordering for applying the plurality of join operations is different from the first ordering of the plurality of join operations based on the ordering for applying the plurality of join operations including the second ordering of the at least some of the plurality of join operations.

In various examples, the user-configured join order parameter data is included in text data of the query expression. In various examples, the method further includes parsing the query expression to determine the query for execution and to further determine the user-configured join order parameter data.

In various examples, the user-configured join order parameter data is specified by a keyword in the query expression identifying a function call to apply the user-configured join order parameter data. In various examples, parsing the query expression includes identifying the function call to apply the user-configured join order parameter data based on: detecting the keyword in the query expression; and/or identifying arguments of the function call for applying the user-configured join order parameter data indicated as additional text of the query expression after the keyword.

In various examples, the keyword in the query expression uniquely identifies the function call for a user-configured join order parameter data processing function that is different from a plurality of other function calls for a plurality of other functions for processing other types of user-configured parameter data.

In various examples, the keyword in the query expression identifies a same function call for a user-configured parameter data processing function configured to apply any of a plurality of different types of user-configured parameter data that includes a user-configured join order parameter data type, wherein parsing the query expression includes determining the additional text of the query expression after the keyword corresponds to the user-configured join order parameter data type.

In various examples, the additional text of the query expression indicates the user-configured join order parameter data as a nested plurality of input pairs denoted by bracketing characters, wherein the ordering for applying the plurality of join operations to the plurality of input row sets.

In various examples, the bracketing characters are parenthesis characters.

In various examples, each of the plurality of join operations of the join tree is indicated in the additional text as a corresponding input pair, enclosed by a corresponding pair of bracketing characters and separated by a delimiter character.

In various examples, the delimiter character is a comma character.

In various examples, each corresponding input pair of the additional text includes: after an open bracketing character of the corresponding pair of bracketing characters and before the delimiter character, first text specifying left join input of the each of the plurality of join operations; and/or after the delimiter character and before a close bracketing character of the corresponding pair of bracketing characters, second text specifying right join input of the each of the plurality of join operations.

In various examples, the first text of the each corresponding input pair includes one of: a first input row set identifier identifying a first one of the plurality of input row sets when the left join input corresponds to a leaf of the join tree; or a first other corresponding input pair enclosed by a first other instance of the pair of bracketing characters and separated by a first other instance of the delimiter character when the left join input corresponds to a non-leaf of the join tree.

In various examples, the second text of the each corresponding input pair includes one of: a second input row set identifier identifying a second one of the plurality of input row sets based on the right join input corresponding to a leaf of the join tree; or a second other corresponding input pair enclosed by a second other instance of the pair of bracketing characters and separated by a second other instance of the delimiter character based on the right join input corresponding to a non-leaf of the join tree.

In various examples, the nested plurality of input pairs indicate each of the plurality of input row sets via corresponding input row set identifiers implemented as a corresponding relational database table identifier for a corresponding relational database table.

In various examples, the user-configured join order parameter data indicates whether to perform a join ordering optimization process in generating the join tree.

In various examples, the join ordering optimization process is automatically performed in a default mode of operation of processing query expressions when no user-configured join order parameter data is specified, wherein inclusion of the user-configured join order parameter data in the query expression indicates a user selection to forego performance of the join ordering optimization process, and wherein the join tree is generated to reflect an original ordering of the plurality of join operations indicated in the query expression based on foregoing performance of the join ordering optimization process.

In various examples, the method further includes: determining a second query expression indicating performance of a second plurality of join operations applied to a second plurality of input row sets that includes at least three input row sets; and/or, based on determining no user-configured join order parameter data for arranging the plurality of join operations of the query expression is specified for the second query expression, generating a second query operator execution flow that includes an optimized join tree implementing the second plurality of join operations applied to the second plurality of input row sets generated via performance of the join ordering optimization process. In various examples, generating the second query operator execution flow that includes the optimized join tree implementing the second plurality of join operations applied to the second plurality of input row sets generated via performance of the join ordering optimization process is based on: identifying a set of filter predicates indicated by the second query expression; generating, based on the second plurality of input row sets and the set of filter predicates, cardinality data for each of the second plurality of input row sets; and/or generating the optimized join tree based on selecting an ordering for applying the second plurality of join operations to the second plurality of input row sets based on the cardinality data for the each of the second plurality of input row sets. In various examples, each of the second plurality of join operations of the optimized join tree is applied to a pair of row sets that includes: at least one of the second plurality of input row sets, or at least one intermediate row set corresponding to output of at least one other one of the second plurality of join operations. In various examples, the method further includes executing the second query operator execution flow in conjunction with executing the second query expression based on executing the second plurality of join operators of the optimized join tree, wherein a second query resultant is generated based on a second output set of rows generated via execution of a second root level join operation of the optimized join tree.

In various examples, the method further includes generating an initial query operator execution flow based on the query expression that includes an initial ordering of the plurality of join operations applied to the plurality of input row sets. In various examples, the query operator execution flow is generated as an updated query operator execution flow from the initial query operator execution flow. In various examples, the join tree implements the plurality of join operations applied to the plurality of input row sets via an ordering different from the initial ordering based on rearranging of the initial ordering of the initial ordering of the plurality of join operations applied to the plurality of input row sets in accordance with the user-configured join order parameter data.

In various examples, the initial ordering of the plurality of join operations corresponds to an initial tree configuration corresponding to a bushy tree configuration based on at least one non-leaf tree node in the initial tree configuration having no leaf tree nodes as child nodes. In various examples, the join tree is generated in accordance with an updated tree configuration corresponding to one of, based on all non-leaf tree nodes of the updated tree configuration having at least one leaf tree node as a child node: a left-deep tree configuration or a right-deep tree configuration.

In various examples, the initial ordering of the plurality of join operations corresponds to an initial tree configuration corresponding to one of, based on all non-leaf tree nodes of the initial tree configuration having at least one leaf tree node as a child node: a left-deep tree configuration or a right-deep tree configuration. In various examples, the join tree is generated in accordance with an updated tree configuration corresponding to a bushy tree configuration based on at least one non-leaf tree node in the updated tree configuration having no leaf tree nodes as child nodes.

In various examples, at least one first join operation of the plurality of join operations is serially after at least one second join operation of the plurality of join operations in the initial query operator execution flow. In various examples, generating the query operator execution flow further includes, based on applying the user-configured join order parameter data, pushing down the first join operation for execution serially before the at least one second join operation in the updated query operator execution flow.

In various examples, the initial query operation execution flow includes a set of non-join operations. In various examples, the at least one first join operation is also serially after at least one of the set of non-join operations in the initial query operator execution flow. In various examples, generating the query operator execution flow includes pushing down the at least one first join operation for execution serially before the at least one of the set of non-join operations in the updated query operator execution flow.

In various examples, generating the query operator execution flow includes determining whether a set of push-down conditions are met in pushing the at least one first join operation serially before the at least one of the set of non-join operations. In various examples, the at least one first join operation is serially before the at least one of the set of non-join operations in the updated query operator execution flow based on determining the set of push-down conditions are met in pushing the at least one first join operation serially before the at least one of the set of non-join operations.

In various embodiments, any one of more of the various examples listed above are implemented in conjunction with performing some or all steps of FIG. 28F. In various embodiments, any set of the various examples listed above can be implemented in tandem, for example, in conjunction with performing some or all steps of FIG. 28F, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28F, for example, in conjunction with further implementing any one or more of the various examples described above.

In various embodiments, the operational instructions, when executed by the at least one processor, cause the database system to: determine a query expression indicating performance of a plurality of join operations applied to a plurality of input row sets that includes at least three input row sets; determine user-configured join order parameter data for arranging the plurality of join operations of the query expression; generate a query operator execution flow that includes a join tree implementing the plurality of join operations applied to the plurality of input row sets based on generating the join tree based on selecting an ordering for applying the plurality of join operations to the plurality of input row sets based on the user-configured join order parameter data, where each of the plurality of join operations of the join tree is applied to a pair of row sets that includes: at least one of the plurality of input row sets, or at least one intermediate row set corresponding to output of at least one other one of the plurality of join operations; and/or execute the query operator execution flow in conjunction with executing the query expression based on executing the plurality of join operators of the join tree, where a query resultant is generated based on an output set of rows generated via execution of a root level join operation of the join tree.

Figure 29A:
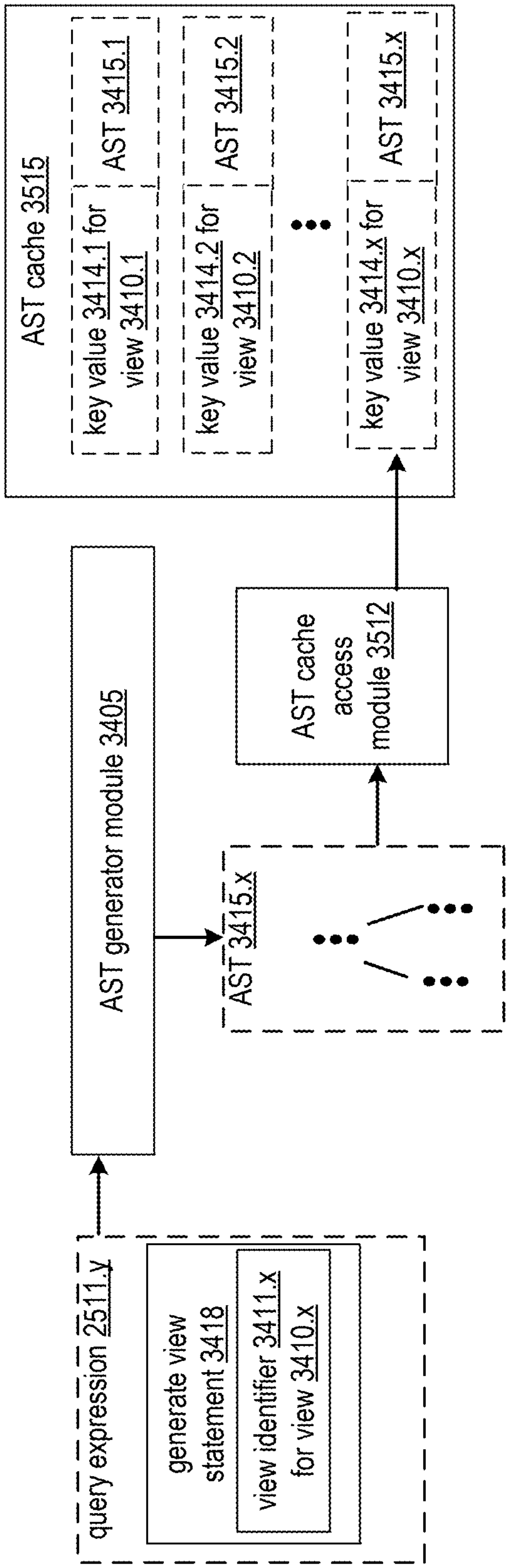
FIGS. 29A-29C illustrate embodiments of an abstract syntax tree cache in accordance with various embodiments.
Figure 29B:
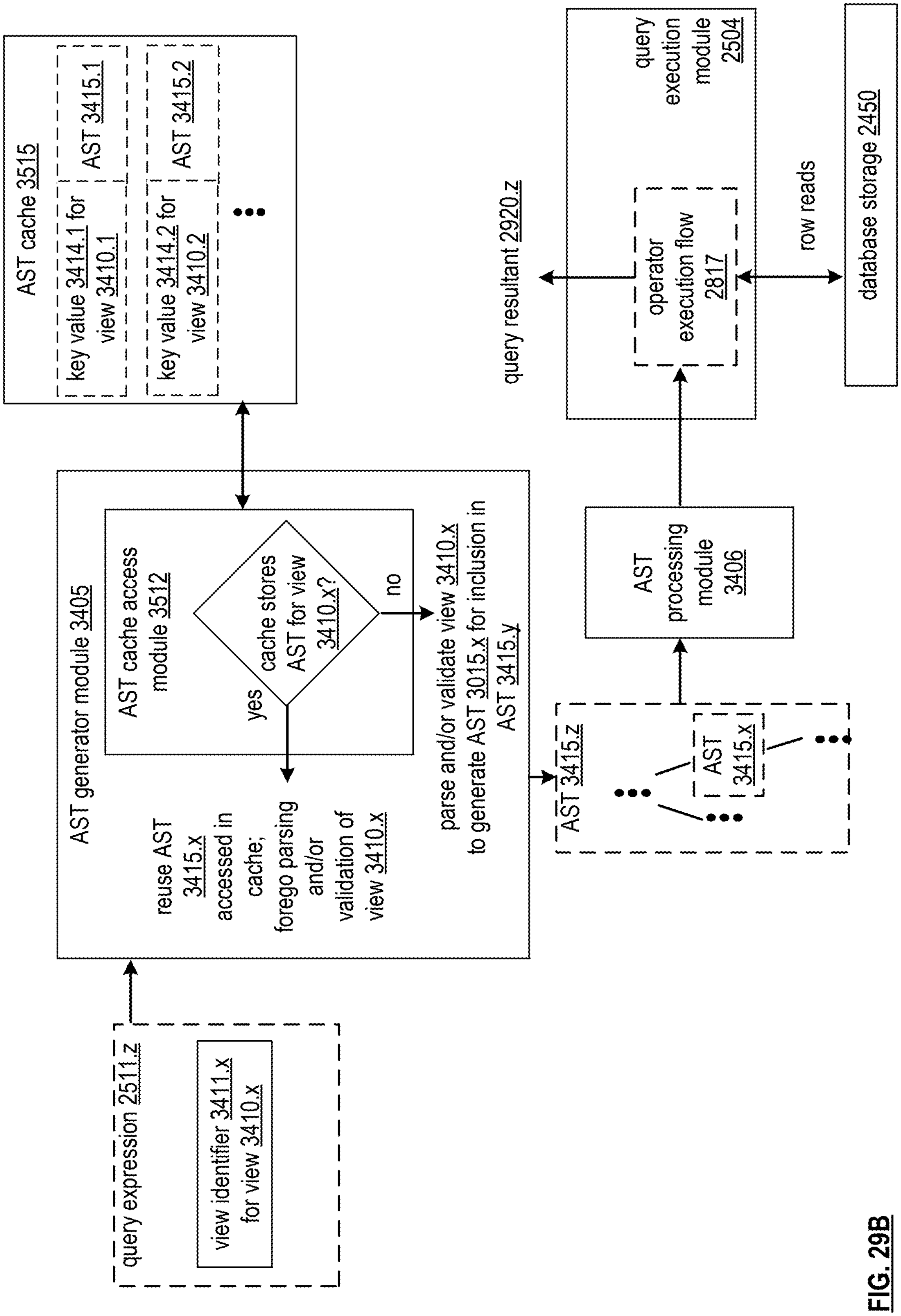
Figure 29C:
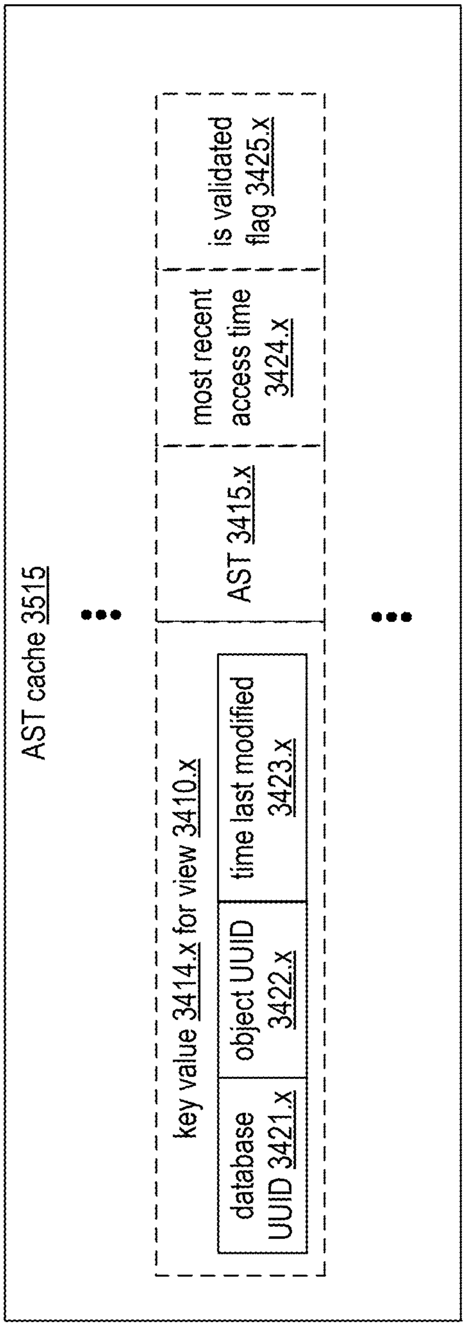

FIGS. 29A-29C illustrate embodiments of a database system 10 that implements an abstract syntax tree (AST) cache 3515 operable to store previously generated abstract syntax trees (e.g. via prior performance of a corresponding parsing process and/or validation process), for example, for views created and utilized in query expressions. The embodiments illustrated in 29A-29C can be utilized to implement any embodiment of query processing system 2502 described herein. The embodiments illustrated in 29A-29C can be implemented via one or more nodes 37 of one or more computing devices 18 implementing database system 10, and/or can be implemented via any other memory and/or processing resources. Some or all features and/or functionality of FIGS. 29A-29C can be utilized to implement any embodiment of database system 10 described herein.

In some embodiments of database system 10, each query expression 2415 (e.g. corresponding SQL statement) is parsed via a parsing process, which produces an abstract syntax tree (AST). This AST is subsequently validated via a corresponding validation process. For example, this validation is performed (e.g. via a TKT Validator class) to check privileges, makes table references are fully qualified, identify and/or verify column references, "freeze" special registers like CURRENT_TIMESTAMP, compile views (and/or user-defined functions) into the AST, etc.

In some embodiments, if a SQL statement references views, the validator retrieves a corresponding object (e.g. a md:viewInfo object) from metadata. This includes the view definition as SQL statement text, which needs to be parsed and validated along with the rest of the query expression referencing this view.

In some embodiments, abstract syntax tree caching is implemented to reduce the overhead associated with such (e.g. potentially recursive) processing, which can improve the technology of database systems by reducing processing required in parsing and validating query expressions. For example, consider the following example query expressions (1), (2), and (3)

```
(1) CREATE VIEW v AS (
    SELECT *
    FROM sys.tables AS t JOIN sys.columns AS c ON t.table_name =
    c.table_name );
(2) SELECT * FROM v;
(3) SELECT * FROM v AS v1 JOIN v AS v2 ON v1.colno =
    v2.colno;
```

In this example, in the case where the view v created in expression (1) is cached, SQL queries (2) and (3) referencing view v will benefit from that view's AST being cached.

In some embodiments, the goal is to cache already validated ASTs. In case an AST contains elements that don't lend themselves to caching (e.g. special registers like CURRENT_TIMESTAMP), the non-validated AST is optionally cached (e.g. where the non-validated AST is the result after parsing but before validation).

FIG. 29A illustrates an embodiment where an AST generator module 3405 of database system 10 (e.g. implemented via operator flow generator module 2514 and/or query processing system 2502, and/or implemented via at least one node and/or other processing/computing resources of database system 10, and/or implemented via a root node 2412 and/or SQL node assigned to process a corresponding query request) generates an abstract syntax tree 3415.*x* for an incoming query expression 2511.*y* that indicates a generate view statement 3418 (e.g. "CREATE VIEW . . . ") indicating a view identifier 3411.*x* (e.g. "v" in the example above) for a corresponding view 3410.*x* to be created. For example, the AST generator module 3405 generates AST 3415.*x* via performing a parsing process and/or a validation process upon a portion generate view statement 3418 defining view 3410.*x*, and/or based on performing the parsing process and/or the validation process upon query expression 251.*y* as a whole. For example, the AST 3415.*x* indicates a tree arrangement of operators of the view definition determined via performance of parsing process. An AST cache access module 3512 can store the AST 3415.*x* as a new entry in an abstract syntax tree cache 3515.

The AST cache 3515 can be implemented via any memory resources of database system 10 (e.g. stored in cache memory of one or more nodes 37). The AST cache 3515 can optionally be implemented as state data mediated via a consensus protocol. The AST cache 3515 can optionally be stored locally, for example, via a corresponding node 37.

FIG. 29B illustrates an embodiment where another query expression 2511.*z* that references view identifier 3411.*x* for view 3410.*x* is processed (e.g. via operator flow generator module 2514 and/or at least one node and/or other processing/computing resources of database system 10, and/or via a root node 2412 and/or SQL node assigned to process a corresponding query request) to generate a corresponding AST 3415.*z* via AST generator module 3405. In particular, the AST 3415.*z* is generated to include the AST 3415.*x* for the referenced view 3410.*x* (e.g. as an embedded tree included in the tree defining AST 3415.*z*). In particular, AST cache access module 3512 is implemented via AST generator module 3405 to access AST cache 3515 and determine whether AST 3415.*x* is stored (e.g. based on determining whether a corresponding key value 3414.*x* for the AST 3415.*x* is included as an entry of a corresponding map structure).

In the case where the AST cache 3515 stores AST 3415.*x* in a corresponding entry, the corresponding AST 3415.*x* is accessed and "copied" directly into the AST 3415.*z* (e.g. to replace the instance of the view identifier 3411.*x* in AST 3415.*z*). In the case where validation was not yet performed/needs to be reperformed for the AST 3515.*x* accessed in AST cache 3515, the AST 3515.*x* is validated prior to being inserted into AST 3415.*z* and/or is validated when validating the AST 3415.*z* as a whole. In the case where validation was already perform/need not be reperformed for AST 3415.*z* accessed in AST cache 3515, the AST 3515.*x* need not be revalidated in generating AST 3415.*z* to include AST 3415.*x*.

An AST processing module 3406 (e.g. implemented via operator flow generator module 2514, flow optimizer module 4914, and/or at least one node and/or other processing/computing resources of database system 10, and/or implemented via a root node 2412 and/or SQL node assigned to process a corresponding query request) can generate a corresponding operator execution flow 2817 (e.g. implemented via any embodiment of operator execution flow described herein) from the AST 3415.*z* (e.g. via performing an optimization process, rearranging operators, pushing operators down, etc., where an initial operator execution flow 2817.0 is optionally set as and/or is based on an arrangement of operators of AST 3415.*z*) for execution via query execution module 2405 to read rows from database storage 2450, process the rows via a corresponding plurality of operators in a corresponding arrangement derived from AST 3415.*z* to render execution of the requested query of query expression 2511.*z* accordingly.

While not illustrated, AST processing module 3406 can optionally similarly generate a corresponding operator execution flow 2817 for execution of query expression 2511.*y* of FIG. 29A from the respective AST 3415, for example, in the case where access to rows in database storage is performed. In some cases, such execution is not performed in the case where query expression 2511.*y* indicates generation of a view only, and not execution/applying of this view until executing a later query expression such as query expression 2511.*z*.

In some embodiments, the AST cache is limited by the number of entries and/or the AST cache is optionally not limited based on the memory consumption. In some embodiments, a maximum number of cache entries is configured (e.g. via user input), for example, via applying some or all of the following logic:

```
Config Parameter: "maxNumAstCacheEntries"
Value: [0, max_uint64] (default: 1'000)
```

In some embodiments, the configuration parameter is set to 0 to disable caching.

FIG. 29C illustrates an example embodiment of an entry of AST cache 3515.

In some embodiments, the AST cache 3515 implements a map structure. In some embodiments the AST cache 3515 cache is transient (e.g. not stored persistently anywhere and/or local to the current node only).

As illustrated in FIG. 29C, the key value 3414 for a given entry can include a database uuid, an object uuid, and/or the object's last-alteration-time. The mapped value can be the AST 3415 itself (e.g. class Select), optionally together with a most recent access time 3414 (e.g. time point when the AST was last retrieved from the cache and/or an is validated flag 3415 (e.g. implemented as a binary value, a bit, or other datatype with two possible values) indicating whether it was already validated (e.g. where the decision can be made whether an AST retrieved from the cache has to be validated before being used).

In some embodiments of implementing database UUID 3421 as part of key value 3414, some database objects like virtual tables or metadata views can be shared between databases. The definition of such a view may include a call (e.g. to function database( )) in the corresponding SQL statement. That function call can get replaced with a string literal of the current database name. For example, if user A is connected to database DB1 and queries view system tables (e.g. sys.tables), the AST for that query includes "SELECT COALESCE(dbs.name, database( )), . . . ", which can become "SELECT COALESCE(dbs.name, 'DB1'), . . . ".

In some embodiments, this AST generated for DB1 cannot be used by user B who is connected to another database DB2. For example, the AST where the replacement was applied (e.g. the validated AST) cannot be used by user B, where a separate AST is cached for database DB2 so that the validated AST can be cached and subsequent validation can be skipped. Thus, the versions of ASTs for DB1 and DB2 in this example can be mapped to different keys with corresponding different database UUIDs. Utilizing database UUID as part of key value 3414 can ensure the proper view for the correct database (e.g. applied to the corresponding user having the session with this database) is accessed.

In some embodiments of implementing object UUID 3422 as part of key value 3414, the UUID of the object is included to differentiate between different objects (e.g. corresponding to respective views). In some embodiments, objects schema name and unqualified object name alone is not sufficient. In some embodiments, if a DDL statement such as "CREATE OR REPLACE VIEW my_view AS SELECT . . . FROM . . . " is executed, a new object is created having the same names, but that object may have a completely different definition. These objects can thus be included in separate entries of the cache, where utilizing object UUID as part of key value 3414 can ensure the proper version of the view is accessed.

In some embodiments of implementing time last modified 3423 as part of key value 3414, altered objects can be detected. For example, if an AST is created, validated, and cached for the view defined via "CREATE OR REPLACE VIEW my_view AS SELECT c1*10 FROM sys.dummy10", and later the view definition is modified using "ALTER VIEW my_view SET SELECT CAST(c1 AS DOUBLE) FROM sys.dummy10", the ALTER VIEW statement retains the object's UUID, but the view does have a different schema as the data type of the column in the result set changes from INT to DOUBLE (and the values change as well). Thus, any AST that was cached before such an alteration cannot be reused. Utilizing time last modified 3423 as part of key value 3414 can ensure a corresponding view is accessed based on being cached only after such alterations, and/or can include selecting a most recent view entry with a given object UUID and/or given database UUID having a most recent time last modified 3423 is accessed instead of other entries with this given object UUID and/or given database UUID having older modification times.

In some embodiments, the AST cache is automatically maintained. For example, if the cache is full and another AST shall be cached, the oldest cache entry can be found and evicted. Likewise, if the cache size is reduced (e.g. via configuration parameter "maxNumAstCacheEntries"), the oldest entries can be evicted up to the point that the number of entries is at most the new configured maximum. In some embodiments, the search for the oldest entries uses a linear search over all cache entries (e.g. via an LRU mechanism).

In some embodiments, stale entries (e.g. for views no longer used/referenced) age out when the cache reaches its maximum configured size. If an object is replaced (e.g. and the object's UUID changes) or an object is altered (e.g. and the objects time last modified 3423 changes), a corresponding ASTs (a "stale AST") is no longer accessed, and is optionally not removed intentionally but instead will automatically be removed after newer entries are added to render meeting of the configured size.

In some embodiments, AST cache 3515 works across SQL nodes in the cluster. While each SQL node has its own AST cache, object modifications on other nodes can be automatically detected and correctly handled, where no additional or specific synchronization mechanisms are required in some embodiments. In some embodiments, no "negative cache" or "cache poisoning" is necessary.

In some embodiments, dependencies between objects can be identified via the validation process and/or can be stored in the AST's top-level Select object. These dependencies can include referenced tables, referenced views, and/or user-defined functions.

In some embodiments, if an already validated AST has been stored in the cache (e.g. as indicated by is validated flag 3425), no validation is needed when that AST is retrieved from the cache for subsequent queries. In some embodiments, some checks still required in this case, such as checking: existence of referenced tables/views; and/or privileges of the user to access referenced tables or views (in some embodiments, this second check can be optionally skipped for tables referenced inside a view because a user only needs privileges to access the view and not separate privileges to access the referenced tables).

In some embodiments, if a view contains any of a set of particular constructs (e.g. any of a set of validation view caching prevention sub-expressions), the view's AST will be cached before it is validated. For example, if such a view's AST is retrieved from the cache for a subsequent query, the AST is first validated before being embedded into the overall query's AST.

In some embodiments, the set of validation view caching prevention sub-expressions includes aggregation (e.g. COUNT(*)) expressions, for example, because such expressions require a query-wide unique name in some embodiments (e.g. because some xforms could get confused otherwise; for example if there are count-of-count patterns).

In some embodiments, the set of validation view caching prevention sub-expressions includes reference to special registers storing current values such as: CURRENT_DATE, CURRENT_TIME, CURRENT_TIMESTAMP, CURRENT_USER, CURRENT_SESSION_ID, CURRENT_CLIENT_SESSION_ID, CURRENT_SCHEMA, CURRENT_NODE, CURRENT_NODE_ID, and/or CURRENT_SYSTEM. For example, these special registers are replaced with literal values during validation, where the next execution of the same query may have to use a different value due to the current value stored in the special register having changed during the corresponding period of time between queries (e.g. time passes, so current time in the CURRENT_TIME register has changed, etc.).

In some embodiments, information about the cache itself is not exposed, and/or information regarding whether an AST was newly cached or was used from the cache during validation of a query is not exposed. In other embodiments, this information is exposed/utilized during monitoring processes.

In some embodiments, if an AST references a user-defined function—either directly or indirectly, no information is readily available in the AST. For example, consider the following example logic:

```
CREATE FUNCTION f AS ...
   CREATE VIEW v AS ( SELECT f( ) FROM sys.dummy1 );
   ALTER FUNCTION f AS ...
```

In this example, the function f gets compiled into the view's AST, and that AST is cached. When f is altered, the cached AST is no longer valid and is optionally discarded/ignored.

Figure 29D:
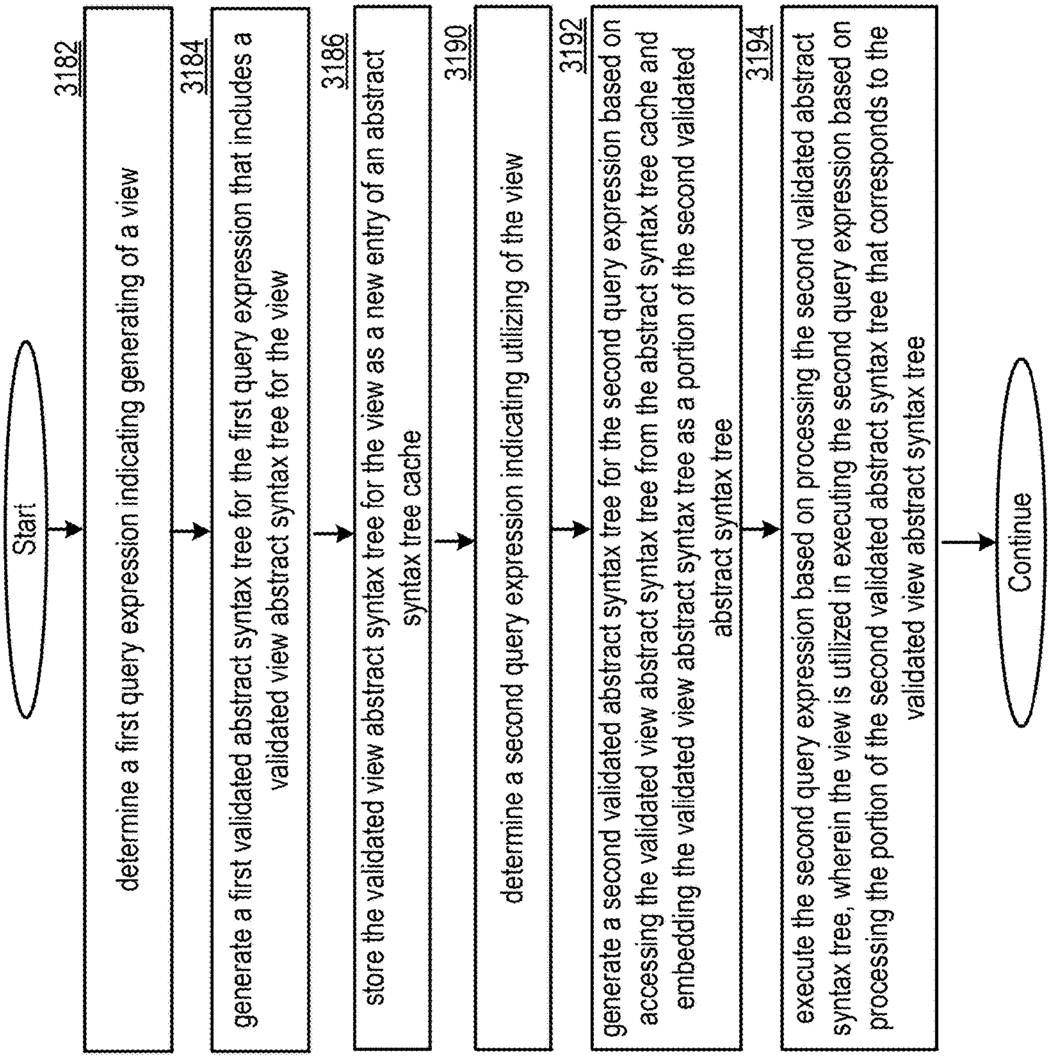
FIG. 29D is a logic diagram illustrating a method for execution in accordance with various embodiments.

FIG. 29D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29D, for example, based on participating in execution of a query being executed by the database system 10. Some or all of the method of FIG. 28F can be performed by nodes executing a query in conjunction with a query execution, for example, via one or more nodes 37 implemented as nodes of a query execution module 2504 implementing a query execution plan 2405. Some or all of the steps of FIG. 29D can optionally be performed by any other one or more processing modules of the database system 10.

Some or all steps of FIG. 29D can be performed in parallel and/or concurrently via a plurality of parallelized processing resources (e.g. implemented via a plurality of nodes 37 and/or a plurality of processing core resources 48). For example, multiple instances of any given step of FIG. 29D can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 29D can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 29D can be performed to implement some or all of the functionality of the database system 10 as described in conjunction with FIGS. 29A-29C, for example, by implementing some or all of the functionality of AST generator module 3405, AST cache access module 3512, AST processing module 3406, and/or query execution module 2504. Some or all steps of FIG. 29D can be performed by database system 10 in accordance with other embodiments of the database system 10 and/or nodes 37 discussed herein. Some or all of the steps of FIG. 29D can be performed in conjunction with performing some or all steps of any other method described herein.

Step 3182 includes determining a first query expression indicating generating of a view. Step 3184 includes generating a first validated abstract syntax tree for the first query expression that includes a validated view abstract syntax tree for the view. Step 3186 includes storing the validated view abstract syntax tree for the view as a new entry of an abstract syntax tree cache. Step 3190 includes determining a second query expression indicating utilizing of the view. Step 3192 includes generating a second validated abstract syntax tree for the second query expression based on accessing the validated view abstract syntax tree from the abstract syntax tree cache and embedding the validated view abstract syntax tree as a portion of the second validated abstract syntax tree. Step 3194 includes executing the second query expression based on processing the second validated abstract syntax tree, wherein the view is utilized in executing the second query expression based on processing the portion of the second validated abstract syntax tree that corresponds to the validated view abstract syntax tree.

In various examples, the method further includes executing the first query expression based on processing the first validated abstract syntax tree.

In various examples, the view is generated in the first query expression via a CREATE VIEW statement (e.g. in accordance with SQL syntax). In various examples, the view is referenced in the second query expression via a name of the view generated in the CREATE VIEW statement.

In various examples, generating the first validated abstract syntax tree for the first query expression is based on: generating a first pre-validated abstract syntax tree based on performing a parsing step upon the first query expression; and/or generating the first validated abstract syntax tree based on performing a validation step upon the first pre-validated abstract syntax tree. In various examples, generating the second validated abstract syntax tree for the second query expression is based on: generating a second pre-validated abstract syntax tree based on performing the parsing step upon the second query expression; and/or generating the second validated abstract syntax tree based on performing the validation step upon the second pre-validated abstract syntax tree.

In various examples, performing the parsing step upon the second query expression includes: identifying a name corresponding to the view in the second query expression; determining whether the view has any validated view abstract syntax tree stored in the abstract syntax tree cache mapped to the name; and/or accessing the validated view abstract syntax tree mapped to the view tree based on accessing a corresponding entry mapped to the name in the abstract syntax tree cache.

In various examples, the method further includes: determining a third query expression indicating generating of a second view, generating a third pre-validation abstract syntax tree for the third query expression that includes a pre-validated view abstract syntax tree for the second view, storing the pre-validated view abstract syntax tree for the second view as a second new entry of the abstract syntax tree cache; generating a third validated abstract syntax tree from the third pre-validation abstract syntax tree; executing the third query expression based on processing the third validated abstract syntax tree; determining a fourth query expression indicating utilizing of the second view, generating a fourth validated abstract syntax tree for the second query expression; and/or executing the second query expression based on processing the fourth validated abstract syntax tree, wherein the view is utilized in executing the second query expression based on processing a portion of the fourth validated abstract syntax tree that corresponds to the second validated view abstract syntax tree. In various examples, generating the fourth validated abstract syntax tree for the second query expression is based on: accessing the pre-validated view abstract syntax tree for the second view from the abstract syntax tree cache; generating a second validated view abstract syntax tree for the second view from the pre-validated view abstract syntax tree for the second view accessed from the abstract syntax tree cache; and/or embedding the second validated view abstract syntax tree as a portion of the fourth validated abstract syntax tree.

In various examples, the method further includes determining to store, in the abstract syntax tree cache, the validated view abstract syntax tree generated for the view after validation based on the view containing none of a set of validated view caching prevention expression types. In various examples, the method further includes determining to store, in the abstract syntax tree cache, the pre-validation view abstract syntax tree generated for the second view before validation based on the view containing at least one of the set of validated view caching prevention expression types.

In various examples, the set of validated view caching prevention sub-expressions includes a set of a identifiers for a corresponding set of special registers storing current values. In various examples, the second view indicates one of the set of identifiers. In various examples, generating the third validated abstract syntax tree includes replacing the one of the set of identifiers with a first value stored in a corresponding special register based on the corresponding special register being accessed when a first corresponding instance of the validation process is performed. In various examples, generating the fourth validated abstract syntax tree includes replacing the one of the set of identifiers with a second value stored in the corresponding special register based on the corresponding special register being accessed when a second corresponding instance of the validation process is performed. In various examples, the second value is different from the first value based on the first value being updated at least one time after the first corresponding instance of the validation process being performed and before the second corresponding instance of the validation process being performed.

In various examples, the corresponding set of special registers includes at least one of: a current date special register storing a current date; a current time special register storing a current time; a current timestamp special register storing a current timestamp; a current user special register storing an identifier for a current user, a current session identifier special register storing an identifier for a current session; a current client session identifier special register storing an identifier for a current client session; and/or a current schema special register storing an identifier for a current schema.

In various examples, the set of validation view caching prevention sub-expressions includes an aggregation (e.g. count (*)) expression. In various examples, the second view includes the aggregation (e.g. count (*)) expression.

In various examples, a parsing step and a validation step are foregone in processing the view in the second query expression based on determining the validated view abstract syntax tree is stored the abstract syntax tree cache.

In various examples, the method further includes receiving configuration parameters for the abstract syntax tree cache that indicates a threshold maximum number of entries. In various examples, the abstract syntax tree cache stores up to the threshold maximum number of entries. In various examples, based on determining adding the new entry would cause a total number or entries of the abstract syntax tree cache to exceed the threshold maximum number of entries, an oldest entry is removed from the abstract syntax tree cache.

In various examples, the abstract syntax tree cache is implemented by a map structure that includes a plurality of entries for a plurality of views. In various examples, each entry of the plurality of entries includes: a key value identifying a corresponding view of the plurality of views, and/or a corresponding abstract syntax tree, mapped to the key value in the map structure, generated for the corresponding view.

In various examples, wherein the key value for the each of the plurality of entries includes: a database universally unique identifier (UUID) for the corresponding view, an object UUID for the corresponding view, and/or a last alteration time for the corresponding view.

In various examples, the validated view abstract syntax tree is accessed from the abstract syntax tree cache based on having a corresponding key value with a corresponding database UUID corresponding to a database to which a corresponding user requesting the second query expression is connected in a corresponding session.

In various examples, the validated view abstract syntax tree is accessed from the abstract syntax tree cache based on having a corresponding key value with a corresponding last alteration time occurring before caching of the validated view abstract syntax tree.

In various examples, the each entry of the plurality of entries further includes a corresponding time value, mapped to the key value in the map structure, indicating a most recent time the corresponding abstract syntax tree was retrieved from the abstract syntax tree cache.

In various examples, the each entry of the plurality of entries further includes a validated flag indicating whether or not the corresponding abstract syntax tree is already validated based on whether the validated flag has a first value or a second value. In various examples, the validated flag for the new entry indicates a first value based on the validated view abstract syntax tree being validated. In various examples, a first non-null proper subset of the plurality of entries have the second value for the validated flag based on corresponding abstract syntax trees not being validated.

In various examples, generating the second validated abstract syntax tree includes, after accessing the validated view abstract syntax tree from the abstract syntax tree cache: determining whether all referenced tables included in the view exist; and/or determining whether a user requesting the second query expression has privileges to access the all referenced tables. In various examples, the validated view abstract syntax tree is embedded as the portion of the second validated abstract syntax tree based on determining all referenced tables included in the view exist and further based on determining the user requesting the second query expression has the privileges to access the all referenced tables.

In various examples, the second validated abstract syntax tree indicates an initial ordering of a plurality of join operations applied to a plurality of input row sets. In various examples, processing the second validated abstract syntax tree includes generating an updated query operator execution flow from the initial query operator execution flow that includes an optimized join tree implementing the plurality of join operations. In various examples, the updated query operator execution flow is generated based on generating, based on the plurality of input row sets and a set of filter predicates, cardinality data for each of the plurality of input row sets; and/or generating the optimized join tree based on selecting an ordering for applying the plurality of join operations to the plurality of input row sets based on the cardinality data for the each of the plurality of input row sets. In various examples, each of the plurality of join operations of the optimized join tree is applied to a pair of row sets that includes: at least one of the plurality of input row sets, or at least one intermediate row set corresponding to output of at least one other one of the plurality of join operations. In various examples, executing the second query expression is based on executing the plurality of join operators of the optimized join tree.

In various embodiments, any one of more of the various examples listed above are implemented in conjunction with performing some or all steps of FIG. 29D. In various embodiments, any set of the various examples listed above can be implemented in tandem, for example, in conjunction with performing some or all steps of FIG. 29D, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29D, for example, in conjunction with further implementing any one or more of the various examples described above.

In various embodiments, the operational instructions, when executed by the at least one processor, cause the database system to: determine a first query expression indicating generating of a view, generate a first validated abstract syntax tree for the first query expression that includes a validated view abstract syntax tree for the view, store the validated view abstract syntax tree for the view as a new entry of an abstract syntax tree cache; execute the first query expression based on processing the first validated abstract syntax tree; determine a second query expression indicating utilizing of the view, generate a second validated abstract syntax tree for the second query expression based on accessing the validated view abstract syntax tree from the abstract syntax tree cache and embedding the validated view abstract syntax tree as a portion of the second validated abstract syntax tree; and/or execute the second query expression based on processing the second validated abstract syntax tree, wherein the view is utilized in executing the second query expression based on processing the portion of the second validated abstract syntax tree that corresponds to the validated view abstract syntax tree.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s)"configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining -A matches -B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A query and response sub-system of a database system comprises:

a plurality of computing device clusters, wherein a computing device cluster of the plurality of computing device clusters includes a plurality of computing devices, wherein a computing device of the plurality of computing devices includes a plurality of computing nodes, wherein a computing node of the plurality of computing nodes includes a plurality of processing core resources, wherein a set of processing core resources of the pluralities of processing core resources is operable to optimize memory usage during query execution by:

obtaining an initial query that includes a plurality of join operations involving a plurality of tables, wherein the plurality of join operations has an initial organizational structure of execution;

determining a plurality of cardinality values for the plurality of tables, wherein a first cardinality value of the plurality of cardinality values is regarding a first number of rows of a first table of the plurality of tables to be included in a join operation of the plurality of join operations;

determining an initial cumulative cardinality value for the initial organizational structure of execution of the plurality of join operations based on the plurality of cardinality values;

when the initial cumulative cardinality value compares favorably to an output cardinality threshold:

utilizing the initial organizational structure of execution in an optimized query plan; and when the initial cumulative cardinality value compares unfavorably to the output cardinality threshold:

utilizing an optimized organizational structure of execution of the plurality of join operations in the optimized query plan.

2. The query and response sub-system of claim 1, wherein the set of processing core resources further determine the plurality of cardinality values based on:

metadata of the plurality of tables previously collected by the database system.

3. The query and response sub-system of claim 1, wherein the set of processing core resources is further operable to:

assign a plurality of join ID's to the plurality of tables, wherein a join ID of the plurality of join ID's is assigned to a table of the plurality of tables; and store the plurality of table join ID's in distributed memory resources of the database system.

4. The query and response sub-system of claim 1, wherein the set of processing core resources is further operable to:

record the initial organizational structure of execution in metadata; and access the recorded metadata to determine the optimized organizational structure of execution.

5. The query and response sub-system of claim 1, wherein the set of processing core resources is further operable to obtain the initial query by one of:

receiving the initial query;

generating the initial query; and looking up the initial query from a plurality of stored queries in distributed memory resources of the database system.

6. The query and response sub-system of claim 1, wherein the set of processing core resources is further operable to determine the plurality of cardinality values by:

when the query indicates a filter to be applied to a table of the plurality of tables:

applying the filter to a number of rows of the table to produce filtered rows of the table; and determining a cardinality value for the table based on the filtered rows.

7. The query and response sub-system of claim 1, wherein the set of processing core resources is further operable to determine the initial cumulative cardinality value based on:

a cumulative of cardinality values of the plurality of tables of the initial organizational structure of execution.

8. The query and response sub-system of claim 1, wherein the set of processing core resources is further operable to determine the initial cumulative cardinality value based on:

a cumulative of cardinality values of the plurality of tables of a layer of a plurality of layers of the initial organizational structure of execution.

9. The query and response sub-system of claim 1, wherein the set of processing core resources are further operable to:

create a plurality of alternative organizational structures of execution; and selecting the most favorable alternative organizational structure of execution of the plurality of alternative organizational structures of execution based on the cardinality value of the plurality of tables.

10. The query and response sub-system of claim 1, wherein the set of processing core resources is further operable to:

create an alternative organizational structure of execution;

determine cardinality values of the plurality of tables of the alternative organizational structure of execution; and when the cardinality values of the plurality of tables of the alternative organizational structure of execution compares favorably to the output cardinality threshold:

utilize the alternative organizational structure of execution of the plurality of join operations in the optimized query plan.

11. A computer-readable memory comprises:

a first memory section that stores operational instructions that, when executed by a set of processing core resources of pluralities of processing core resources of a query and response sub-system of a database system to optimize memory usage during query execution, causes the set of processing core resources to:

obtain an initial query that includes a plurality of join operations involving a plurality of tables, wherein the plurality of join operations has an initial organizational structure of execution;

determine a plurality of cardinality values for the plurality of tables, wherein a first cardinality value of the plurality of cardinality values is regarding a first number of rows of a first table of the plurality of tables to be included in a join operation of the plurality of join operations;

determine an initial cumulative cardinality value for the initial organizational structure of execution of the plurality of join operations based on the plurality of cardinality values;

when the initial cumulative cardinality value compares favorably to an output cardinality threshold:

utilize the initial organizational structure of execution in an optimized query plan; and when the initial cumulative cardinality value compares unfavorably to the output cardinality threshold:

utilize an optimized organizational structure of execution of the plurality of join operations in the optimized query plan.

12. The computer-readable memory of claim 11, wherein the first memory section further stores operational instructions that, when executed by the set of processing core resources, causes the set of processing core resources to:

determine the plurality of cardinality values based on metadata of the plurality of tables previously collected by the database system.

13. The computer-readable memory of claim 11, wherein the first memory section further stores operational instructions that, when executed by the set of processing core resources, causes the set of processing core resources to:

assign a plurality of table join ID's to the plurality of tables, wherein a join ID of the plurality of join ID's is assigned to a table of the plurality of tables; and store the plurality of table join ID's in distributed memory resources of the database system.

14. The computer-readable memory of claim 11, wherein the first memory section further stores operational instructions that, when executed by the set of processing core resources, causes the set of processing core resources to:

record the initial organizational structure of execution in metadata; and access the recorded metadata to determine the optimized organizational structure of execution.

15. The computer-readable memory of claim 11, wherein the first memory section further stores operational instructions that, when executed by the set of processing core resources, causes the set of processing core resources to obtain the initial query by one of:

receiving the initial query;

generating the initial query; and looking up the initial query from a plurality of stored queries in distributed memory resources of the database system.

16. The computer-readable memory of claim 11, wherein the first memory section further stores operational instructions that, when executed by the set of processing core resources, causes the set of processing core resources to further determine the plurality of cardinality values by:

when the query indicates a filter to be applied to a table of the plurality of tables:

applying the filter to a number of rows of the table to produce filtered rows of the table; and determine a cardinality value for the table based on the filtered rows.

17. The computer-readable memory of claim 11, wherein the first memory section further stores operational instructions that, when executed by the set of processing core resources, causes the set of processing core resources to further determine the initial cumulative cardinality value based on:

a cumulative of cardinality values of the plurality of tables of the initial organizational structure of execution.

18. The computer-readable memory of claim 11, wherein the first memory section further stores operational instructions that, when executed by the set of processing core resources, causes the set of processing core resources to further determine the initial cumulative cardinality value based on:

a cumulative of cardinality values of the plurality of tables of a layer of a plurality of layers of the initial organizational structure of execution.

19. The computer-readable memory of claim 11, wherein the first memory section further stores operational instructions that, when executed by the set of processing core resources, causes the set of processing core resources to:

create a plurality of alternative organizational structures of execution; and select the most favorable alternative organizational structure of execution of the plurality of alternative organizational structures of execution based on the cardinality value of the plurality of tables.

20. The computer-readable memory of claim 11, wherein the first memory section further stores operational instructions that, when executed by the set of processing core resources, causes the set of processing core resources to:

create an alternative organizational structure of execution;

determine cardinality values of the plurality of tables of the alternative organizational structure of execution; and when the cardinality values of the plurality of tables of the alternative organizational structure of execution compares favorably to the output cardinality threshold:

utilize the alternative organizational structure of execution of the plurality of join operations in the optimized query plan.

* * * * *